(12) United States Patent  (10) Patent No.: US 7,798,184 B2
Schultz, Jr. et al.  (45) Date of Patent: Sep. 21, 2010

(54) FUEL TRANSFER COUPLING

(76) Inventors: Robert L. Schultz, Jr., 1215 Deal Rd., Ocean, NJ (US) 07712; Basil B. Tilling, 7039 Sedgebrook Dr. West, Stanley, NC (US) 20164

( * ) Notice: Subject to any disclaimer, the term of this patent is extended or adjusted under 35 U.S.C. 154(b) by 0 days.

(21) Appl. No.: 12/287,508

(22) Filed: Oct. 9, 2008

(65) Prior Publication Data

US 2009/0199914 A1 Aug. 13, 2009

Related U.S. Application Data

(60) Continuation of application No. 11/702,414, filed on Feb. 6, 2007, now abandoned, which is a division of application No. 10/727,279, filed on Dec. 3, 2003, now Pat. No. 7,182,098.

(60) Provisional application No. 60/432,162, filed on Dec. 10, 2002.

(51) Int. Cl.
  *B65B 31/00* (2006.01)
  *F16L 37/28* (2006.01)
(52) U.S. Cl. .......... 141/59; 141/293; 141/302; 141/348; 251/149.1; 251/149.6
(58) Field of Classification Search ........ 141/2, 141/59, 302, 290, 293, 346, 348, 382, 389; 137/614.04, 614.05; 251/149.1, 149.6
See application file for complete search history.

(56) References Cited

U.S. PATENT DOCUMENTS

| | | | |
|---|---|---|---|
| 3,125,135 A | 3/1964 | Boyer et al. | 141/290 |
| 3,851,852 A * | 12/1974 | Blanchard et al. | 251/149.1 |
| 3,874,410 A * | 4/1975 | Clark | 137/614 |
| 4,266,574 A | 5/1981 | Tilling | 137/630.19 |
| 4,328,844 A | 5/1982 | Becktel et al. | 141/302 |
| 5,040,577 A | 8/1991 | Pope | 151/59 |
| 5,405,120 A | 4/1995 | Kerpan et al. | 251/149.9 |
| RE35,238 E | 5/1996 | Pope | 141/59 |
| 5,567,126 A | 10/1996 | Meece | 141/59 |

(Continued)

OTHER PUBLICATIONS

Jan. 16, 2008, Office Action.

(Continued)

*Primary Examiner*—Timothy L Maust
(74) *Attorney, Agent, or Firm*—Chris Whewell

(57) ABSTRACT

Provided herein are couplings useful in the transfer of liquid fuels from a remote storage reservoir to an on-board fuel tank of a motorized vehicle. There is provided a first coupling which is configured to be in fluid communication with the interior of a vehicle's fuel tank, and a second coupling which is intended to be in fluid communication with the contents of a remote fuel storage reservoir. The disclosure also includes a process for charging a fuel reservoir on board of a motorized vehicle from a remote reservoir, wherein the vapor in the fuel reservoir is displaced by an equal volume of fuel delivered from said remote reservoir, and wherein the vapor in said fuel reservoir is simultaneously caused to be transferred to said remote reservoir, thus permitting no escape of the vapor from said fuel reservoir to the surrounding atmosphere. Through use of the present disclosure, spills of fuel are essentially eliminated, and the escape of vapors from the vehicle's fuel tank are prevented, thus preventing atmospheric hydrocarbon pollution.

13 Claims, 50 Drawing Sheets

U.S. PATENT DOCUMENTS

| | | | |
|---|---|---|---|
| 5,634,505 A | 6/1997 | Wong | 141/349 |
| 6,079,444 A * | 6/2000 | Harris et al. | 137/614.03 |
| 6,149,129 A * | 11/2000 | Harris et al. | 251/149.1 |
| 6,167,747 B1 | 1/2001 | Koch et al. | 141/59 |
| 6,240,982 B1 | 6/2001 | Bonne | 141/59 |
| 6,250,348 B1 * | 6/2001 | Reinholdt | 141/382 |
| 6,418,981 B1 | 7/2002 | Nitecki et al. | 141/59 |
| 6,675,841 B2 | 1/2004 | Burns | 141/59 |
| 6,899,149 B1 | 5/2005 | Hartsell et al. | 141/59 |
| 6,941,978 B2 | 9/2005 | Riffle | 141/59 |
| 7,048,020 B2 * | 5/2006 | Durieux et al. | 141/382 |

OTHER PUBLICATIONS

Jul. 10, 2008, Office Action.

* cited by examiner

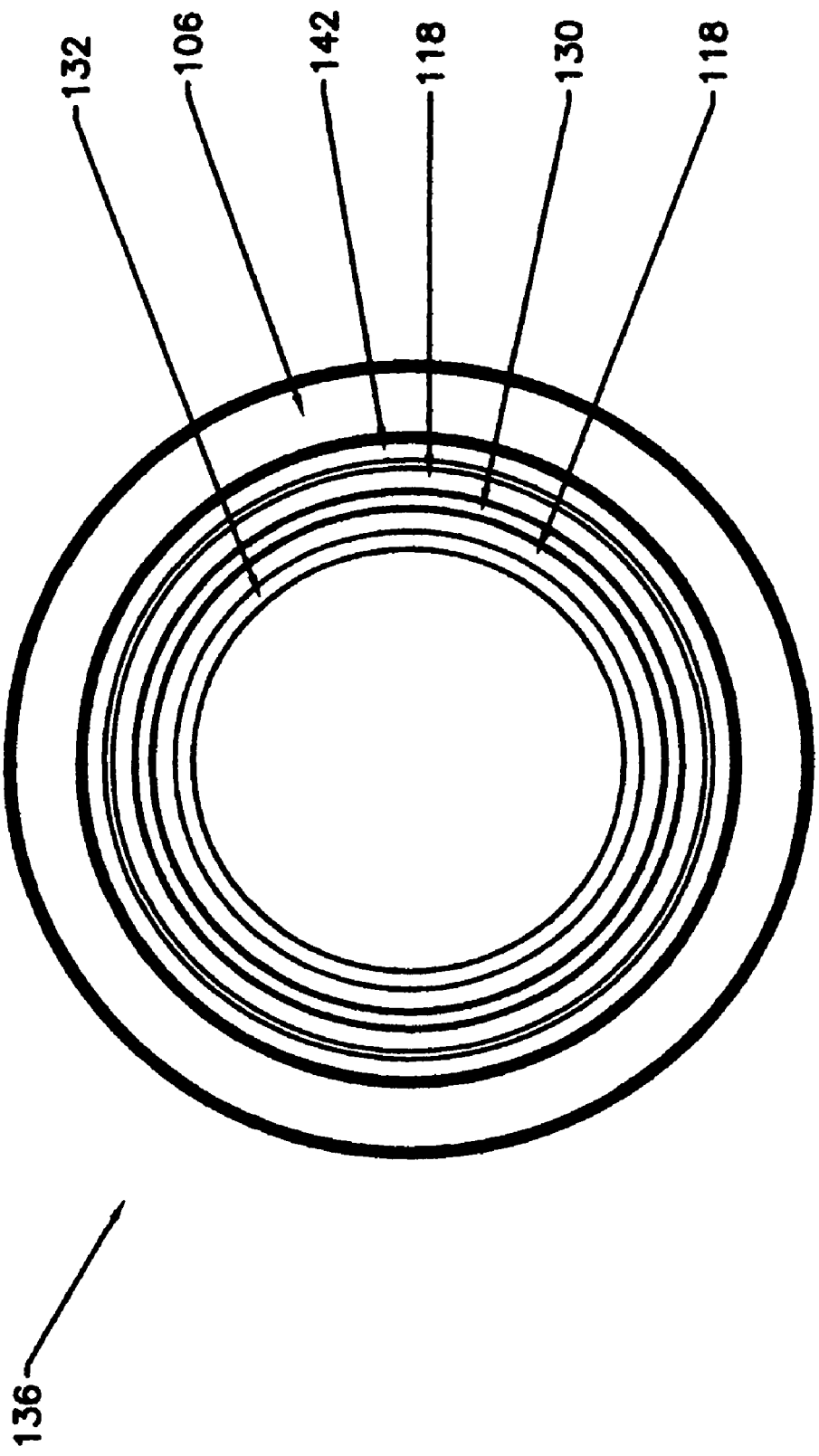

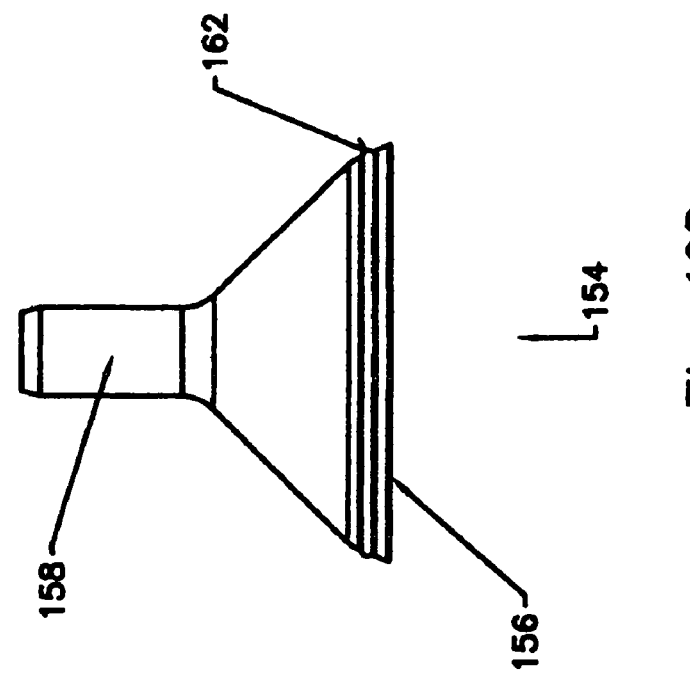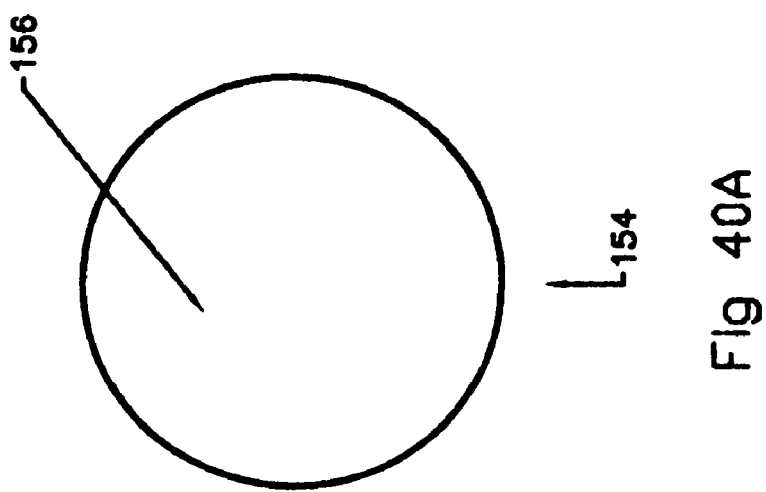

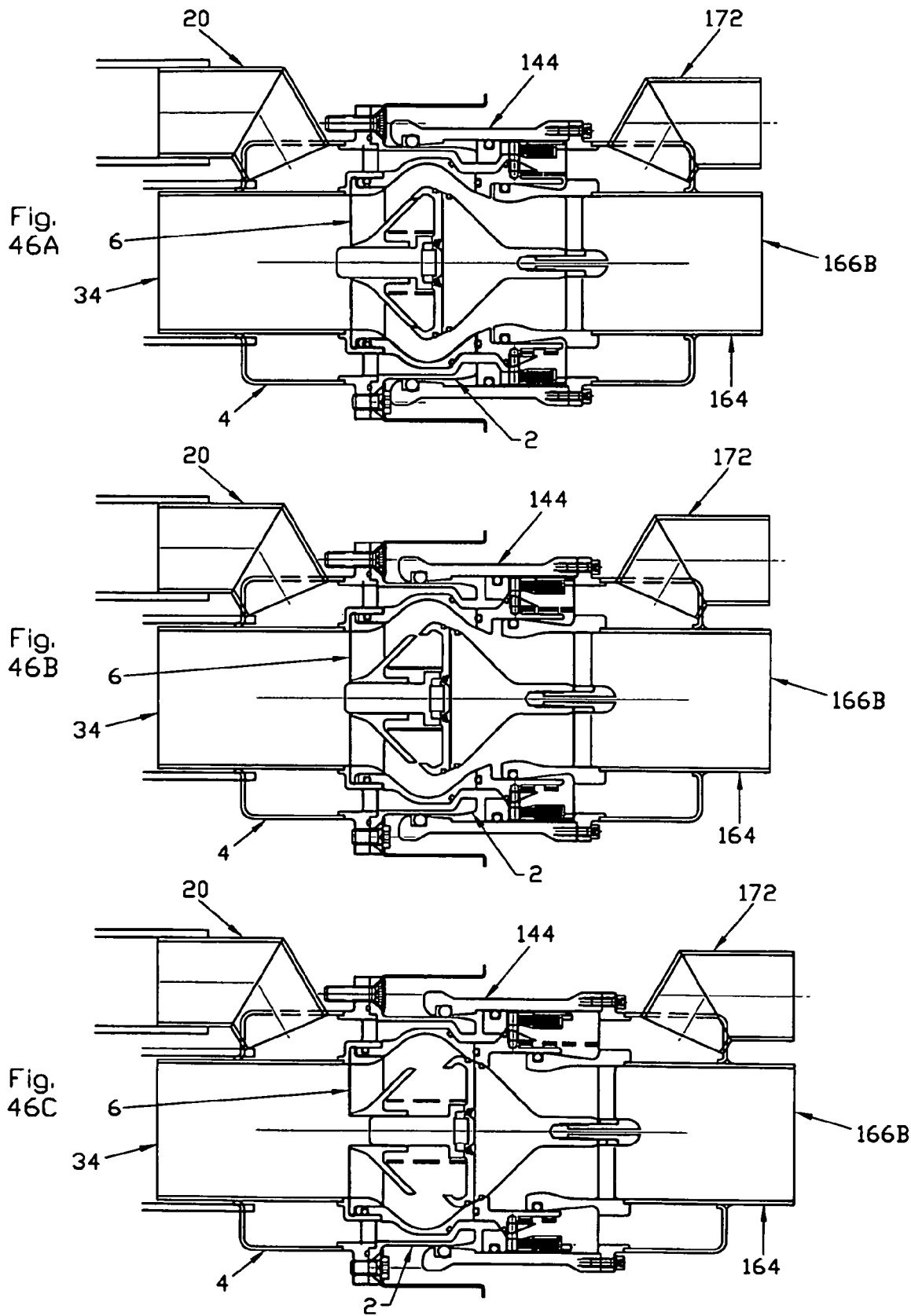

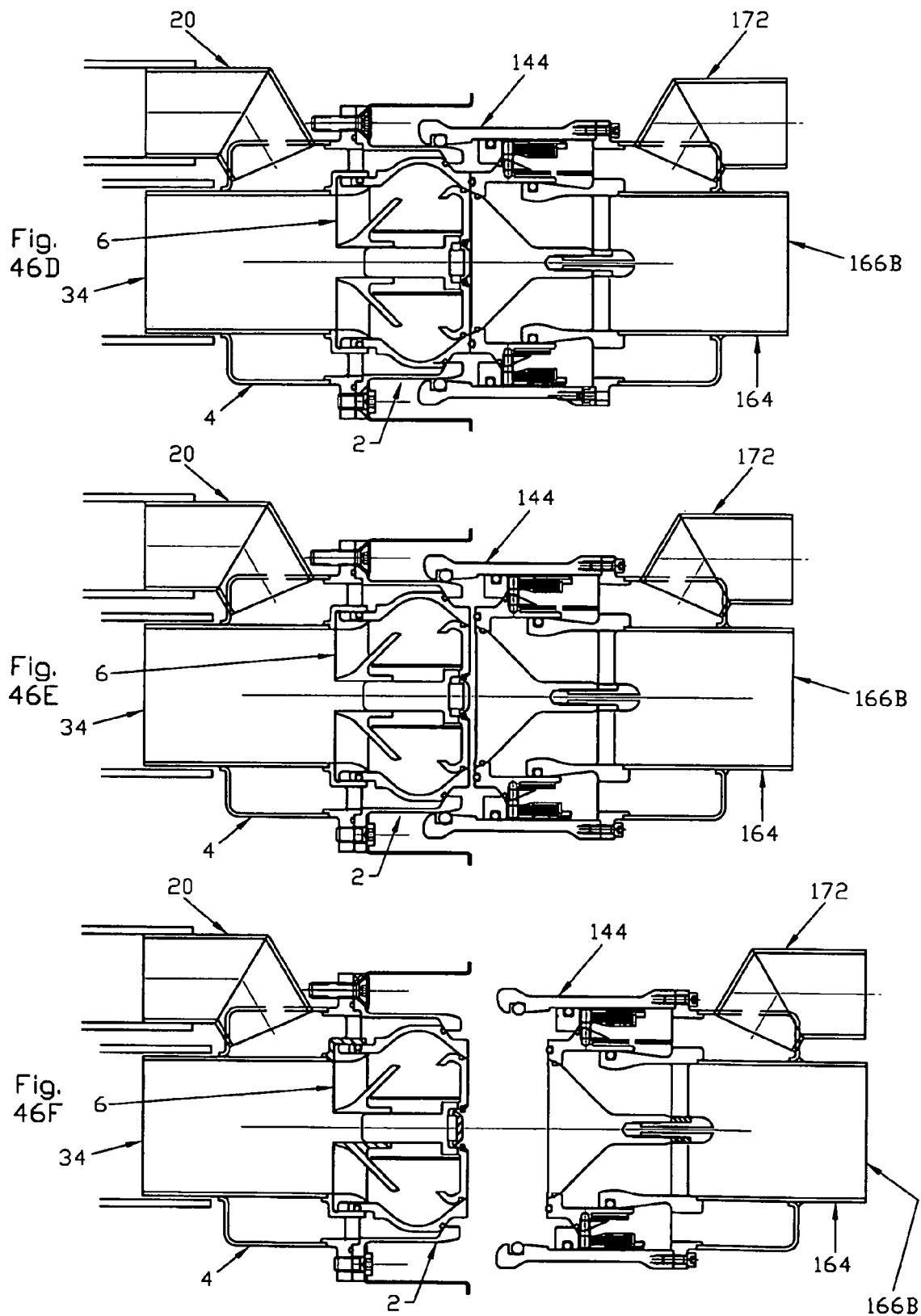

FUEL TRANSFER COUPLING

CROSS-REFERENCES TO RELATED APPLICATIONS

This application is a Continuation of U.S. patent application Ser. No. 11/702,414 filed Feb. 6, 2007 now abandoned, which was a divisional of U.S. patent application Ser. No. 10/727,279 filed Dec. 3, 2003 (now U.S. Pat. No. 7,182,098), and claims the benefit of U.S. Provisional Application No. 60/432,162 filed Dec. 10, 2002, the entire contents of all of which are herein fully incorporated by reference.

TECHNICAL FIELD

This disclosure relates generally to couplings used in transferring a liquid substance from one reservoir in which a liquid is stored to a second reservoir. More particularly, the disclosure relates in one embodiment to couplings useful in transferring a liquid hydrocarbon fuel from a storage vessel to an on-board fuel tank inside a motorized vehicle, such as an automobile.

BACKGROUND

By the very nature of the utilization of liquid substances such as liquid hydrocarbon fuels, it is frequently necessary to transfer a liquid fuel from a first storage vessel in which it is contained to a second storage vessel. One particular instance in which it is necessary to so transfer a liquid fuel is in the case of re-fueling an automobile during a racing event.

One particular class of automobile racing is where competing vehicles must travel an extended period of time to cover the pre-determined distance of the race. Such automobile races have been known since the advent of the automobile itself, and current NASCAR and other events include such races as the Indianapolis 500, the California 500, the Virginia 500, New England 300, to name but a few. Such automobile races typically require drivers and their cars to travel hundreds of miles from start to finish. Quite often, such races are carried out on a track, which may be circular, oval, or which may trace out a serpentine course.

Since the fuel-carrying capacity of the race car is limited by the rules of racing to be of specific volume, and the capacity of such tanks is not sufficient to enable the racer to complete the entire race on a single tank load of fuel, it is a general requirement of modern automobile racing that drivers must stop their vehicles periodically to have their tanks re-charged with fuel. Since the nature of racing is such that the first racer to cross the finish line is generally declared the winner, the amount of time used for the combined re-fueling operations becomes a significant factor in determining the outcome of any given race. Hence, it is essential from the standpoint of the racing team that the time utilized in re-fueling and other pit-stop operations is kept to an absolute minimum.

The current state-of-the-art method for re-fueling a racing vehicle in a circle-track application is for the racer to pull their car into an area known to those skilled in the art as the "pit-stop" for servicing. As is customary, the on-board fuel tank of a racing vehicle includes an inlet conduit through which fuel is admitted to the tank during re-fueling. There is also an exit conduit through which fuel is exited from the fuel tank and delivered by means of a fuel pump to the engine. There is also a cap or other means of sealing the inlet conduit from the surrounding environment after a re-fueling of the vehicle is complete. There is a headspace volume above the liquid level of the fuel in the tank. Initially, when the tank is full, the headspace volume is at its minimum. As fuel is consumed, the headspace volume increases, and reaches its maximum when all of the liquid fuel formerly contained in the tank has been consumed.

It is through the inlet conduit of the fuel tank that fuel is admitted during a pit-stop re-fueling operation. During a re-fueling, a member of the pit crew carries a large funnel-shaped vessel (the "recharging tank") which is full of a motor fuel, such as a gasoline. The recharging tank includes a fitting on its lower extremity which is complementary to that on the end of the inlet conduit on the fuel tank that receives fuel. After the racer's vehicle comes to a stop, the pit crew will remove the cap from the fuel tank inlet conduit. Then, the fitting on the recharging tank is mated to the fitting on the inlet conduit to form a sealed conduit through which fuel may pass from the recharging tank to the on-board fuel tank of the race car. A valve disposed on the recharging tank is opened, and fuel contained within the recharging tank is caused to flow, by the force of gravity, from the recharging tank into the on-board fuel tank of the racing vehicle.

The re-fueling of a racing vehicle is undertaken in as quick a time as seems possible, and with minimizing the losses of fuel during the operation. However, one of the disadvantages of current re-fueling methods is that large volumes of gasoline are spilled onto the pavement and portions of the vehicle being re-fueled. A typical volume of fuel lost by spillage in re-fueling operations during the course of a race may be several gallons of fuel, which losses occur primarily when the recharging tank is removed from the inlet conduit. While pit crews are well-equipped to deal with inadvertent fires that may occasionally occur, there are immediate health risks to pit crew personnel other than the fire hazard. For example, modern racing engines are typically designed to have an effective compression ratio in excess of 10:1, and these high compression ratio engines require fuels having high octane ratings. Volatile anti-knock compounds such as tetraethyl lead and the like are formulated into racing fuels as octane boosters. Since these lead compounds are volatile and since they are known health hazards, the issue of inhalation of tetraethyl lead and related compounds as a health hazard to pit crews is a serious matter. In addition, any un-necessary release of raw hydrocarbon fuels into the atmosphere is a public health concern as well. While professional racing has enjoyed exemption from many regulations applicable to automobiles driven on public roads, there exists a need in the art to minimize fuel spillage, while maintaining the rapidity at which a fuel tank on a racing vehicle may be re-filled.

Another issue for automobiles is the concept of vapor lock. Vapor lock is a condition which is manifest by the pressure in the headspace above the fuel in an on-board fuel tank being lower than normal atmospheric pressure. Such a condition is caused to exist by virtue of the fuel pump removing fuel from the fuel tank, without the same volume of air being admitted into the tank to compensate for the lost volume of fuel because the fuel tank is sealed off from the atmosphere. Eventually, the fuel pump is required to pump fuel from an area of reduced pressure, and, not being designed for such use, a less-than-desired amount of fuel is delivered to the engine, which results in inhibited engine performance.

SUMMARY OF THE DISCLOSURE

The present disclosure provides a fuel transfer coupling for attachment to the inlet pipe of a vehicle's fuel tank which comprises a base portion which comprises a planar top surface and which comprises a central bore portion having a first end portion and a second end portion, wherein the central bore portion is surrounded by a shrouding enclosure, wherein the shrouding enclosure includes a vapor tube, wherein the shrouding enclosure is in fluid communication with a plurality of holes disposed on the planar top surface, thus providing fluid communication between the holes and the vapor tube, the base portion further including a circumferential ledge at the terminus of the second end portion within the base portion, and wherein the base portion further comprises a flange disposed about its periphery, the flange including a plurality of holes in its surface. There is a flow control cone having an adjacent wall, the flow control cone including a spring seat, a poppet guide bore, an outer ring portion, and a wall portion, wherein the flow control cone is disposed at the second end portion of the central bore portion with its outer ring in contact with the circumferential ledge, thus forming a circumferential slot between the adjacent wall and the wall portion of the flow control cone. There is a poppet having a flat top surface, a bottom surface, and a stem, wherein the stem is slidably disposed within the poppet guide bore, the poppet further comprising a vent disc centrally disposed on the flat top surface, wherein the vent disc is mechanically biased towards the flat top surface. There is a spring disposed between the spring seat and the bottom surface of the poppet. There is a hollow internal housing having a flat top surface and a skirt portion, the internal housing being disposed about the poppet and wherein the the skirt of the internal housing is slidably disposed within the circumferential slot. There is an adapter cover affixed to the base portion, in which is contained the flow control cone, the poppet, the spring, and the internal housing, wherein the adapter cover further includes a substantially cylindrically-shaped outer wall portion and a flange comprising a plurality of holes for fastening the flange of the cover to the flange of the base portion.

The disclosure also provides an automobile including a fuel tank having an inlet pipe and further comprising the coupling described above wherein the vapor tube is in effective fluid contact with the headspace above the fuel in the fuel tank and wherein the first end portion of the central bore portion is in effective fluid contact with the inlet pipe.

The disclosure also provides a fuel transfer coupling for attachment to a source of fuel to be delivered to a vehicle's fuel tank which comprises a base portion which comprises a raised surface and which comprises a central conduit portion having a top end portion and a bottom end portion, wherein the central conduit portion is surrounded by a shrouding enclosure, wherein the shrouding enclosure includes a vapor tube and wherein the shrouding enclosure is in fluid communication with a plurality of holes disposed on the raised surface, thus providing fluid communication between the holes and the vapor tube. The base portion further includes a flange disposed about its periphery, the flange including a plurality of holes in its surface. There is a boss centrally located within the central conduit portion, that receives and rigidly holds in place a fastener means. There is a spring disposed about the top end portion of the central conduit portion. There is a collar/seal ring assembly which itself comprises:

i) a moveable collar shaped substantially in the form of a cylindrical sleeve having a top portion, a bottom portion, and a circumferential wall and comprising a plurality of slots in its wall; and ii) a seal ring having a flat top surface and being disposed within the inner space defined by the wall of the moveable collar, being held in position therein by means of a plurality of equatorially-located protrusions extending from the seal ring into the plurality of slots on the moveable collar, the plurality of slots further including springs for mechanically biasing the seal ring in a direction towards the top portion of the moveable collar in which it is disposed. The collar/seal ring assembly is in contact with the spring. There is also a valve center having a flat top portion and a stem portion having a tip, wherein the tip of the valve center includes a means for receiving a fastener means, wherein the means for receiving a fastener means is mechanically engaged with the fastener means in the boss. There is also an adapter cover shaped substantially in the form of a cylindrical sleeve affixed to the base portion, in which is contained the spring, the collar/seal ring assembly, and the valve center, wherein the adapter cover includes a smooth bore in its inner wall, and wherein the bottom includes a plurality of holes for fastening the cover to the flange of the base portion.

In another aspect, the present disclosure comprises a quick-detach fuel transfer coupling through which a liquid fuel may pass from a remote charging reservoir to a vehicle's on-board fuel tank which comprises an on-board portion having an inlet end and a discharge end, wherein the discharge end is in fluid communication with the inlet pipe of a vehicle's on-board fuel tank. The on-board portion comprises a substantially-cylindrically shaped first adapter portion comprising an outer wall disposed about a central bore, and the outer wall has a central axis. There is a means for permitting a liquid fuel to pass into the fuel tank via a path which is annularly disposed about the central axis. There is also a means for permitting vapor from within the fuel tank to exit the fuel tank via a path which is annularly disposed about the central axis. There is a remote portion having an inlet end and a discharge end, and the inlet end is in fluid communication with the contents of a remote charging reservoir. The remote portion comprises a substantially-cylindrically shaped second adapter portion comprising a smooth bore disposed about a central bore, and the smooth bore has a central axis. There is a means for permitting flow of a liquid fuel from the remote charging reservoir to the on-board portion upon placement of the smooth bore over the outer wall via a path which is annularly disposed about the central axis. There is a means for permitting vapor from within the fuel tank to enter the remote charging reservoir via a path which is annularly disposed about the central axis. In this aspect of the disclosure, it is preferred that the central axis of said first adapter coincides substantially with said central axis of said second adapter.

BRIEF DESCRIPTION OF THE DRAWINGS

In the annexed drawings:

FIG. 39 shows an overhead view of the assembled collar/seal ring assembly element combination of the remote portion of a fuel coupling according to one form of the disclosure;

FIG. 40a shows a top view of the valve center element of the remote portion of a fuel coupling according to one form of the disclosure;

FIG. 40B shows a bottom perspective view of the remote portion of a fuel coupling according to one form of the disclosure;

FIG. 40C shows a side elevation view of the remote portion of a fuel coupling according to one form of the disclosure;

FIG. 46a-f shows a cross sectional view of a coupling pair according to a preferred form of the disclosure, at various stages of coupling and de-coupling of the pair encountered during a typical refueling operation;

DETAILED DESCRIPTION

A fuel transfer coupling according to the present disclosure comprises an on-board portion which is in fluid contact with the gasoline tank on a motorized vehicle such as a race car, and a remote portion which is in fluid contact with a source of liquid hydrocarbon fuel that is to be delivered to the gasoline tank of the motorized vehicle. The on-board portion may be referred to as the male adapter and the remote portion of the coupling may be referred to as the female adapter, for convenience.

Figure 1:
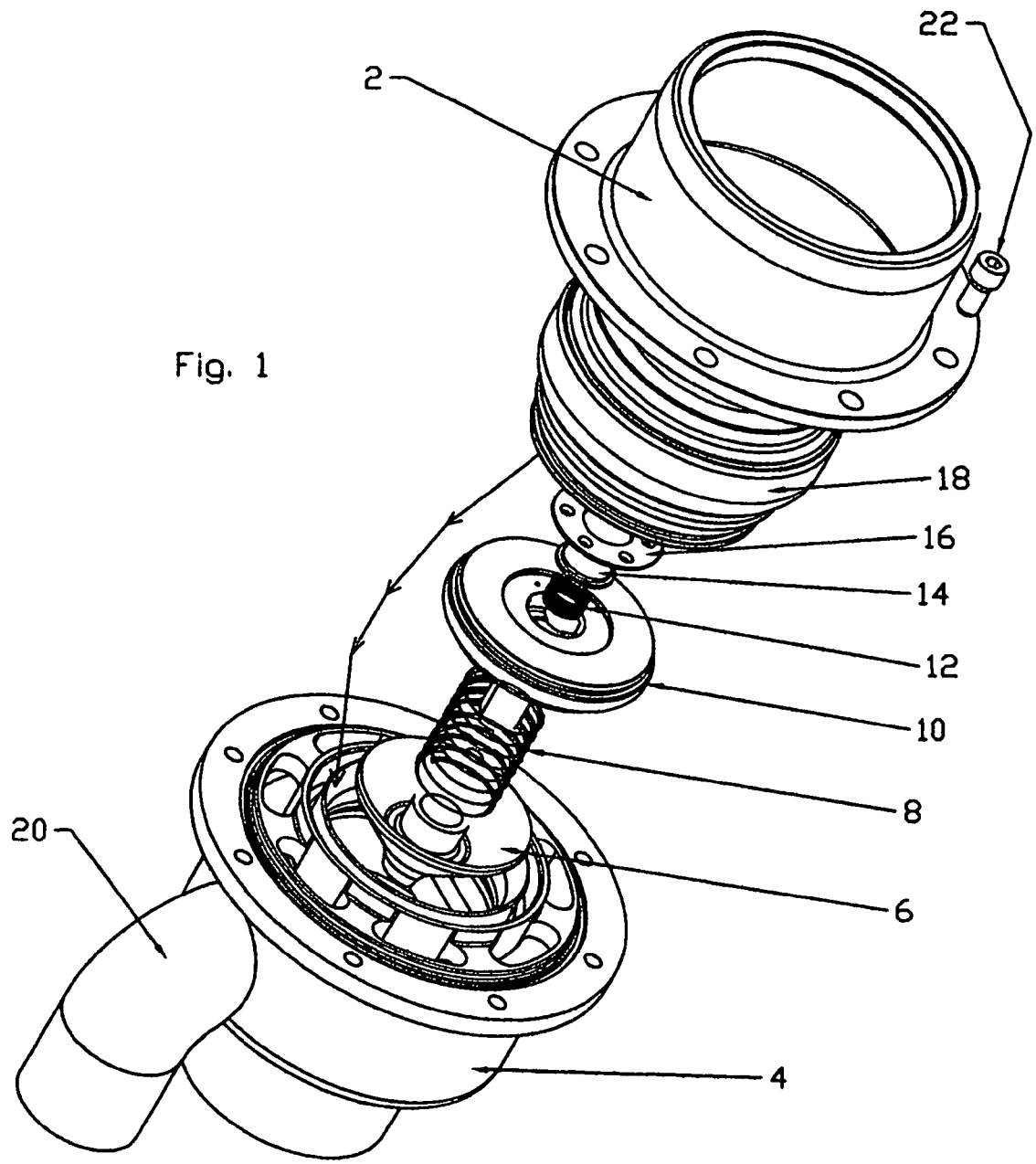
FIG. 1 shows a an exploded perspective view of the on-board portion of a fuel coupling according to one form of the disclosure.

Referring to the drawings, and initially to FIG. 1 there is shown the on-board portion of a fuel transfer coupling according to the disclosure in an exploded view, including all of its various components, which are described forthwith.

Figure 2:
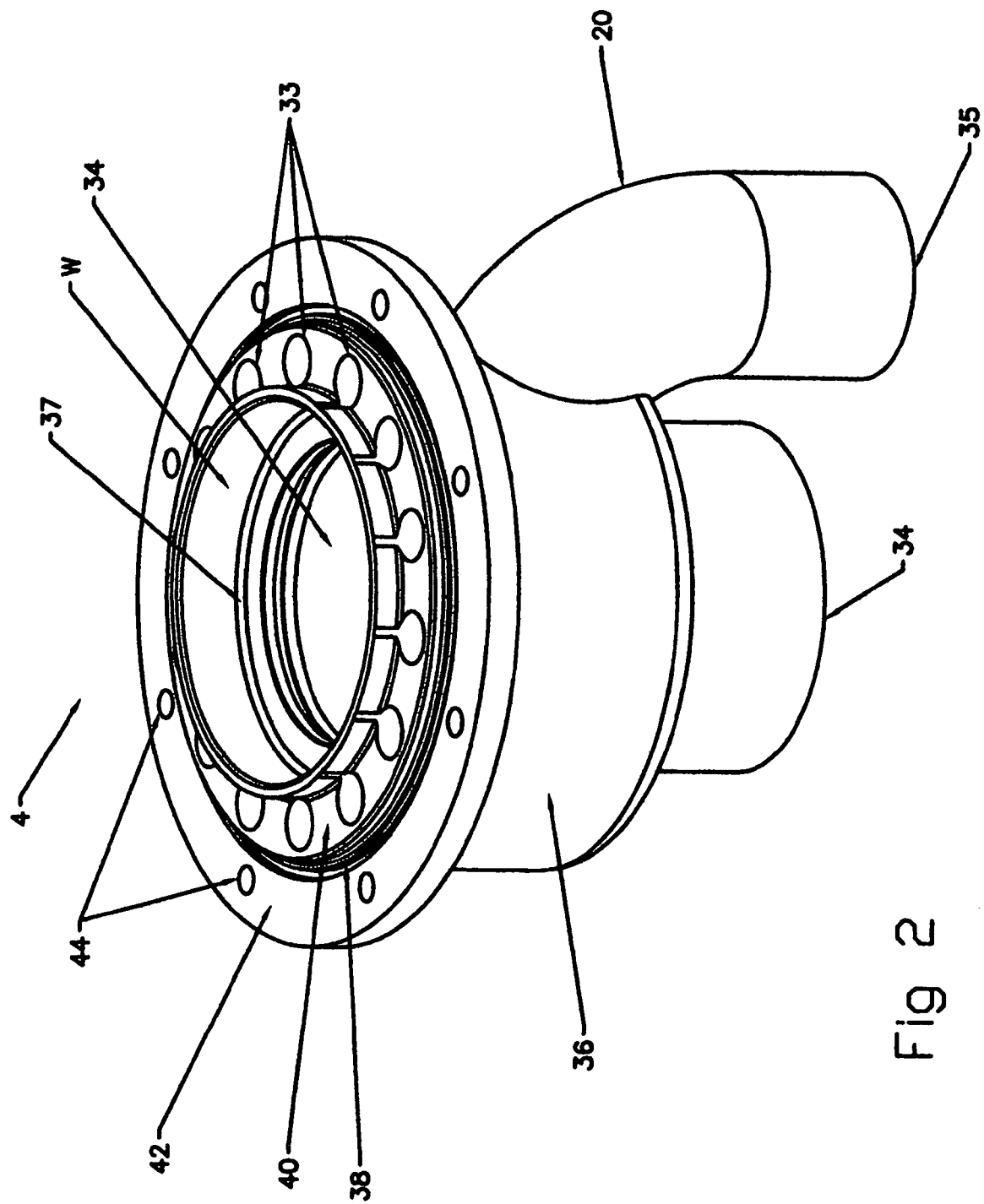
FIG. 2 shows a perspective view of the male adapter base portion of the on-board portion of a fuel coupling according to one form of the disclosure.

In FIG. 2 is shown a perspective view of the male adapter base 4. The male adapter base 4 includes a central bore 34 through which fuel is intended to flow. The central bore 34 has a first end portion which may be connected to the inlet pipe of a fuel tank, and a second end portion which extends into said adapter base and terminates at a point within the male adapter base. Disposed about the central bore 34 is a shrouding enclosure 36 which forms an envelope around the central bore portion 34 for the purpose of allowing the travel of gas or air vapor through the various holes 33 disposed in the planar top surface 40 of the male adapter base, wherein the holes 33 are in fluid contact with the outlet portion 35 of the vapor tube 20. Thus, this assembly is similar to a condenser as used in the chemical arts, which consists of a tube having a water jacket about it, with an inlet and outlet for the cooling water, and a tube disposed therethrough which the vapor to be condensed is caused to pass. In the present instance, the central bore 34 is surrounded by the shrouding enclosure 36, which has as its "inlet", the various holes 33, and which has as its "outlet", the vapor tube 20. There is a planar flange portion 42 having a plurality of holes 44 disposed through it along its periphery for the purpose of fastening the male adapter base to other components of this portion of the coupling. The plane of the flange portion 42 is slightly below the plane of the top surface 40, and at the point of intersection of these two features there is thus caused to exist an elevation 38, upon which an o-ring seal may be mounted for sealing the surfaces in the finished assembly. There is a circumferential ledge 37 onto which a flow cone 58 is mounted, as is described later herein. The wall W of the bore above the circumferential ledge 37 is also shown.

Figure 3:
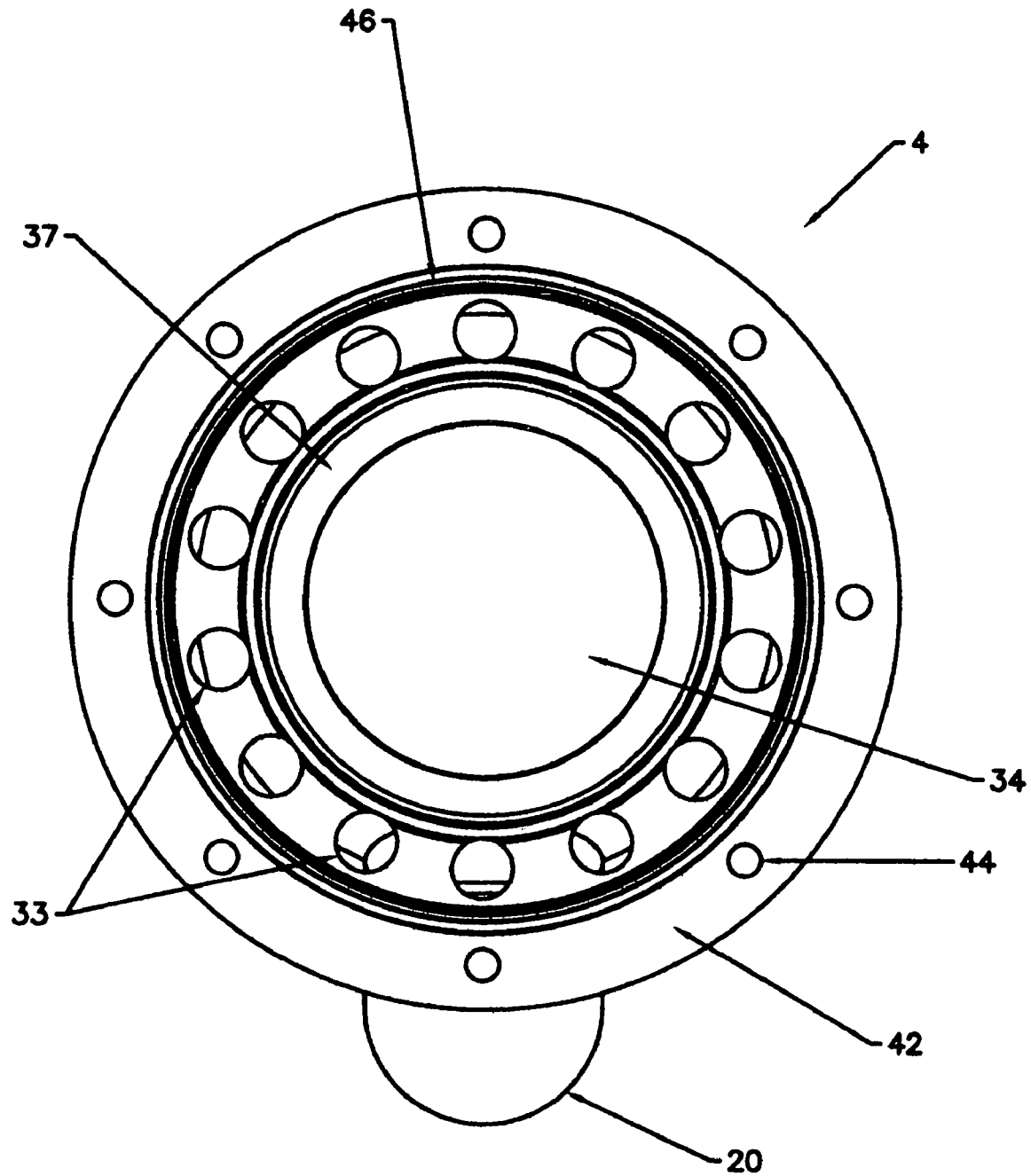
FIG. 3 shows an overhead view of the male adapter base portion of the on-board portion of a fuel coupling according to one form of the disclosure.

In FIG. 3 is shown an overhead view of the male adapter base 4, including the central bore 34 flange 42, holes 44, vapor tube 20, holes 33, circumferential ledge 37, and o-ring seal 46 in its location at the elevation at 38 as shown in FIG. 2.

Figure 4:
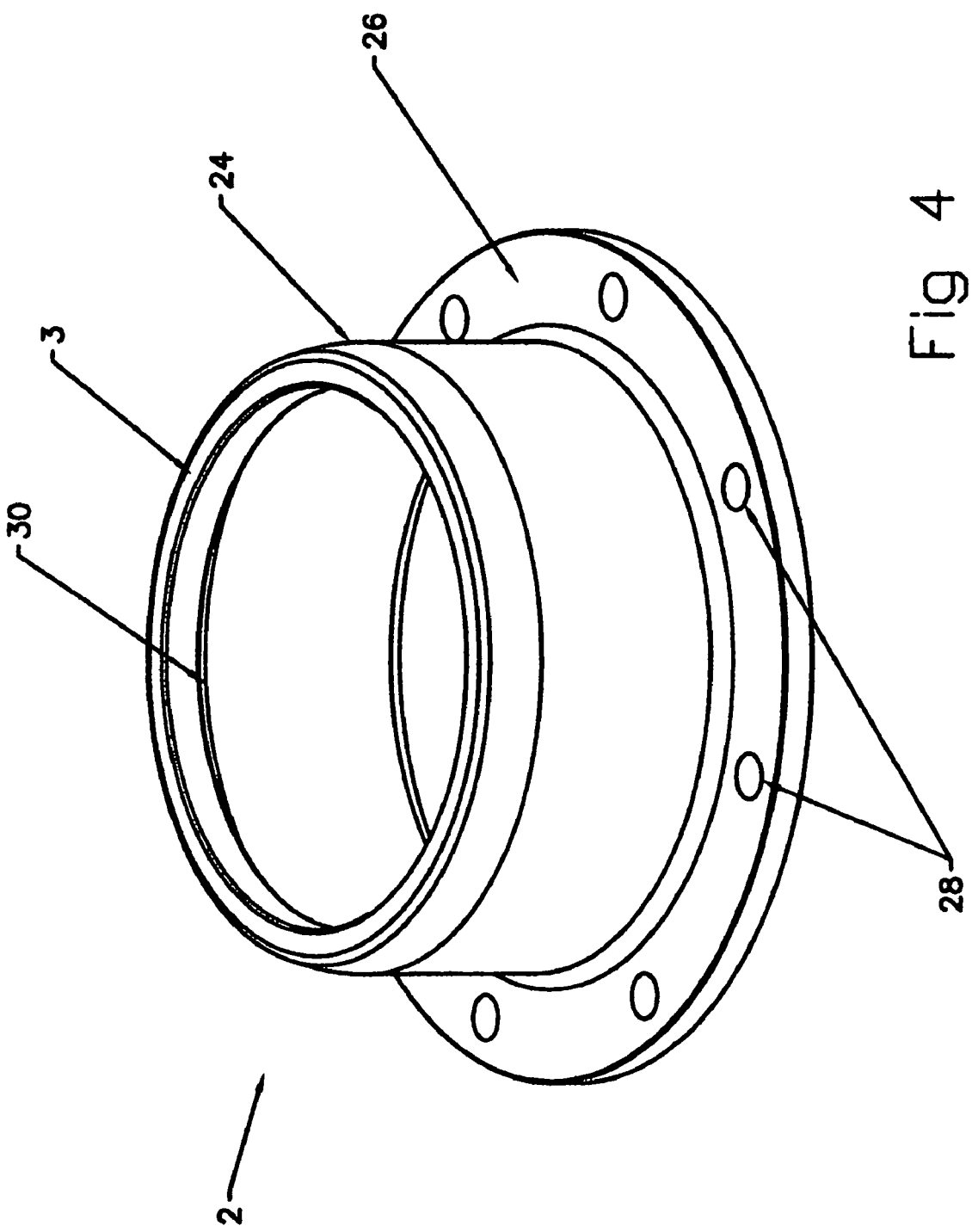
FIG. 4 shows a perspective view of the male adapter cover of the on-board portion of a fuel coupling according to one form of the disclosure.

FIG. 4 shows a perspective view of the male adapter cover 2, having an outer wall 24, top surface 3, and flange portion 26, wherein the flange portion 26 includes a plurality of holes 28 disposed along its periphery for connection to the male adapter base 4 once all of the components have been properly assembled, using conventional fasteners. There is also a beveled edge 30, which is shown in FIG. 6 as well.

Figure 5:
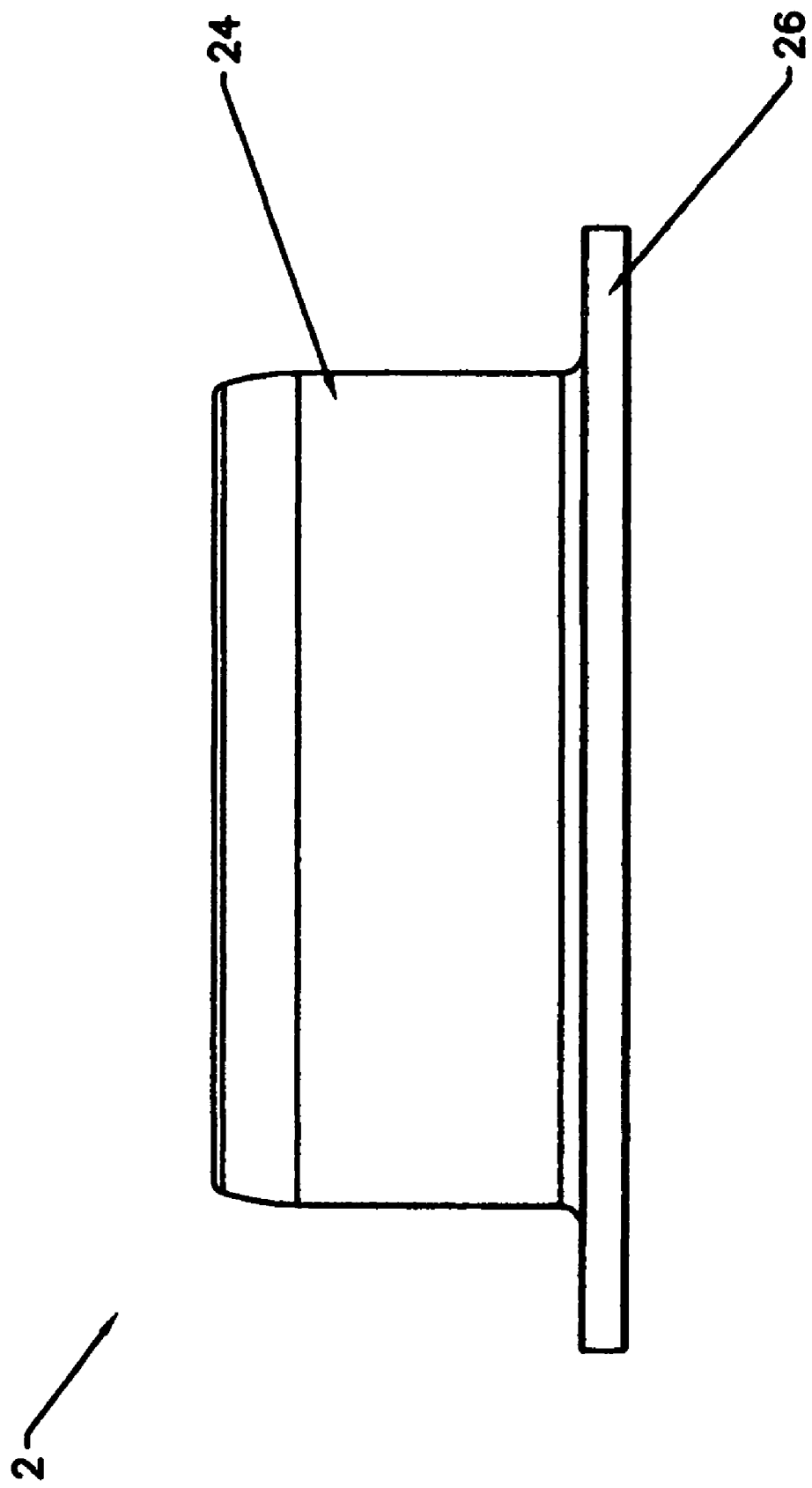
FIG. 5 shows a side elevation view of the male adapter cover of the on-board portion of a fuel coupling according to one form of the disclosure.

FIG. 5 shows a side elevation view of the male adapter cover 2, including outer wall 24 and flange 26.

Figure 6:
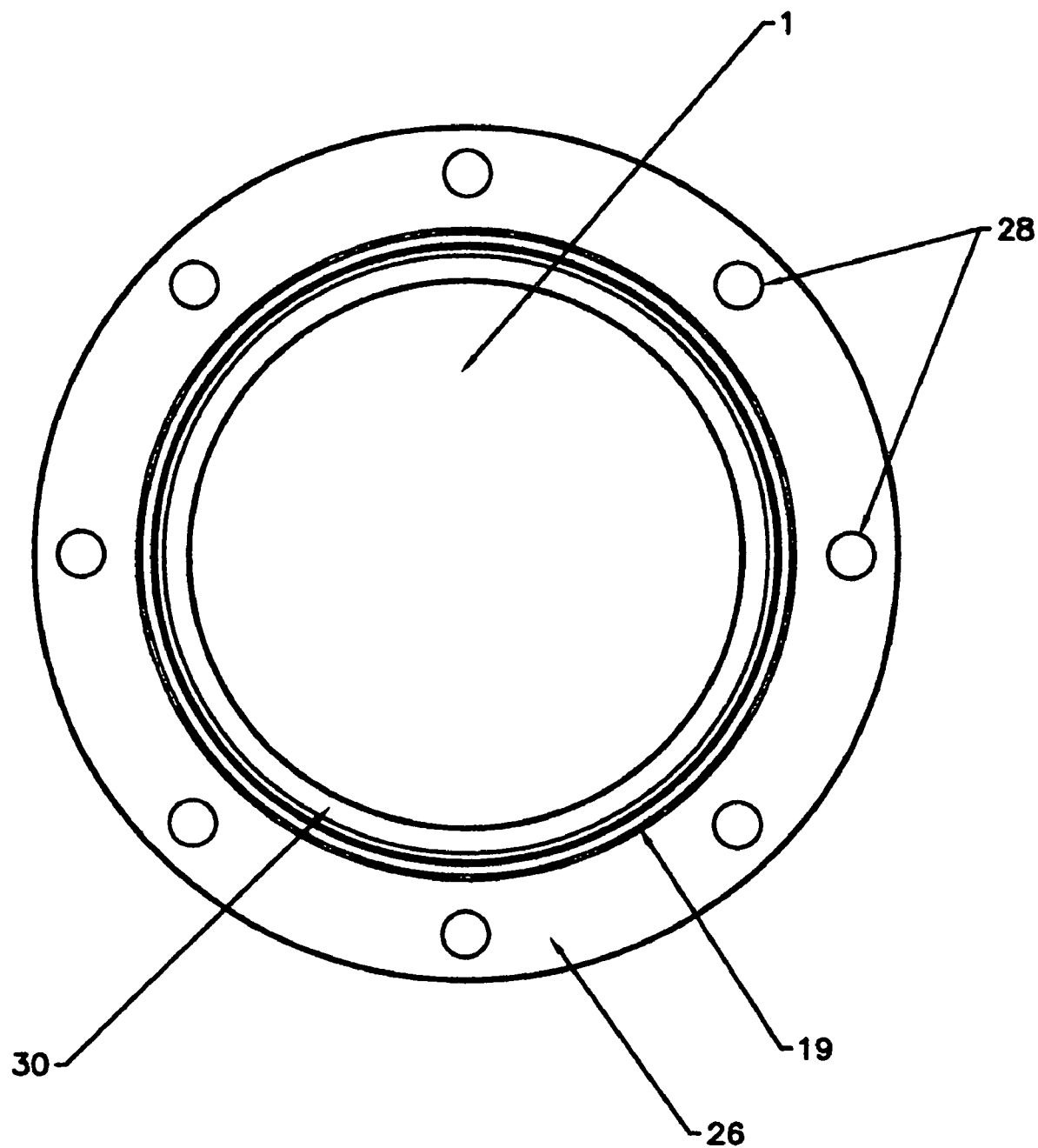
FIG. 6 shows a bottom view of the male adapter cover of the on-board portion of a fuel coupling according to one form of the disclosure.

FIG. 6 shows a bottom view of the male adapter cover 2, including its flange 26, plurality of holes 28, annular groove 19 which extends about the hole 1 adjacent to the flange 26 and receives the o-ring seal 46 in a sealing relationship in the completed assembly. There is also a beveled edge 30.

Figure 7:
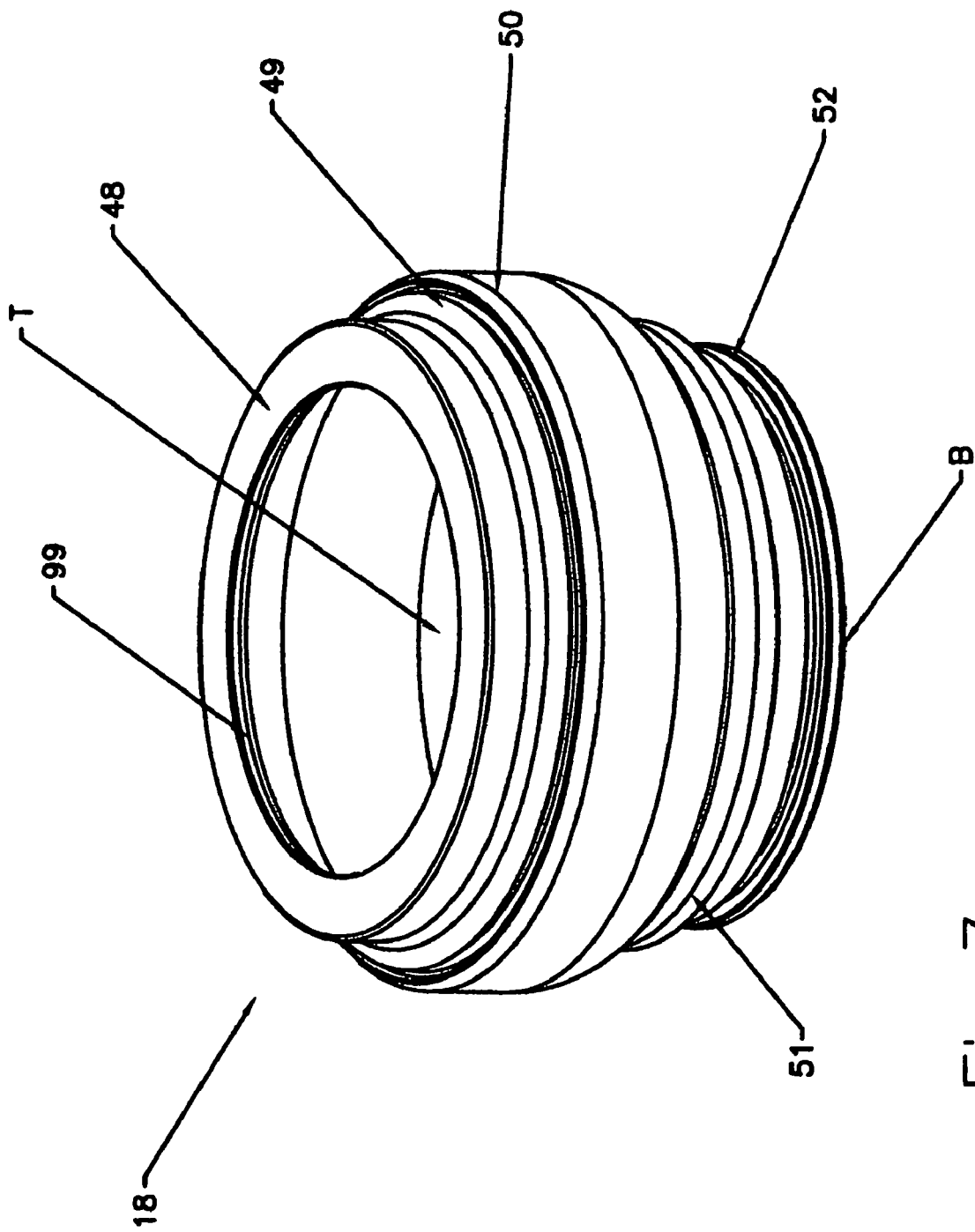
FIG. 7 shows a perspective view of the internal housing portion of an on-board portion of a fuel coupling according to one form of the disclosure.

FIG. 7 shows the internal housing 18, which is reminiscent of a hollow shell having an open top portion T and an open bottom portion B, and a hollow interior space within the confines of its walls. There is a flat top surface 48, a sloping shoulder portion 49 which includes an o-ring seal 50, which o-ring seal 5 is disposed to seal between the sloping shoulder 49 and the beveled edge 30 from FIGS. 4 and 6 previously. There is also an o-ring seal 52 disposed along the bottom skirt portion 51 as well, for sealing the skirt portion 51 against the wall portion W of the bore in FIG. 2. Thus, the skirt portion 51 of the internal housing 18 is slidably disposed within a circumferential slot which is defined by the wall W that is adjacent to the circumferential ledge 37 and the wall portion 64 of the flow control cone 6 when the flow control cone is in its position on the circumferential ledge 37. The skirt portion 51 provides a travel stop against planar top surface 40.

Figure 8:
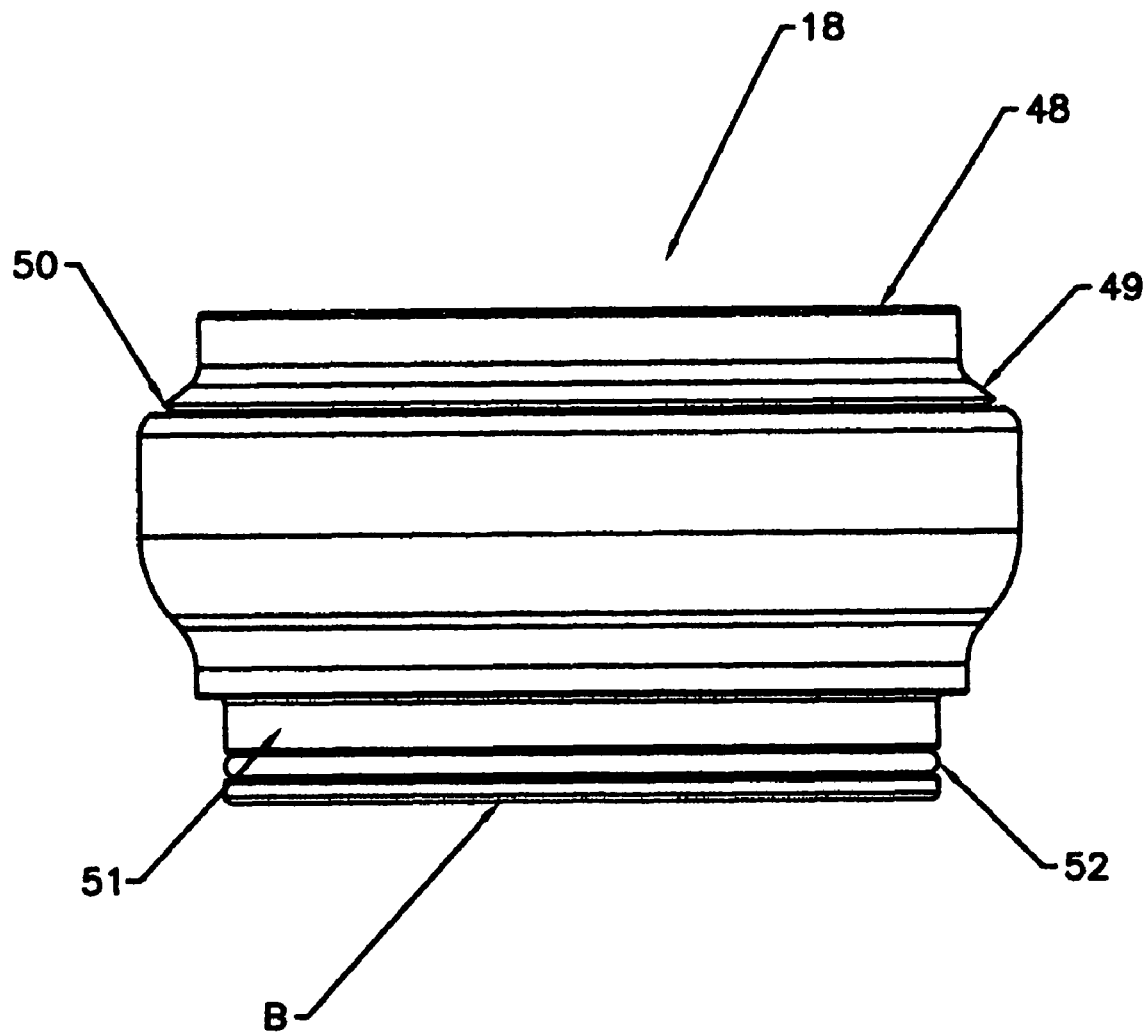
FIG. 8 shows a side elevation view of the internal housing portion of an on-board portion of a fuel coupling according to one form of the disclosure.

FIG. 8 shows a side elevation view of the internal housing 18 and depicts the locations of the top surface 48, sloping shoulder 49, o-ring seal 50, skirt 51, and o-ring seal 52.

Figure 9:
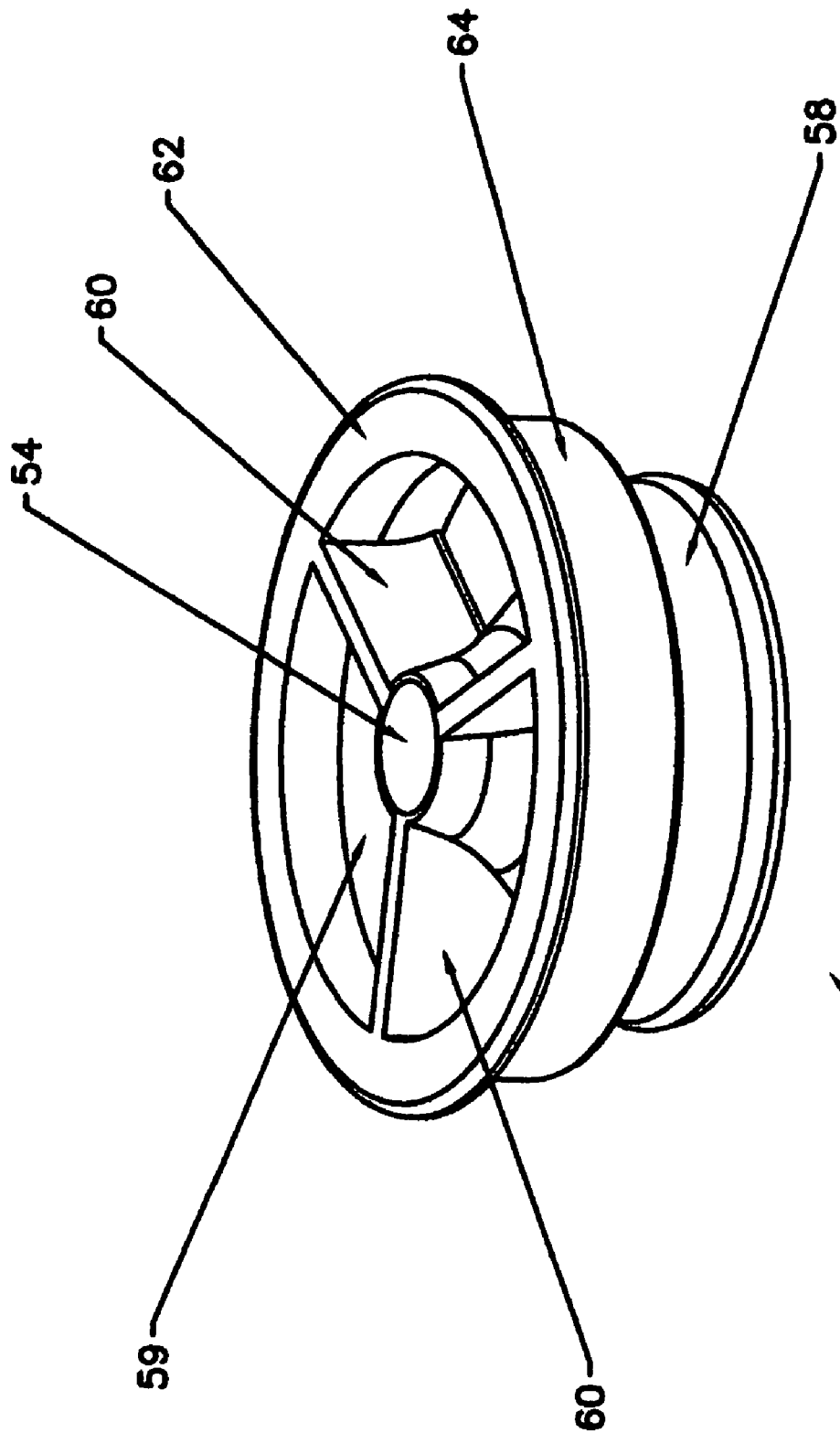
FIG. 9 shows a perspective view of a flow control cone element of an on-board portion of a fuel coupling according to one form of the disclosure.

FIG. 9 shows a perspective view of the flow control cone 6 component. The flow control cone 6 includes a funnel-shaped cone element 58, which is held rigidly in place in the center of an outer ring 62 (which has a wall portion 64) by means of cone supports 60 which are welded or otherwise attached by known conventional means, such as integral casting, etc., to the cone and inner portion of the wall portion 64 of the outer ring 62. There is also a poppet guide bore 54 disposed at the apex of the cone, and a space 59 disposed between the cone 58 and the outer ring 62.

Figure 10:
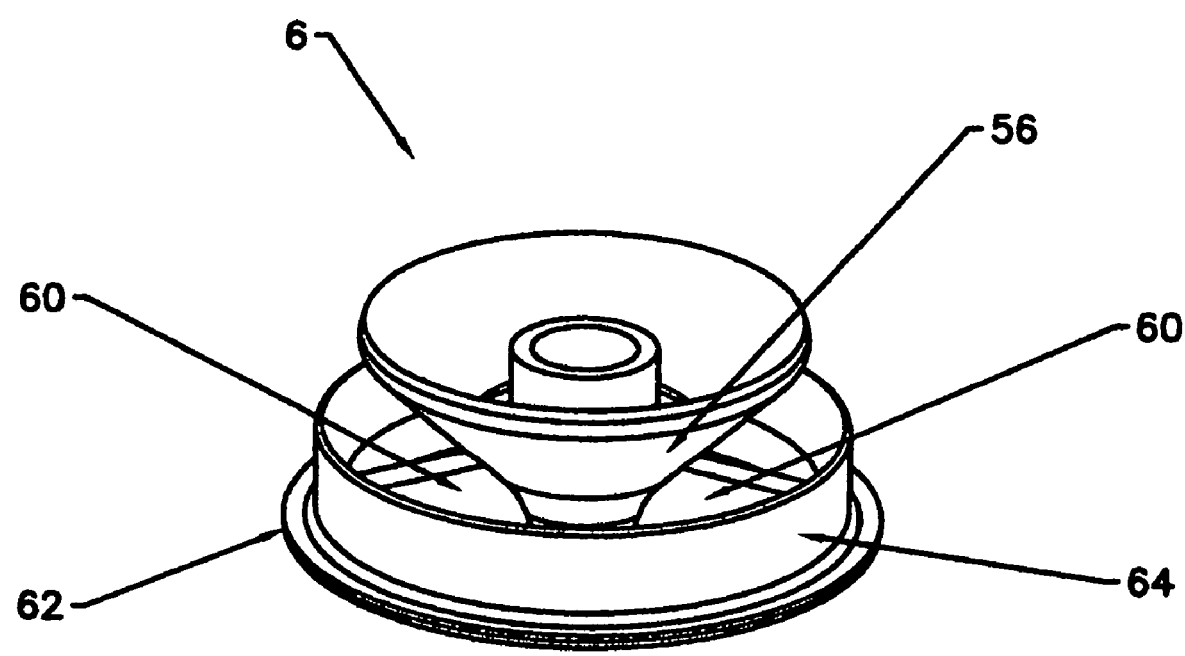
FIG. 10 shows a side-elevation view of a flow control cone element of an on-board portion of a fuel coupling according to one form of the disclosure.

FIG. 10 is a side elevation view of the flow control cone 6 showing the cone 58, wall portion 64, and the outer ring 62. The cone supports 60 are also shown.

Figure 11:
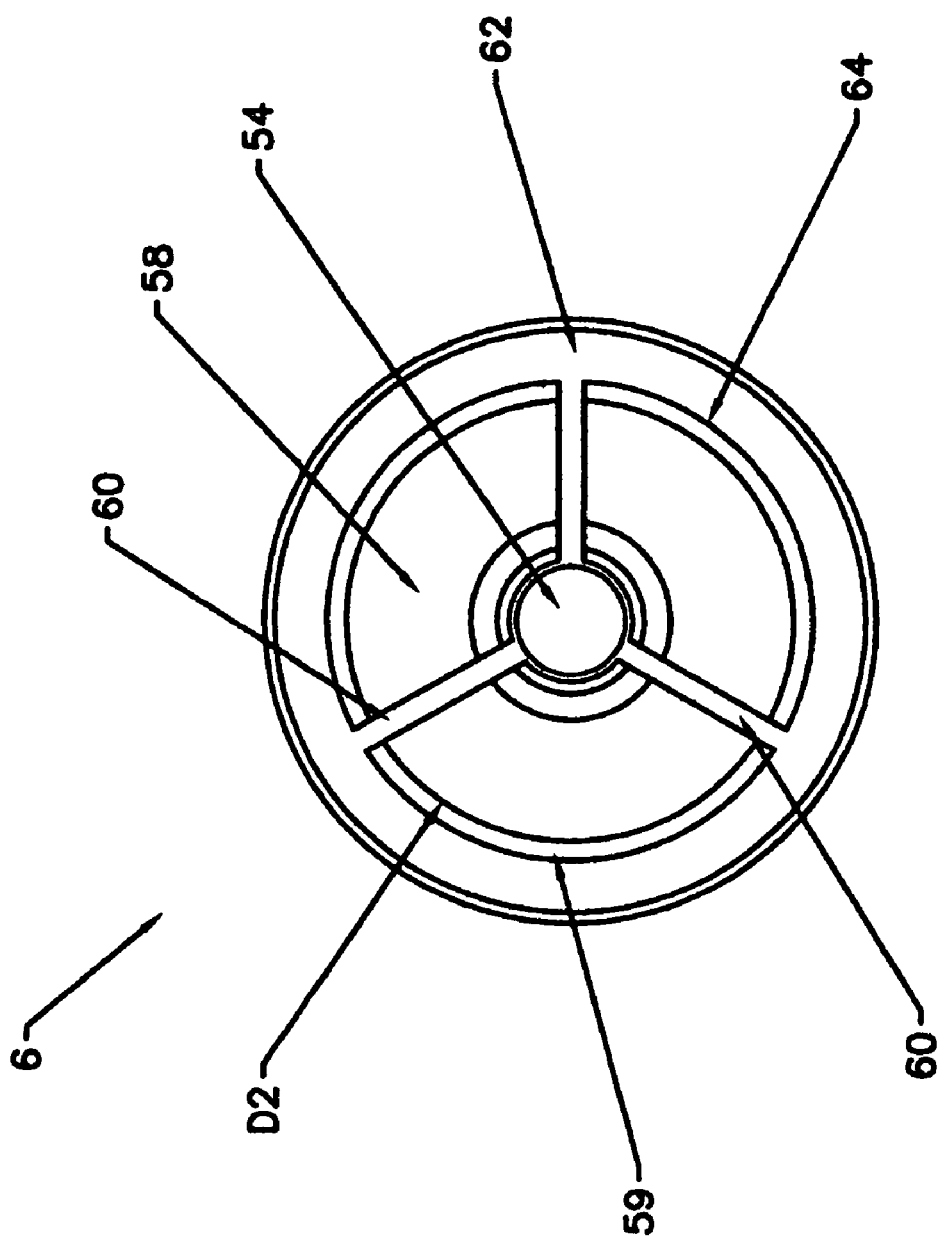
FIG. 11 shows an overhead view of a flow control cone element of an on-board portion of a fuel coupling according to one form of the disclosure.

FIG. 11 shows a bottom view of the flow control cone 6 showing the poppet guide bore 54, wall portion 64, outer ring 62, cone supports 60, space 59, and cone 58. The diameter of the wall portion is slightly less than that of the internal diameter of the bottom portion B of the internal housing 18 shown in FIG. 7, which enables the skirt portion 51 of the internal housing to reside atop the outer ring 62 of the flow control cone 6 after the flow control cone 6 has been placed in position on the circumferential ledge 37 of FIG. 2.

Figure 12:
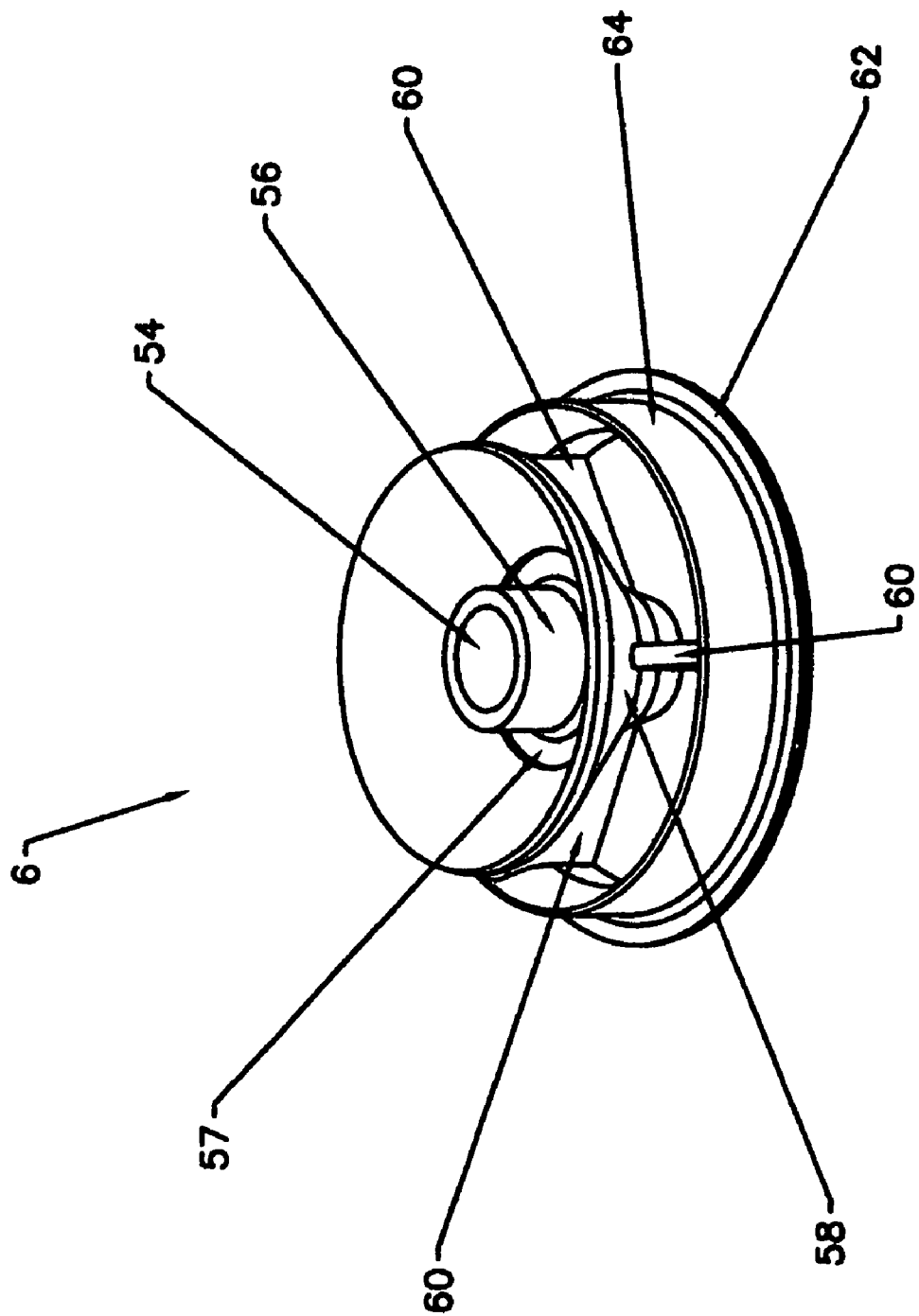
FIG. 12 shows a perspective view of the bottom side of a flow control cone element of an on-board portion of a fuel coupling according to one form of the disclosure.

FIG. 12 shows a perspective view of the top of the flow control cone 6 including the poppet guide bore 54 having an outer wall 56. There is a flat portion 57 which serves as the seat for the poppet spring 8 (FIG. 1). Also shown is cone 58, cone supports 60, outer ring 62, and wall portion 64.

Figures 13A, 13B:
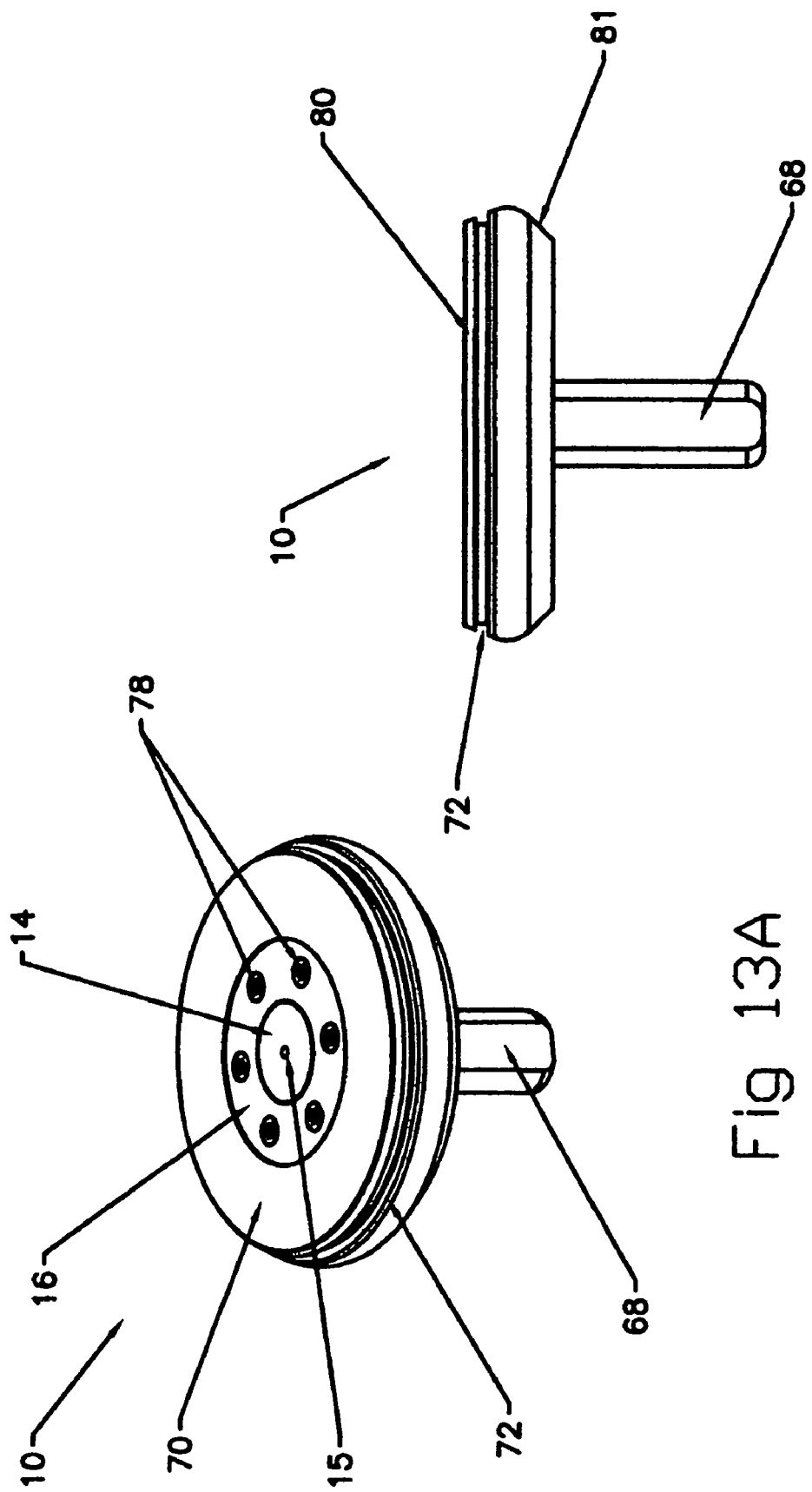
FIG. 13a shows a perspective view of the upper portion of a poppet element of an on-board portion of a fuel coupling according to one form of the disclosure.
FIG. 13b shows a side elevation view of the upper portion of a poppet element of an on-board portion of a fuel coupling according to one form of the disclosure.

FIG. 13A shows a perspective view of the upper portion of the poppet 10 which includes a flat top surface 70, and an o-ring seal 72 disposed on the upper shoulder 80 (FIG. 13B). There is a poppet stem 68 which is preferably of a tri-lobe cross-section as later shown. There is a vent disc 14 disposed in a recess in the face of the flat top surface 70, which is held in place by retainer ring 16, which retainer ring 16 is held in position by means of machine screws threaded through the flat top surface. The vent disc 14 in one embodiment includes a hole 15 that passes through the vent disc. The spring 12 mechanically biases the disc 14 onto its seat. According to an alternate form of the disclosure, the hole 15 may be disposed through the wall of the male adapter cover 2.

FIG. 13B is a side elevation view of the poppet 10, showing the upper shoulder 80 of the poppet 10, lower shoulder 81 of the poppet 10, o-ring seal 72, and poppet stem 68.

Figure 14:
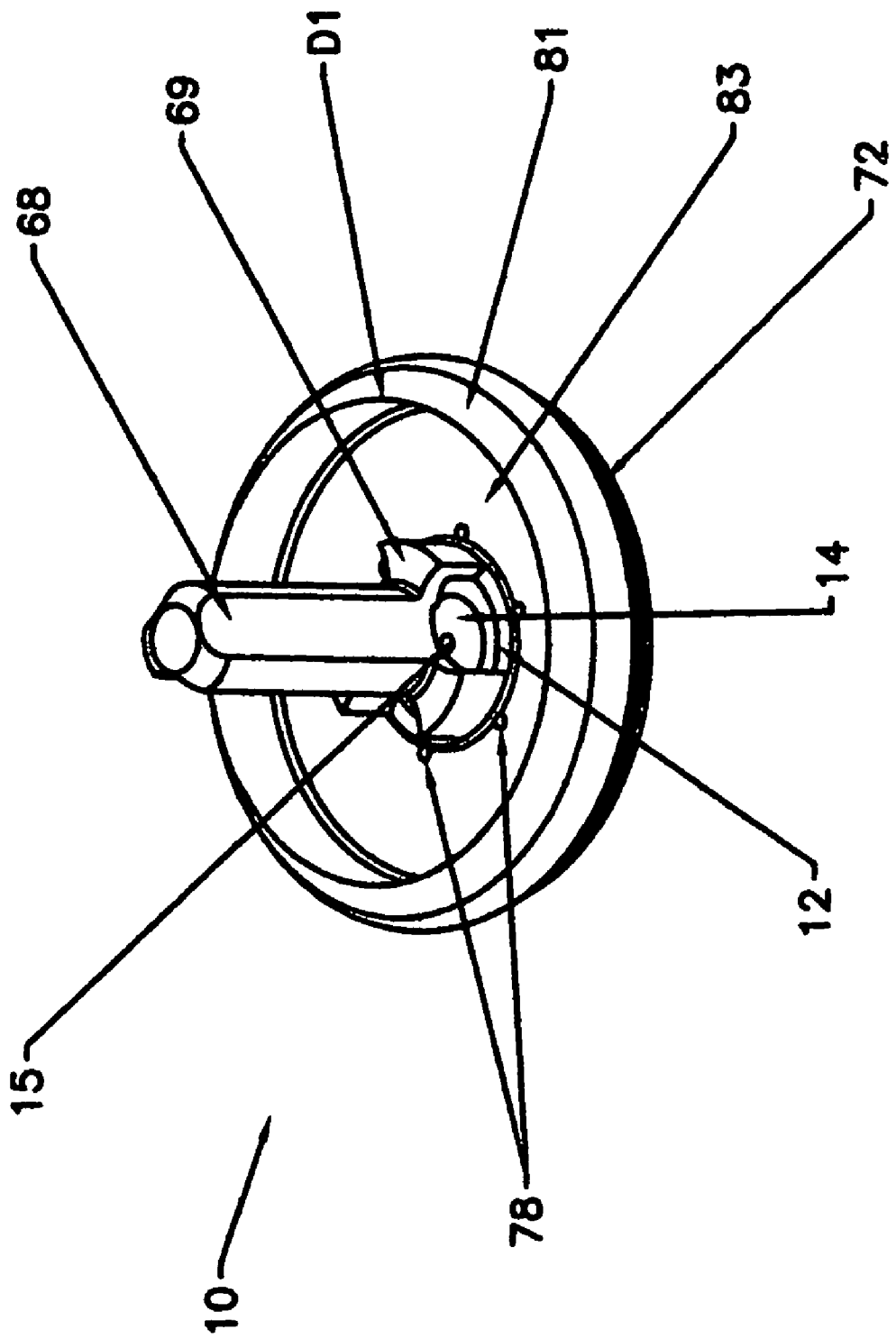
FIG. 14 shows a perspective view of the bottom side of a poppet element of an on-board portion of a fuel coupling according to one form of the disclosure.

FIG. 14 shows a perspective view of the underside of the poppet 10 which includes the lower shoulder 81, flat bottom surface 83, o-ring seal 72, vent disc 14 having hole 15, spring 12, machine screw bottoms 78, poppet stem 68, and stem supports 69. The spring 12 is disposed between the vent disc 14 and the poppet stem 68 so as to maintain a mechanical bias on the vent disc 14 in a direction towards the flat top surface 70 from FIG. 13A.

Figure 15:
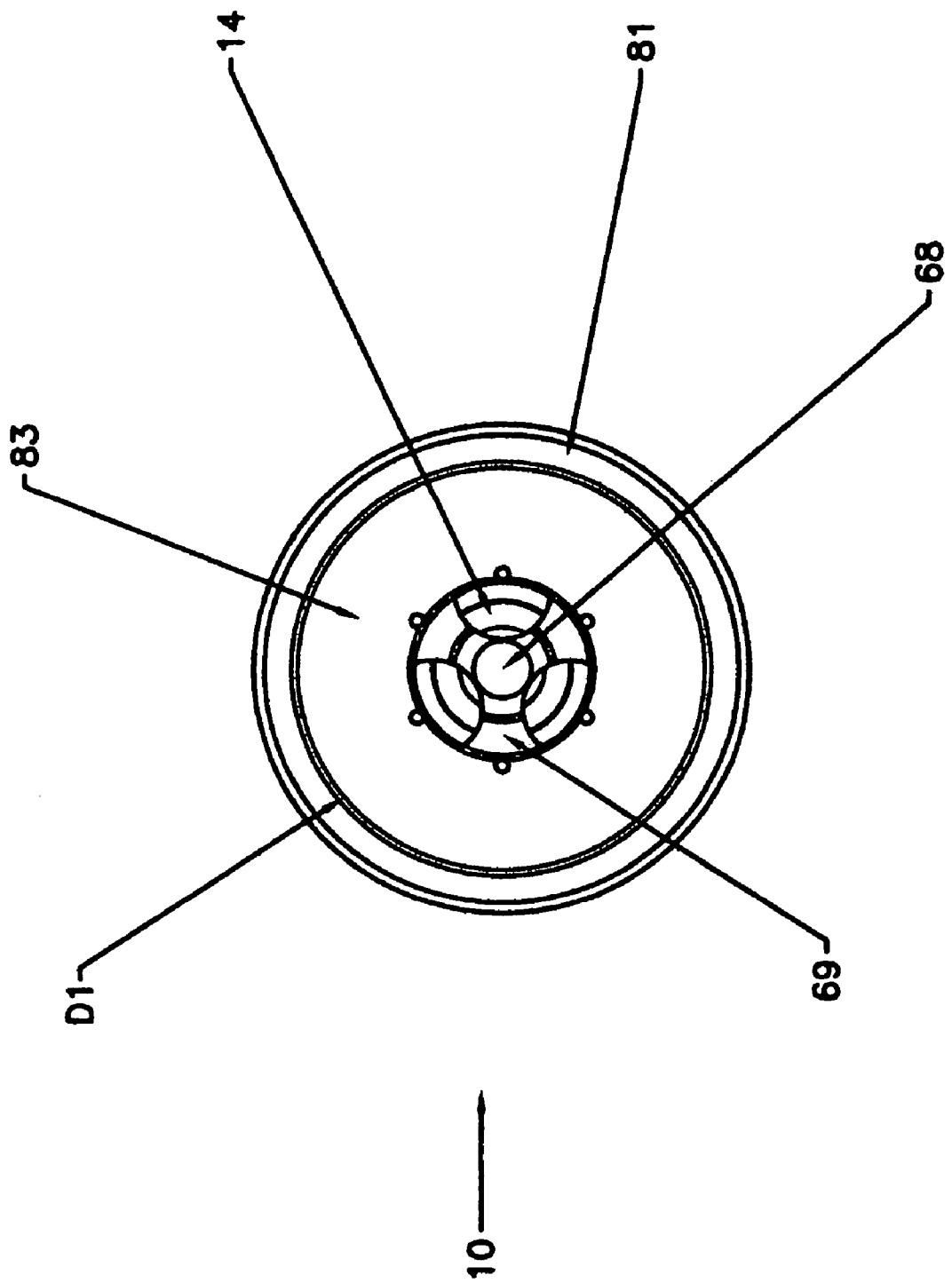
FIG. 15 shows a bottom view of a poppet element of an on-board portion of a fuel coupling according to one form of the disclosure.

FIG. 15 shows a bottom view of the poppet 10 including the stem supports 49, poppet stem 68, vent disc 14, lower shoulder 81, and flat bottom surface 83. The circle labeled D1 is of such a diameter as to be just slightly larger than the diameter D2 of the top portion of the cone 58 (FIG. 10) so that the skirt of the poppet 81 lines up with the top portion of the cone 58 to promote a smooth fuel flow. The poppet stem 68 is of such diameter as to form a snug fit which allows in and out motion of the poppet within the poppet guide bore 54.

Figure 16:
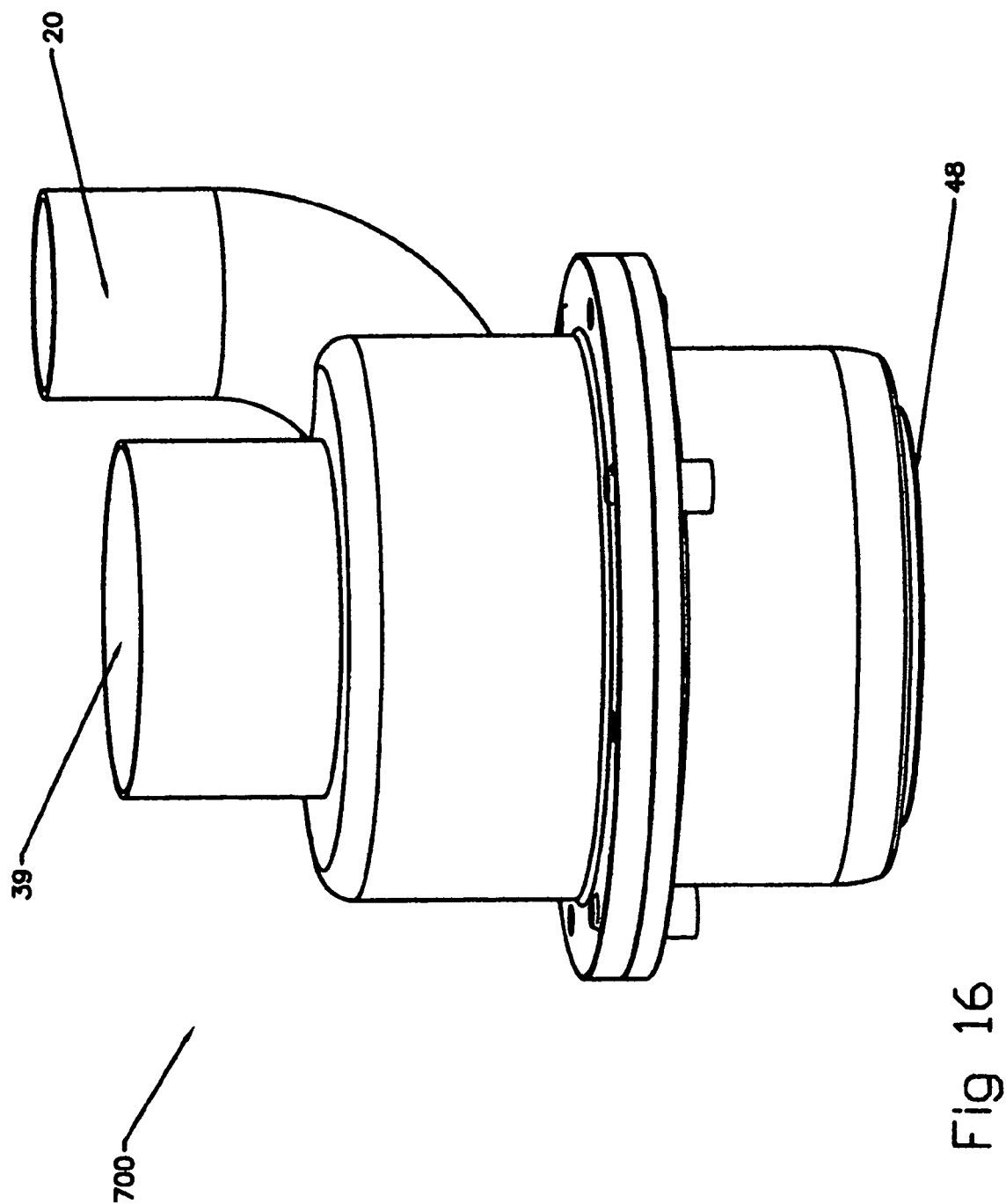
FIG. 16 shows a side view of the assembled male adapter portion ("on-board portion") of a coupling pair according to the disclosure.

FIG. 16 shows a side view of the male adapter 700 in its final assembled form, when all of the components shown in FIG. 1 and as previously described herein are contained within the male adapter cover 2 and the male adapter base in their proper design configuration. To assemble the male adapter 700, one begins by placing the male adapter base 4 on a flat surface. Next, the flow cone 6 is placed into position so that the outer ring 62 of the flow cone 6 rests on the circumferential ledge 37, so that the poppet spring seat 57 is facing upwards, as shown in FIG. 1. Next, the poppet 10 (including the spring 12, vent disc 14, and retaining ring 16) is inserted into the internal housing 18 from the bottom B (FIG. 8) so that the o-ring seal 72 contacts the inner wall of the internal housing 18 at a location on the interior of the sloping shoulder 49, which is a bevel 99 shown in FIG. 7 that extends around the inner circumference of the internal housing so as to completely contact the o-ring seal 72. Next, the poppet spring 8 is placed on the spring seat 57, and the internal housing 18 (with poppet 10 inside it) is then placed into position so that the skirt portion 51 rests atop the outer ring portion 62 of the flow control cone 6, against the pressure of the poppet spring. Finally, the male adapter cover 2 is placed over the internal housing and the fasteners are secured to connect the flanges on the male adapter cover 2 and the male adapter base 4, to provide the assembled male adapter 700 as shown in FIG. 16.

Figure 17:
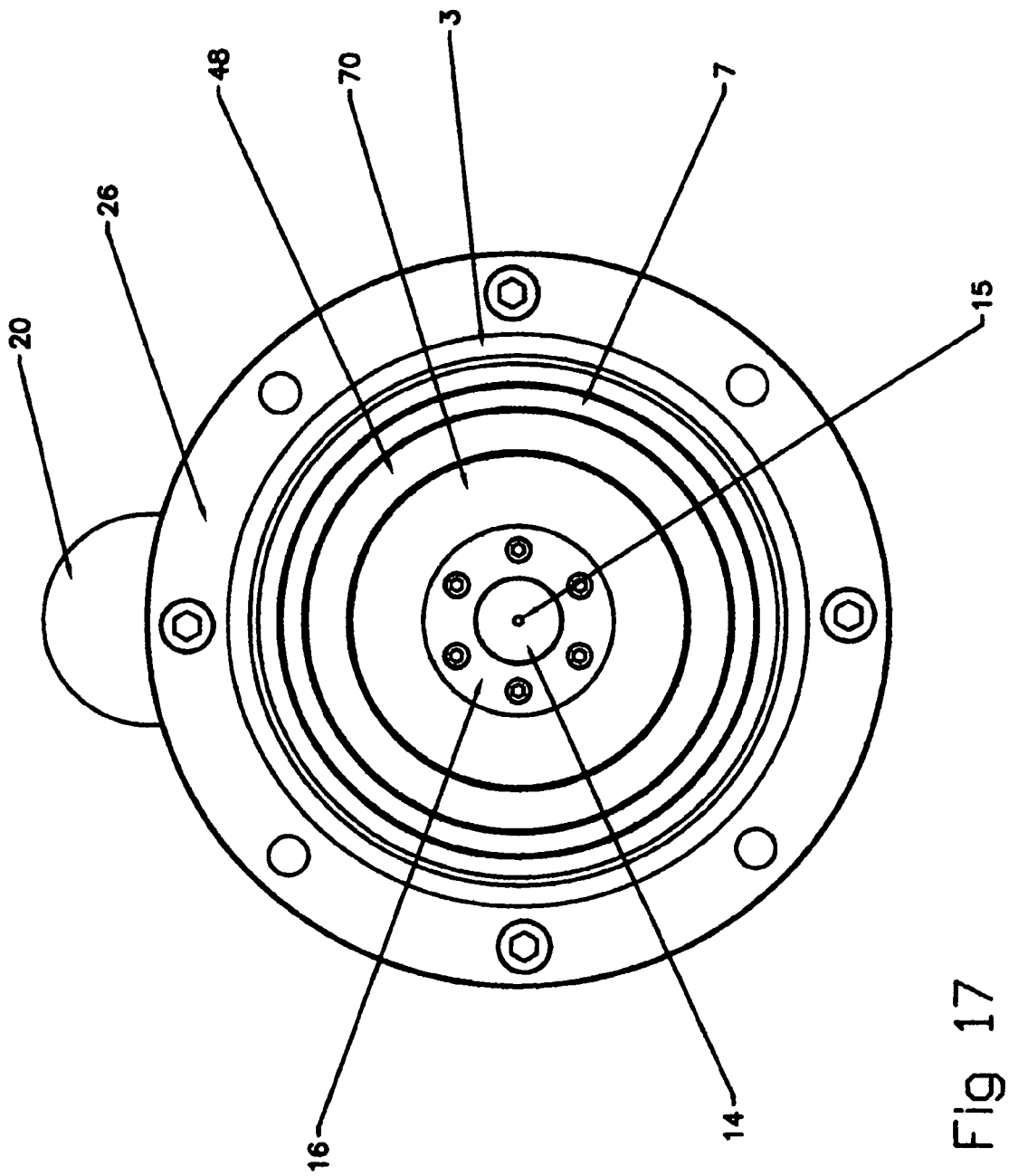
FIG. 17 shows top view of the assembled male adapter portion of a coupling pair according to the disclosure.

FIG. 17 shows a top view of the assembled male adapter 700, showing the respective positions of the vent disc 14, vent hole 15, retaining ring 16, vapor tube 20, flange 26, flat top surface 48 of the internal housing 18, flat top surface 70 of the poppet 10, top surface 3 of the male adapter cover 2 (FIG. 4), and the important gap 7 between the outer perimeter of the flat top surface 48 of the internal housing 18 and the inner perimeter of the top surface 3 of the male adapter cover 2. The gap 7 is important, as it is through this gap that air passes during a refueling operation, to allow the escape of headspace air in the fuel tank to compensate for the volume of fuel delivered during the refueling operation. As the flat top surface 70 of the poppet is depressed slightly, at first, against the pressure of the poppet spring 8, both the poppet 10 and the internal housing 18 move into the assembly as a whole, until the skirt portion 51 has bottomed out against the face 40 of the body 4. The movement of the internal housing 18 to its bottomed out position opens a space in the gap at 7 between the inner wall of the male adapter 2 and the internal housing 18 by releasing the contact between the o-ring seal 50 and the beveled edge 30. This slight depressing of the flat top surface 48 of the internal housing 18 causes a fluid connection to exist between the vapor tube 20 and the gap 7 at the top portion of the assembly where the o-ring seal 50 has separated from the beveled edge 30, through the plurality of holes 33 in the male adapter base 4.

Figure 18:
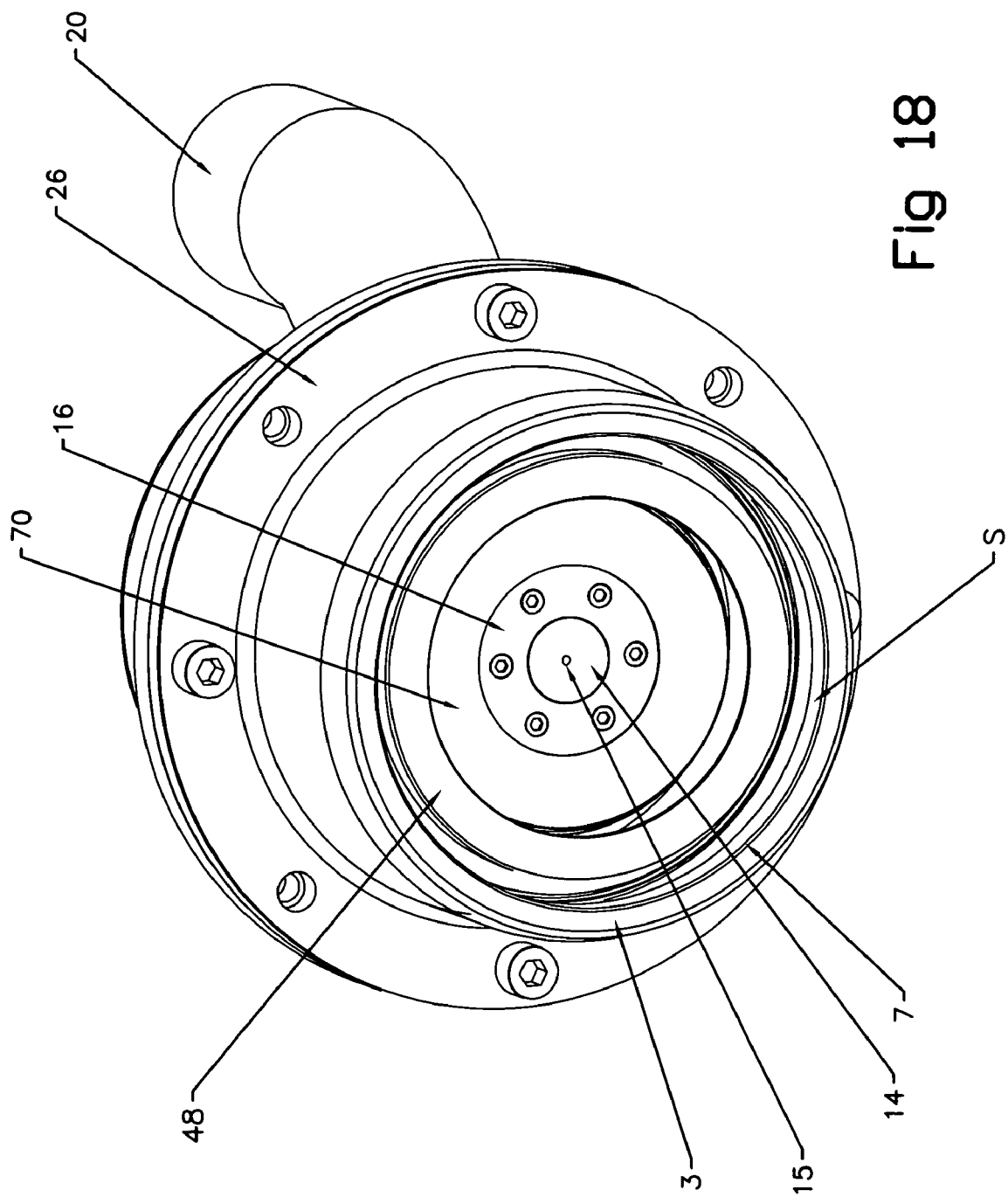
FIG. 18 shows a perspective view of the top portion of an assembled male adapter portion of a coupling pair according to the disclosure.

Further depressing of the flat top surface 70 of the poppet 10 opens a space S between the outer periphery of the top surface 70 of the poppet 10 and the internal wall of the internal housing 18, as shown in FIG. 18, thus enabling a liquid fuel to pass through the inner volume of the internal housing, through the open space 59 in the flow control cone 6 and through the central bore 34, which is connected to the inlet pipe on the vehicle's fuel tank. The vapor tube 20 is connected to a hose which is in fluid contact with the headspace gas within the fuel tank. Thus, by depressing the flat top surface 70 of the poppet 10, a fluid communication between the headspace gas in the fuel tank and the gap at 7 is first caused, and secondly a pathway is opened to the fuel tank for fuel to flow in through central bore 34, from a location at the top of the poppet in the closed condition. This is because the poppet spring 8 biases the poppet upwards; however, the poppet 10 is located within the internal housing 18 but the head of the poppet has a larger diameter than the diameter of the beveled edge 99 just beneath the top surface 48 of the internal housing 18 in which it is contained, which thus also causes the internal housing 18 to be biased upwards. The internal housing 18 is held in position within the male adapter cover 2 because the diameter of the sloping shoulder 49 of the inner housing 18 is larger than that of the beveled edge 30 in the male adapter cover. This is why the male adapter assembly 700 can only be assembled as taught herein.

Figure 19:
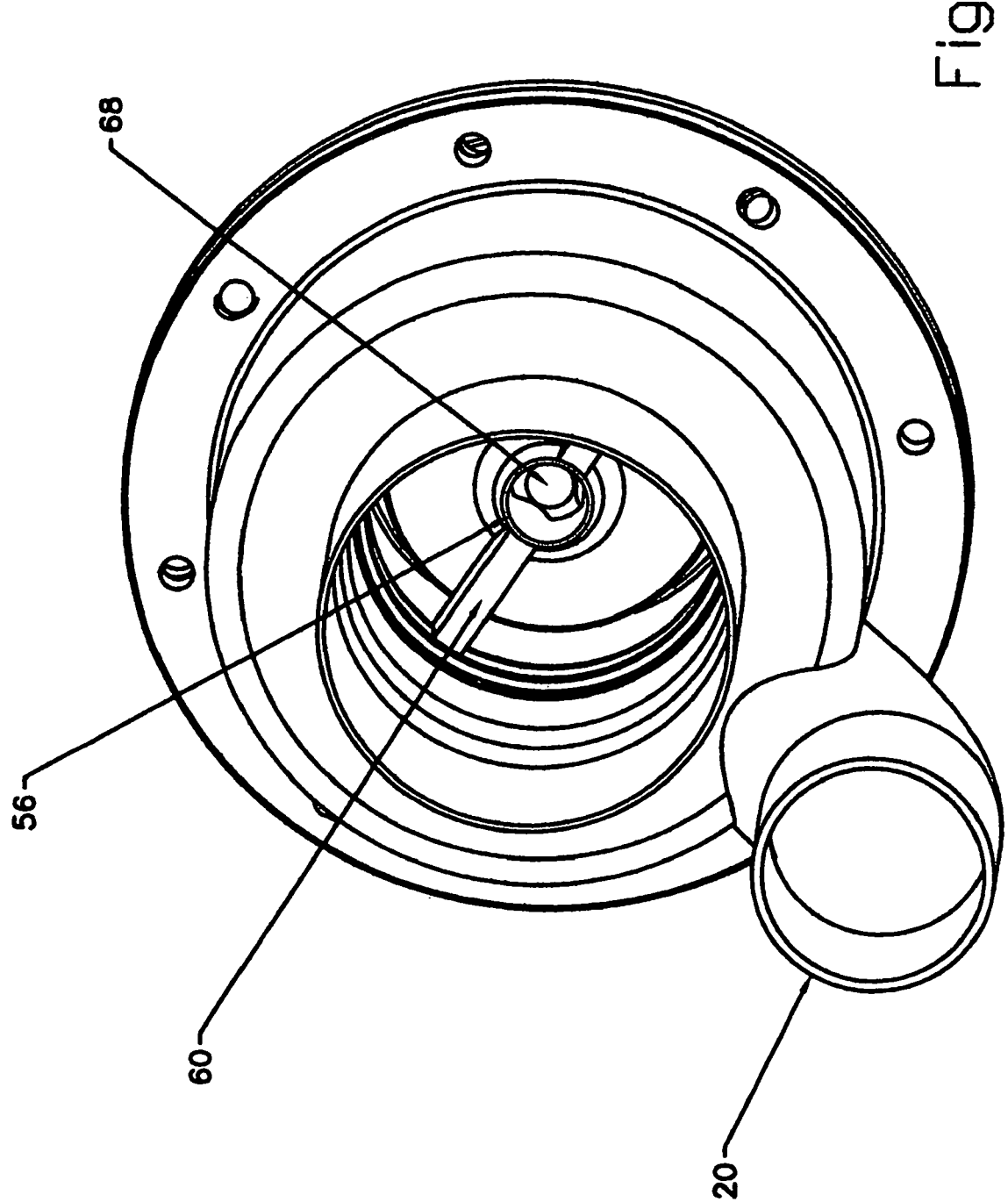
FIG. 19 shows a perspective view of the underside portion of an assembled male adapter portion of a coupling pair according to the disclosure.
Figure 20:
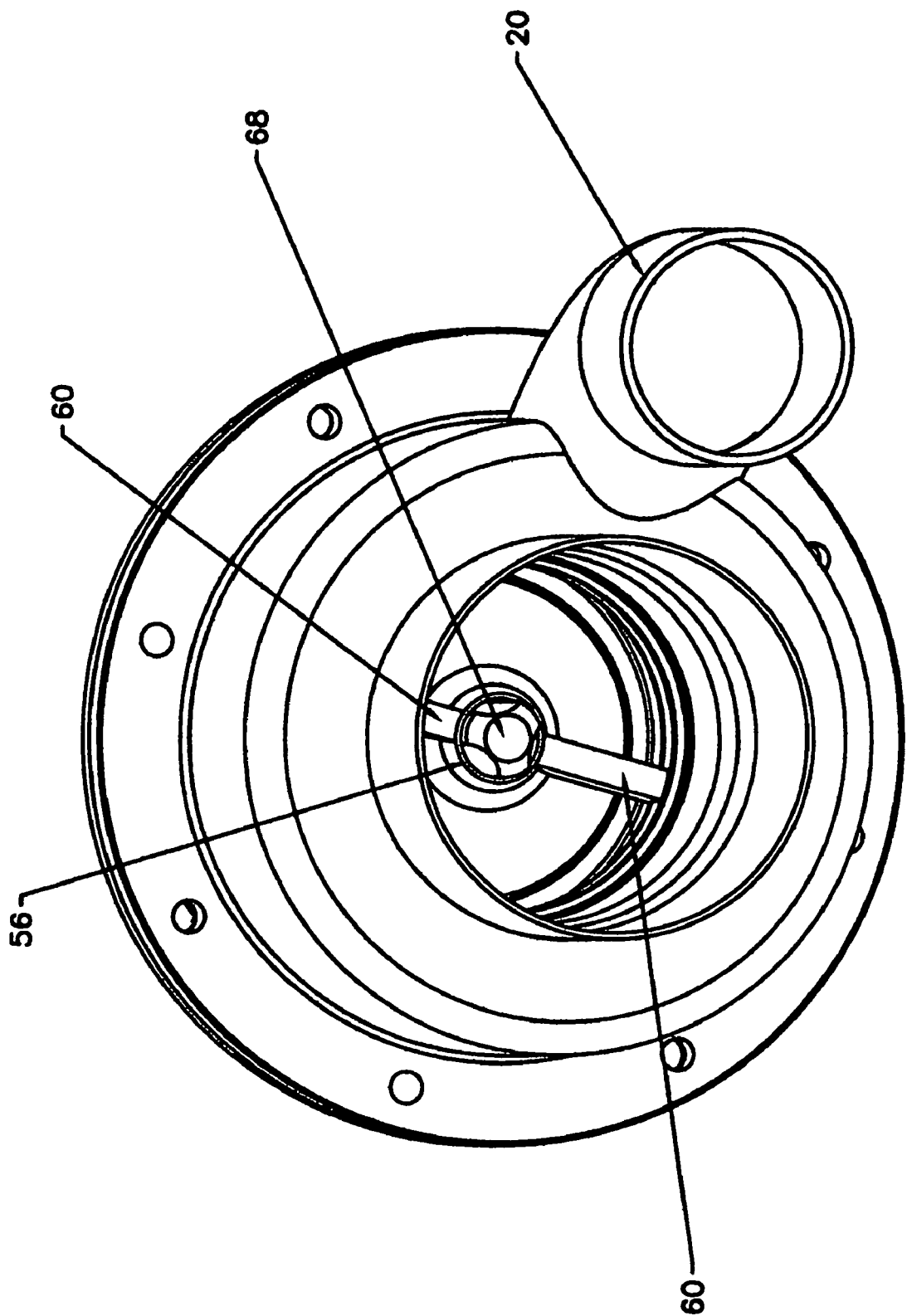
FIG. 20 shows a perspective view of the underside portion of an assembled male adapter portion of a coupling pair according to the disclosure.
Figure 21:
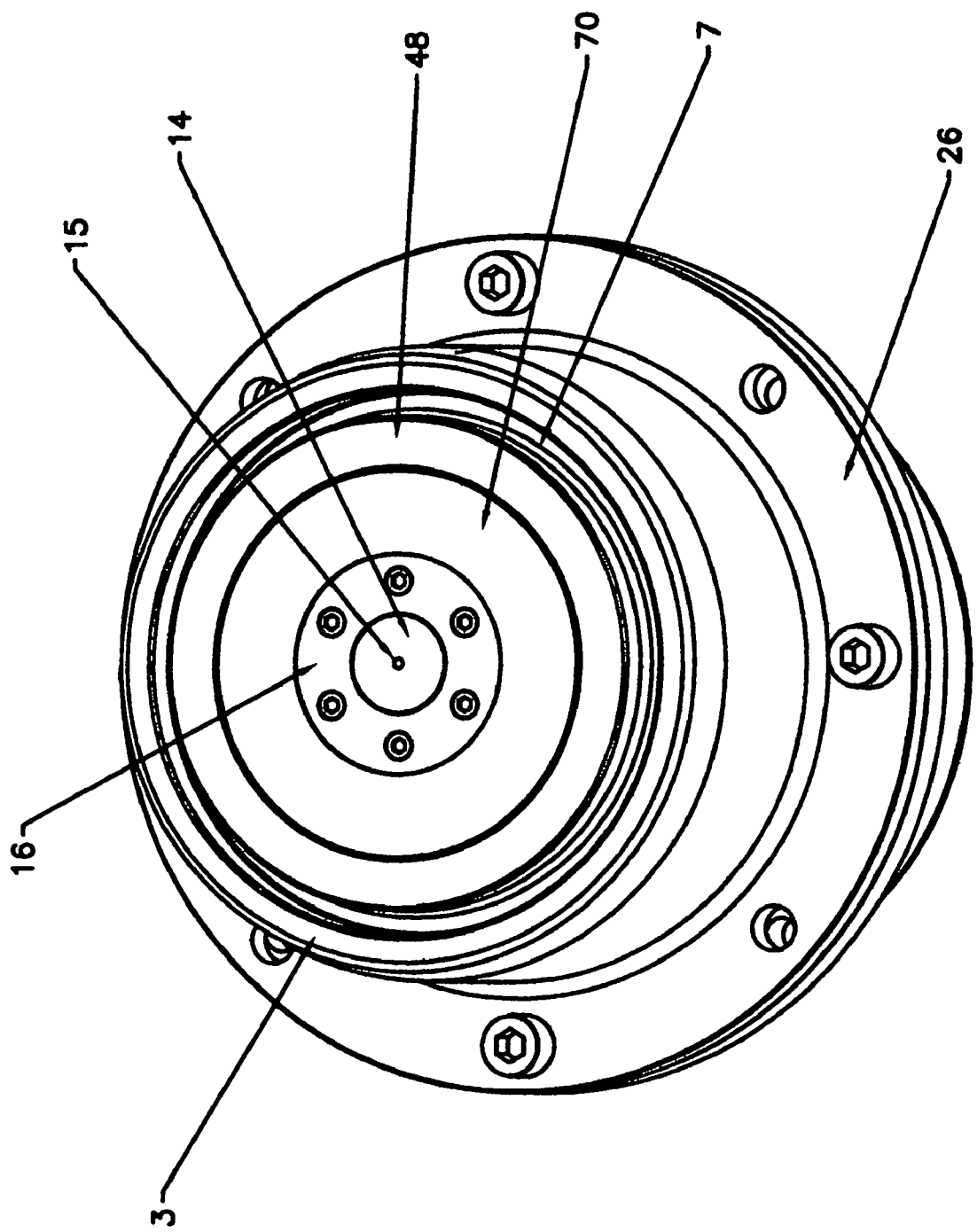
FIG. 21 shows perspective view of the top portion of an assembled male adapter portion of a coupling pair according to the disclosure.
Figure 22:
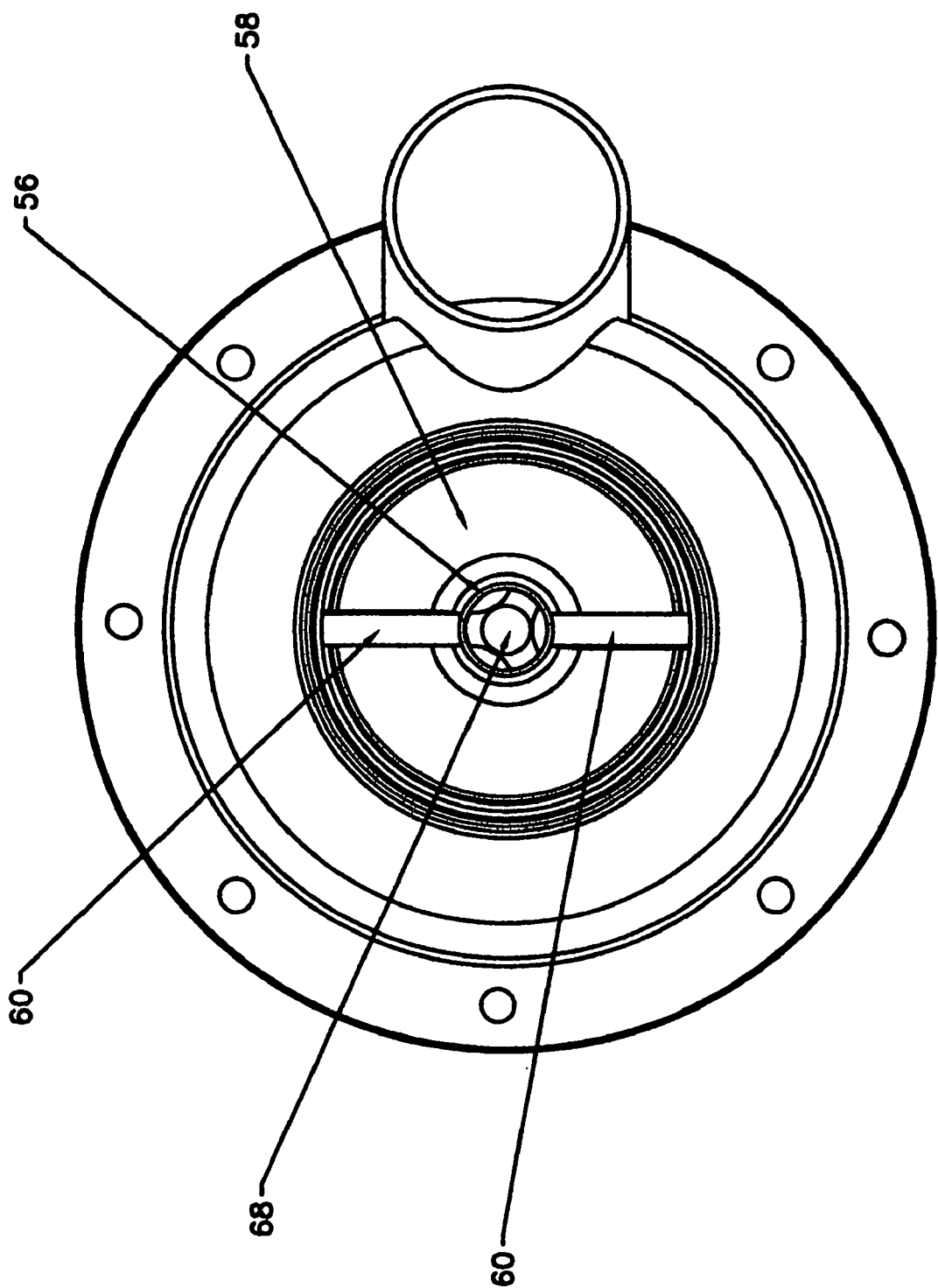
FIG. 22 shows a bottom view of an assembled male adapter portion of a coupling pair according to the disclosure.

FIG. 19 shows the underside view of the male adapter assembly 700 when the poppet 10 is not depressed, and FIG. 20 shows the underside view of the assembly 700 while the poppet 10 is depressed, showing the movement of the poppet stem 69 with respect to the outer wall 56. FIG. 21 is a top perspective view of the male adapter assembly 700, and FIG. 22 is a bottom view of the male adapter assembly 700.

A fuel transfer coupling according to the present disclosure comprises a remote portion which is in fluid contact with a source of liquid hydrocarbon fuel that is to be delivered to the gasoline tank of the motorized vehicle. The remote portion may be thought of as a female adapter owing to its being able to receive the male portion of the coupling already described herein. The female adapter, in one preferred form of the disclosure, is preferably disposed at the exit point of a fuel from a portable, remote fuel reservoir.

Figure 23:
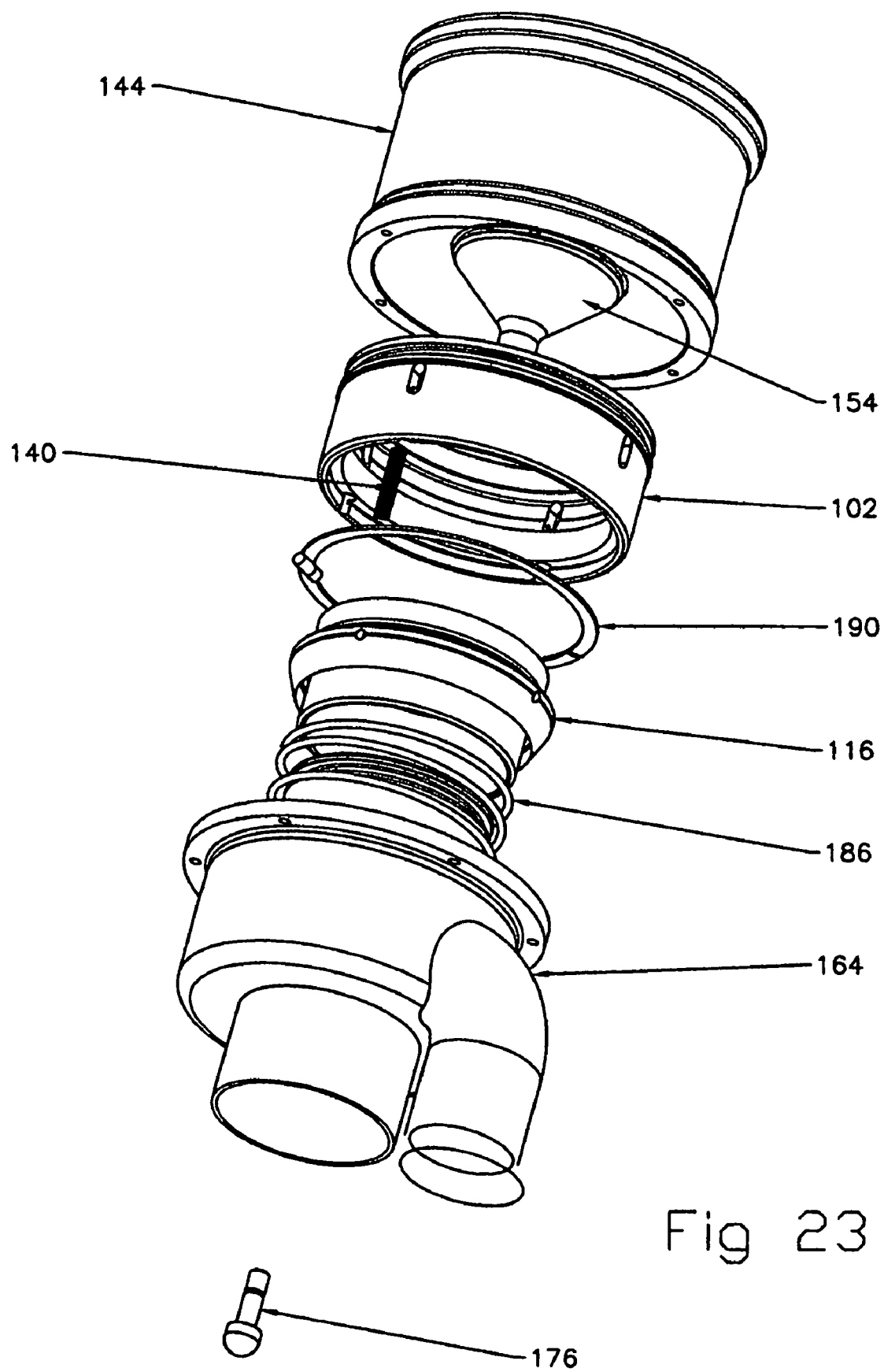
FIG. 23 shows an exploded perspective view of the remote (or "female") portion of a fuel coupling according to one form of the disclosure.

Referring to the drawings, and particularly to FIG. 23 there is shown the remote portion of a fuel transfer coupling according to the disclosure in an exploded view, including all of its various components, which are described forthwith.

Figure 24:
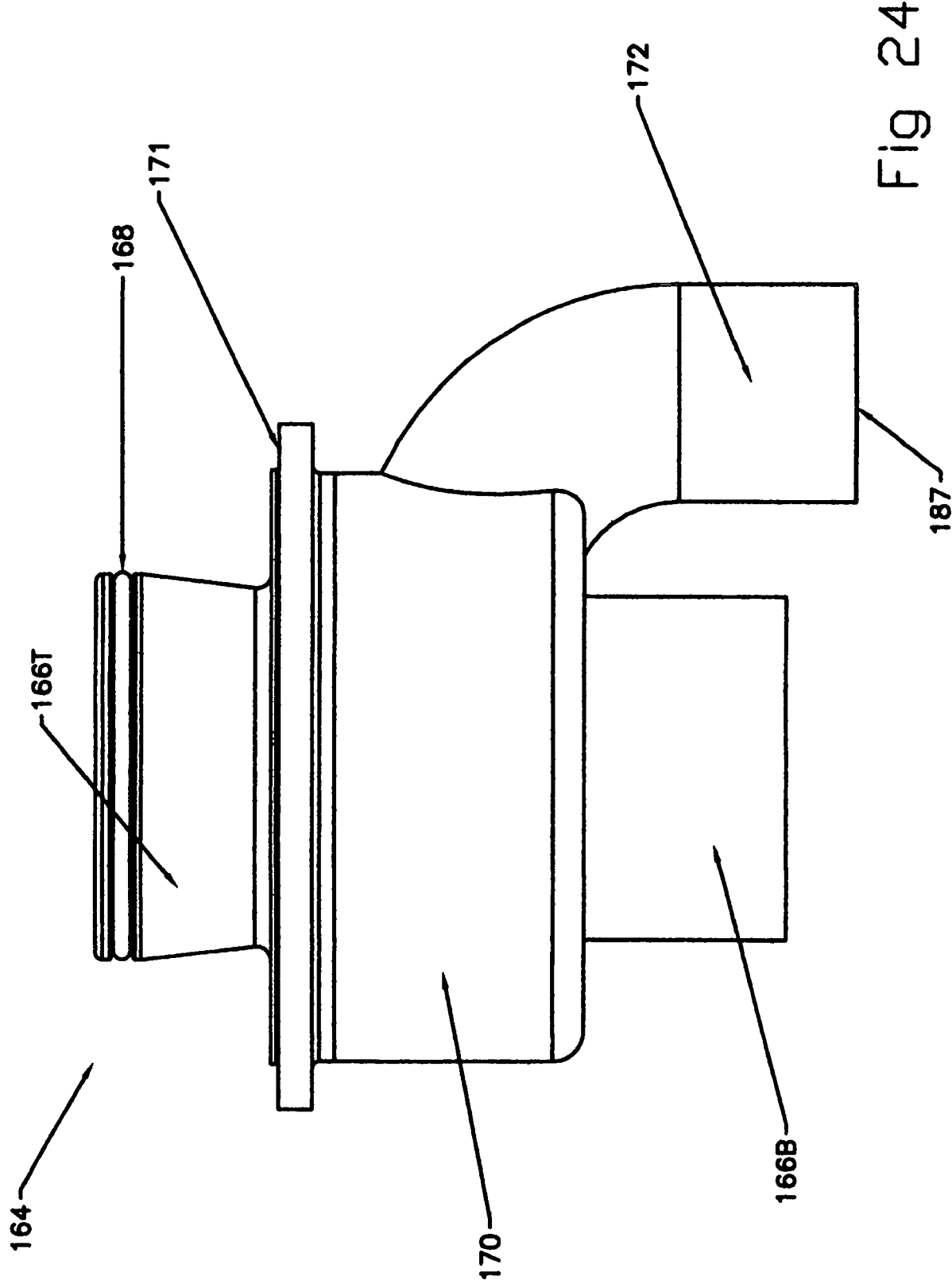
FIG. 24 shows a side elevation view of the female adapter base portion of the remote portion of a fuel coupling according to one form of the disclosure.

FIG. 24 shows a side elevation view of a female adapter base 164 according to the disclosure, including the top portion of the central conduit 166T, bottom portion of the central conduit 166B, shrouding enclosure 170 vapor tube 172, o-ring seal 168, and raised surface 171.

Figure 25:
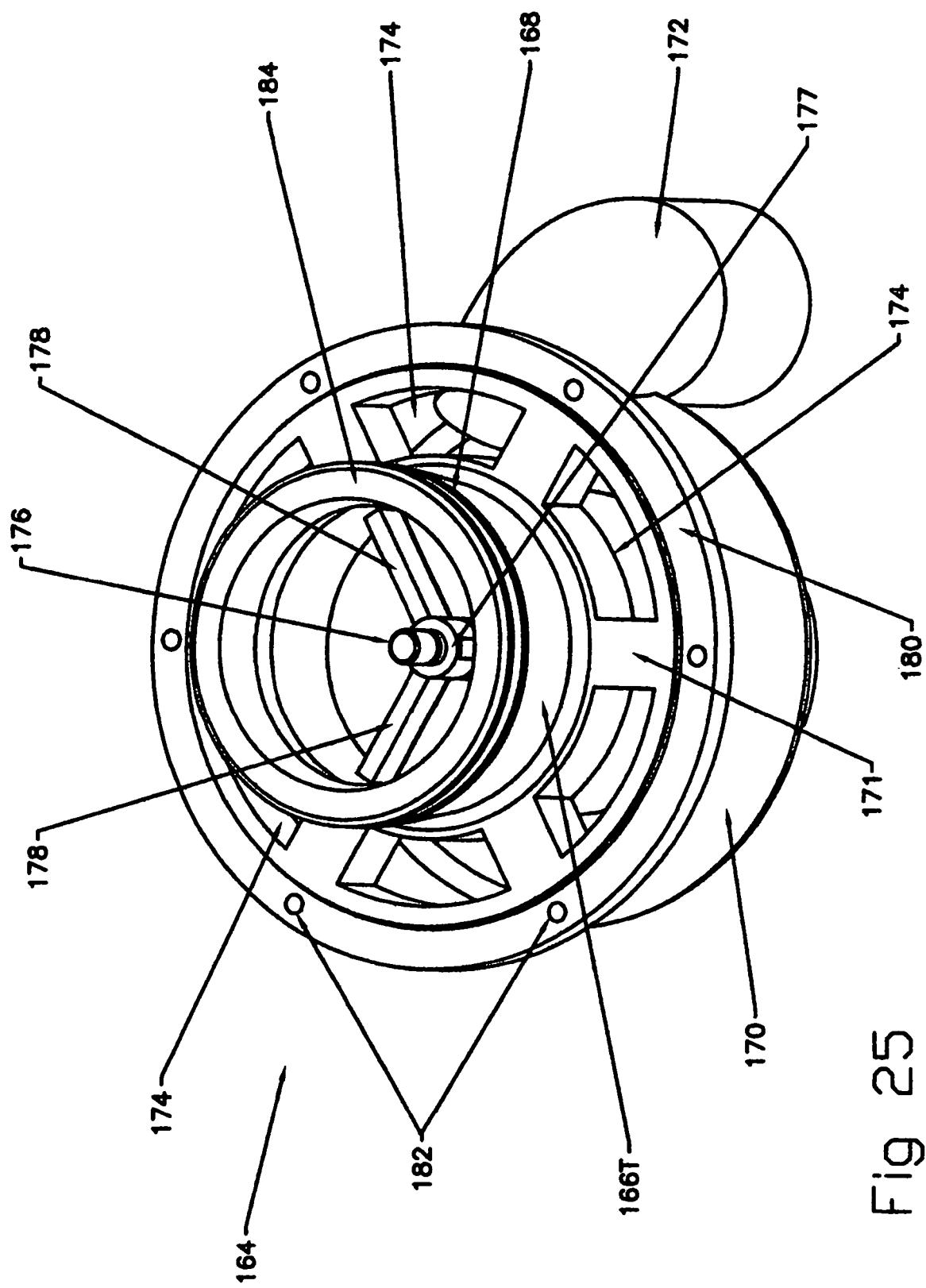
FIG. 25 shows a perspective view of the upper portion of the female adapter base portion of the remote portion of a fuel coupling according to one form of the disclosure.

FIG. 25 shows a perspective view of the upper portion of the female adapter base 164 according to the disclosure, including the raised surface 171, shrouding enclosure 170, outer flange 180 having a plurality of holes 182 disposed thereon, holes 174, vapor tube 172, top portion of the central conduit 166T having a flat top surface 184, o-ring seal 168, and a retaining fastener 176 disposed in a boss 177 held centrally within the interior of the central conduit by means of a plurality of fastener boss supports 178, which are affixed to the inner surface of the wall of the central conduit by conventional means, such as a weld. Retaining fastener 176 is shown with its threads visible.

Figure 26:
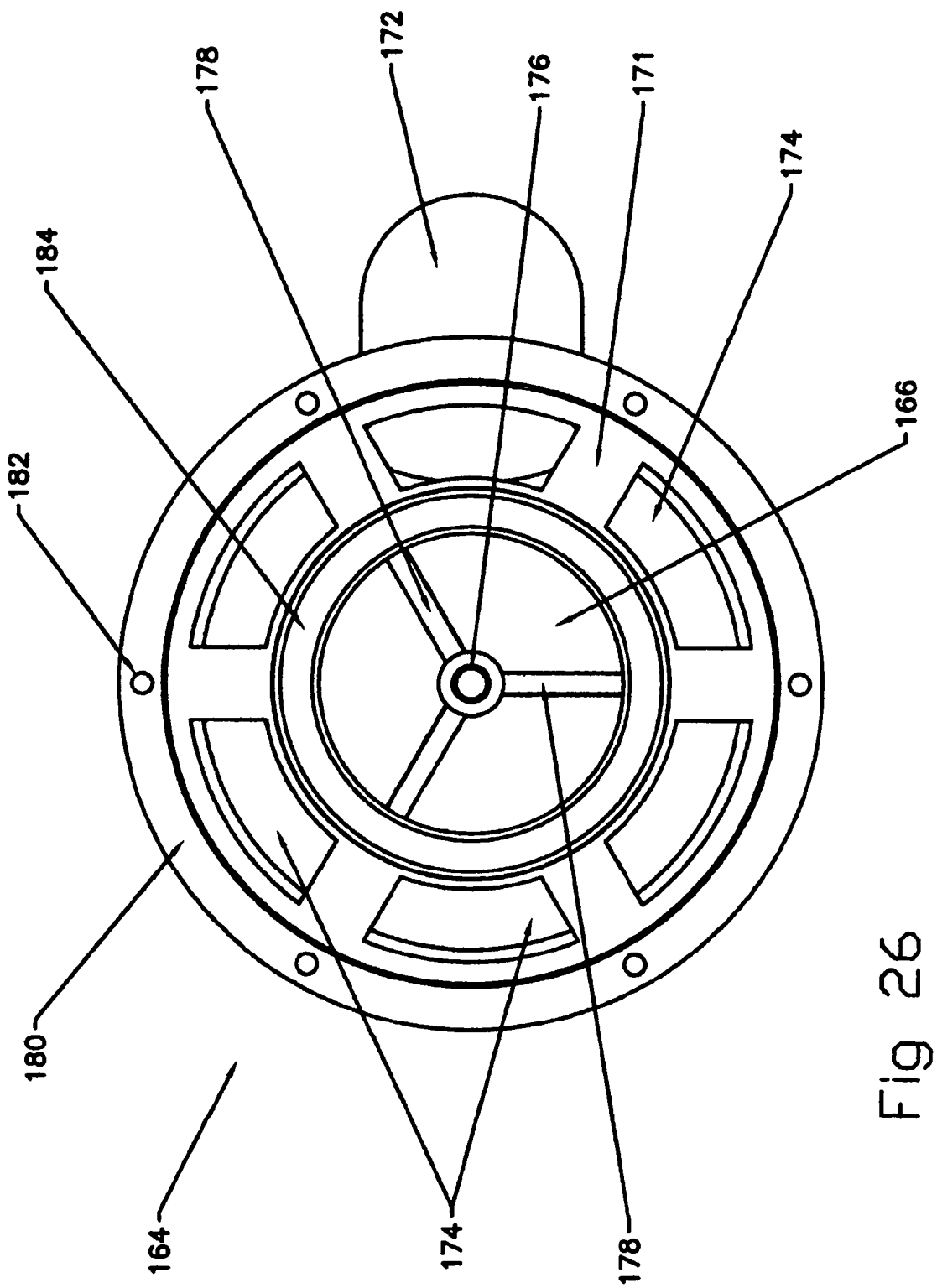
FIG. 26 shows a top view of the female adapter base portion of the remote portion of a fuel coupling according to one form of the disclosure.

FIG. 26 shows a top view of the female adapter base 164 according to the disclosure, including the central conduit, raised surface 171, holes 174, vapor tube 172, top surface 184, flange 180, holes 182, fastener boss supports 178 and retaining fastener 176. Thus, the female adapter base 164 includes a central conduit 166 through which fuel is intended to flow. Disposed about the central conduit is a shrouding enclosure 170 which forms an envelope around the central conduit for the purpose of allowing the travel of gas or air vapor through the various holes 174 disposed in the raised surface 171 of the female adapter base, wherein the holes 174 are in fluid contact with the outlet portion 187 of the vapor tube 172. Thus, this assembly is similar to a condenser as used in the chemical arts, which consists of a tube having a waterjacket about it, with an inlet and outlet for the cooling water, and a tube disposed therethrough which the vapor to be condensed is caused to pass. In the present instance, the central conduit is surrounded by the shrouding enclosure 170, which has as its "inlet", the various holes 174, and which has as its "outlet", the vapor tube 172.

Figure 27:
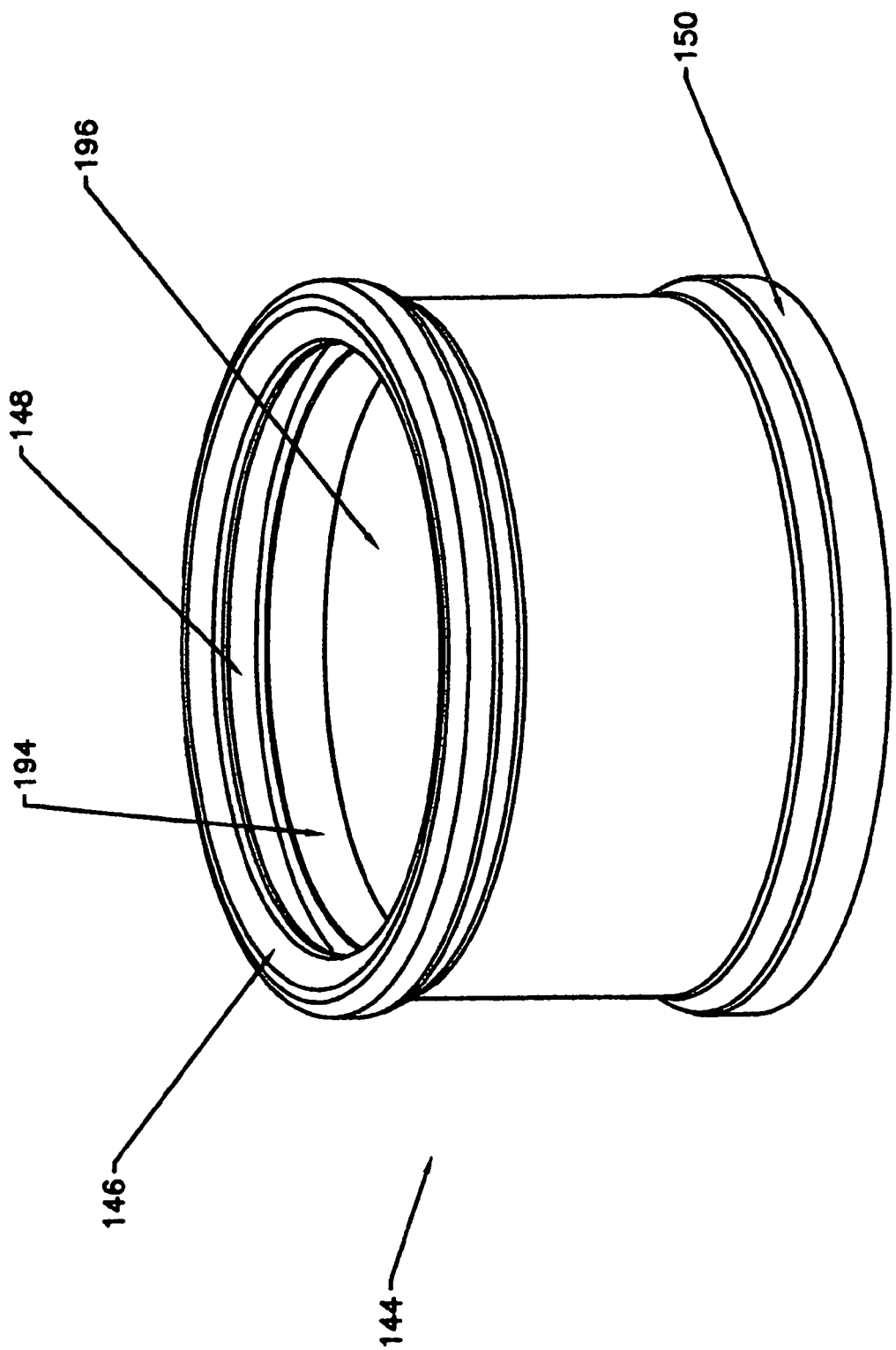
FIG. 27 shows a perspective view of a female adapter cover portion of the remote portion of a fuel coupling according to one form of the disclosure.

FIG. 27 shows a perspective view of a female adapter cover 144 according to the present disclosure, which is shaped in the form of a hollow cylindrical shell, reminiscent of a cylinder sleeve. The female adapter cover includes a smooth bore 196 along its length dimension, except for a raised band 194 at the top, which raised band has a slightly less inner diameter than the smooth bore 196. There is an o-ring seal 148 which is disposed in an annular slot at the upper end of the female adapter cover, which o-ring provides a seal around the outer surface of the male adapter cover 2 when the male adapter cover is inserted into the female adapter cover 144. There is a top surface 146 and a flared bottom 150.

Figure 28:
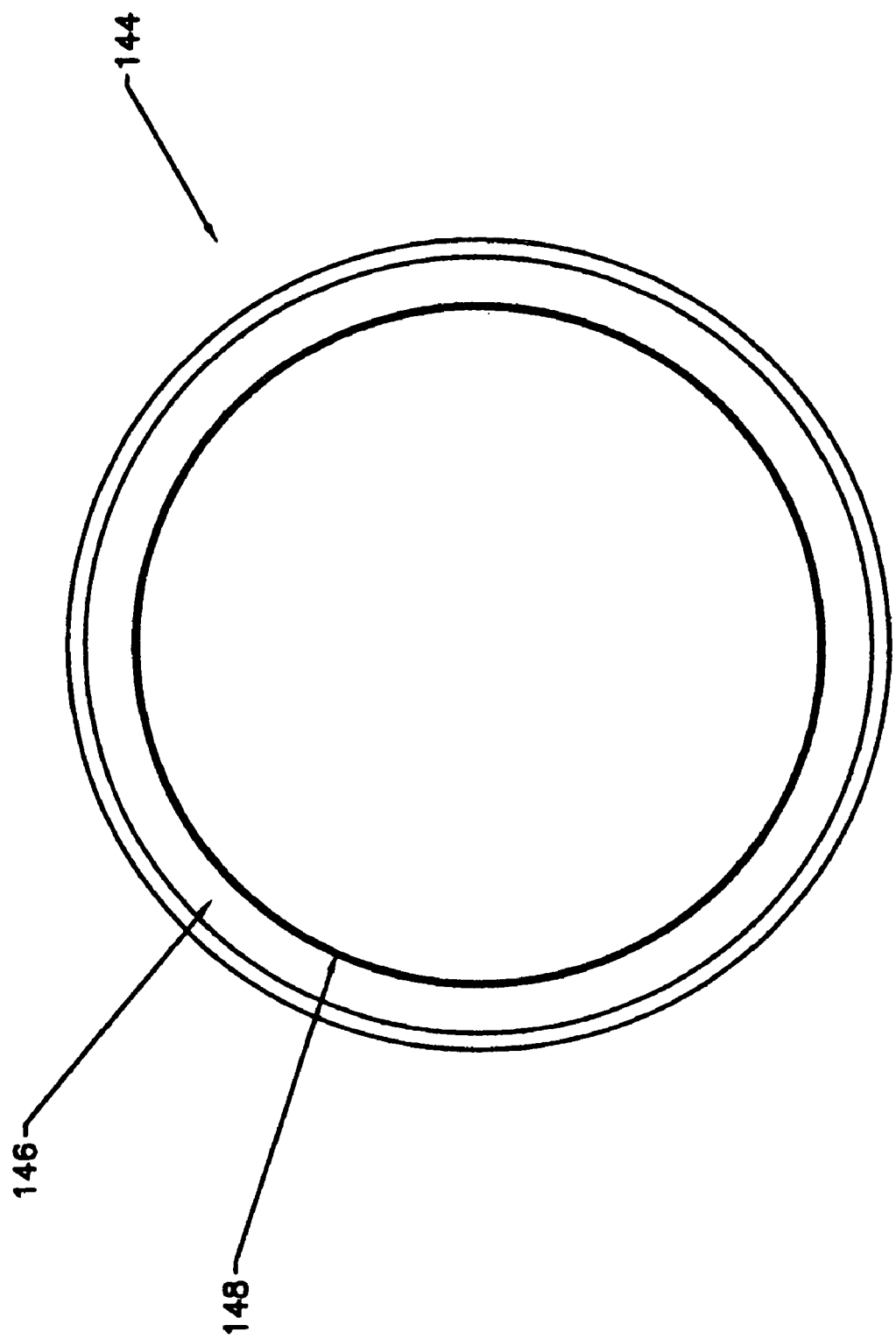
FIG. 28 shows a top view of the female adapter cover portion of the remote portion of a fuel coupling according to one form of the disclosure.

FIG. 28 shows a top view of the female adapter cover 144, including the top surface 146 and the o-ring seal 148.

Figure 29:
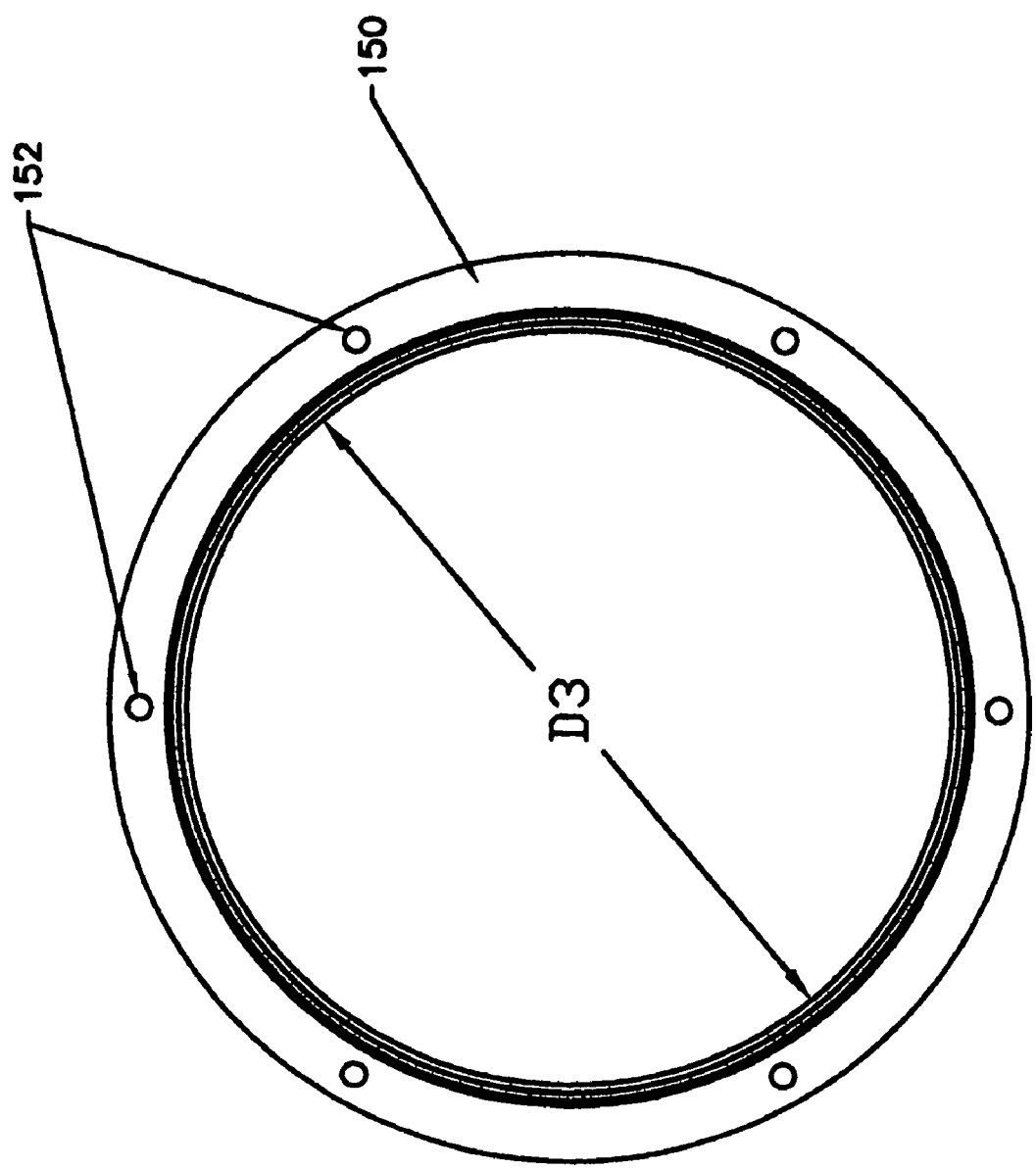
FIG. 29 shows a bottom view of the female adapter cover portion of the remote portion of a fuel coupling according to one form of the disclosure.

FIG. 29 shows a bottom view of the female adapter cover 144, including flared bottom 150 and a plurality of threaded holes 152 disposed circumferentially about the lower flared portion, which holes receive a fastener that also passes through the holes 182 in the female adapter base 164, which are in the same configuration and spacing on both the female adapter cover 144 and female adapter base 164. The diameter D3 of the inner bore 196 of the female adapter cover 144 is just slightly larger than the diameter of the raised surface 171, so that the female adapter cover 144 may be securely fit over the female adapter base 164.

Figure 30A:
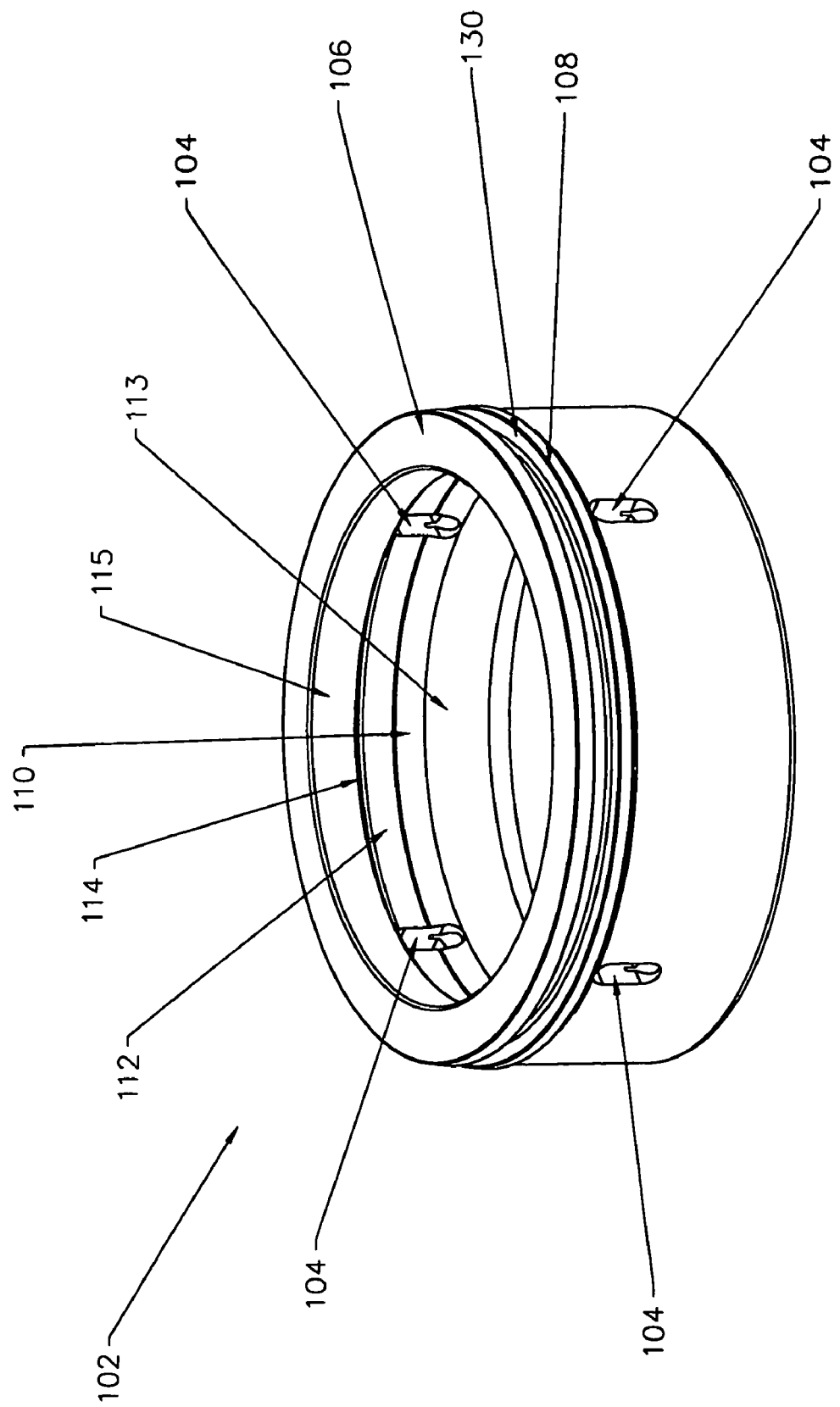
FIG. 30a shows a perspective view of the moveable collar portion of the remote portion of a fuel coupling according to one form of the disclosure.

FIG. 30a shows a moveable collar 102 according to the present disclosure, which is shaped as a hollow cylinder. The moveable collar 102 is intended to be slidably disposed within the smooth bore 196 of the female adapter cover 144. The moveable collar 102 includes a groove 108 in which is housed an o-ring seal 130, which o-ring seals the outer surface of the moveable collar 102 within the smooth bore 196 of the female adapter cover 144. There is a flat top surface 106, and a plurality of slots 104 which pass through the wall of the moveable collar and may thus be regarded as holes. On the inside wall of the moveable collar 102, there is a flat recessed surface 112 that is disposed between beveled edge 114 and bevel 110. Surface 113 extends annularly about the inside diameter of the moveable collar 102, and has itself an inside diameter which is smaller than the inside diameter of the flat recessed surface 112. The surface 115 extends annularly about the inside diameter of the moveable collar 102 and has its own inside diameter which is less than that of surface 113. Thus, going from surface 113 to surface 112, there is a bevel 110. Then, going from surface 112 to surface 115, there is a beveled edge 114.

Figure 30B:
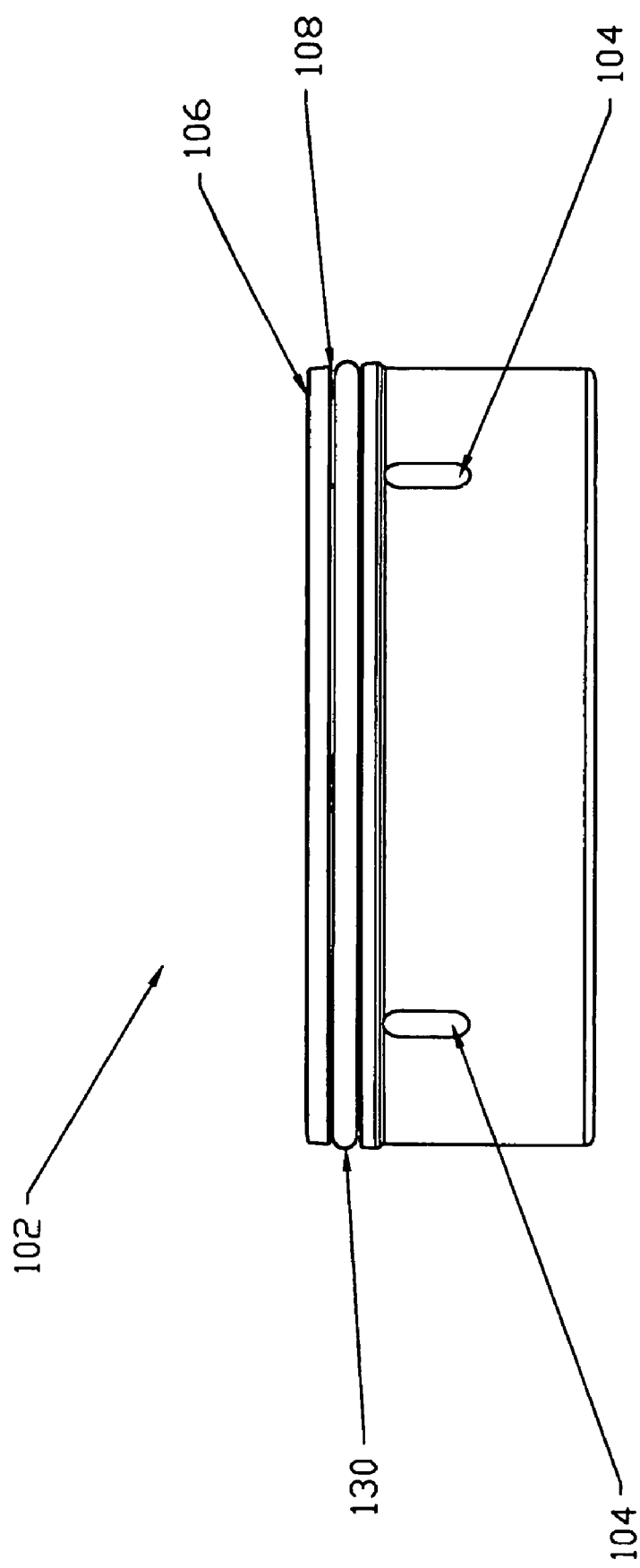
FIG. 30b shows a side elevation view of the moveable collar portion of the remote portion of a fuel coupling according to one form of the disclosure.

FIG. 30b shows a side elevation view of the moveable collar 102 element of the disclosure, including the slots 104, flat top surface 106, and groove 108.

Figure 31:
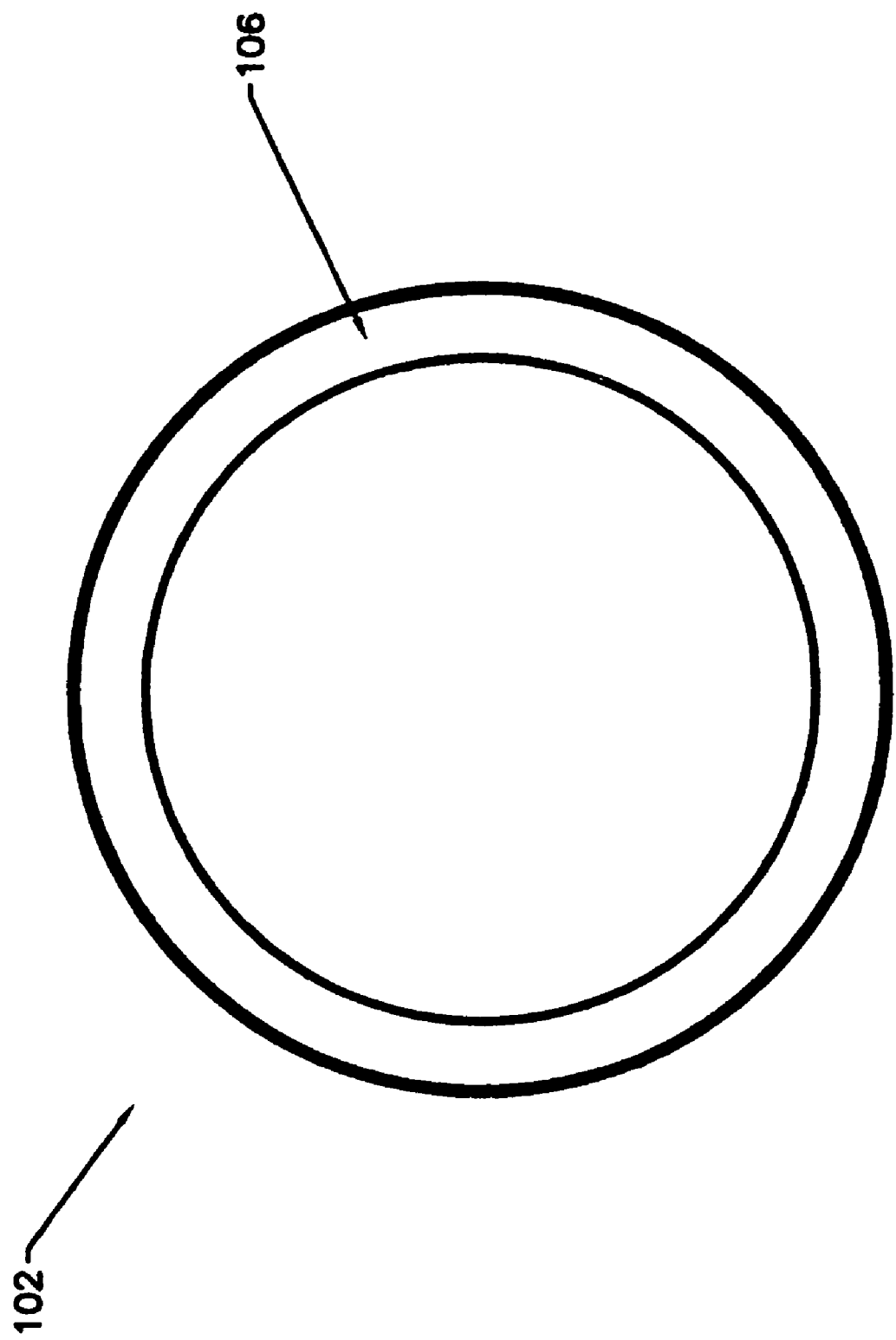
FIG. 31 shows an overhead view of the moveable collar portion of the remote portion of a fuel coupling according to one form of the disclosure.

FIG. 31 is a top view of the moveable collar 102 element of the disclosure, including the flat top surface 106.

Figure 32:
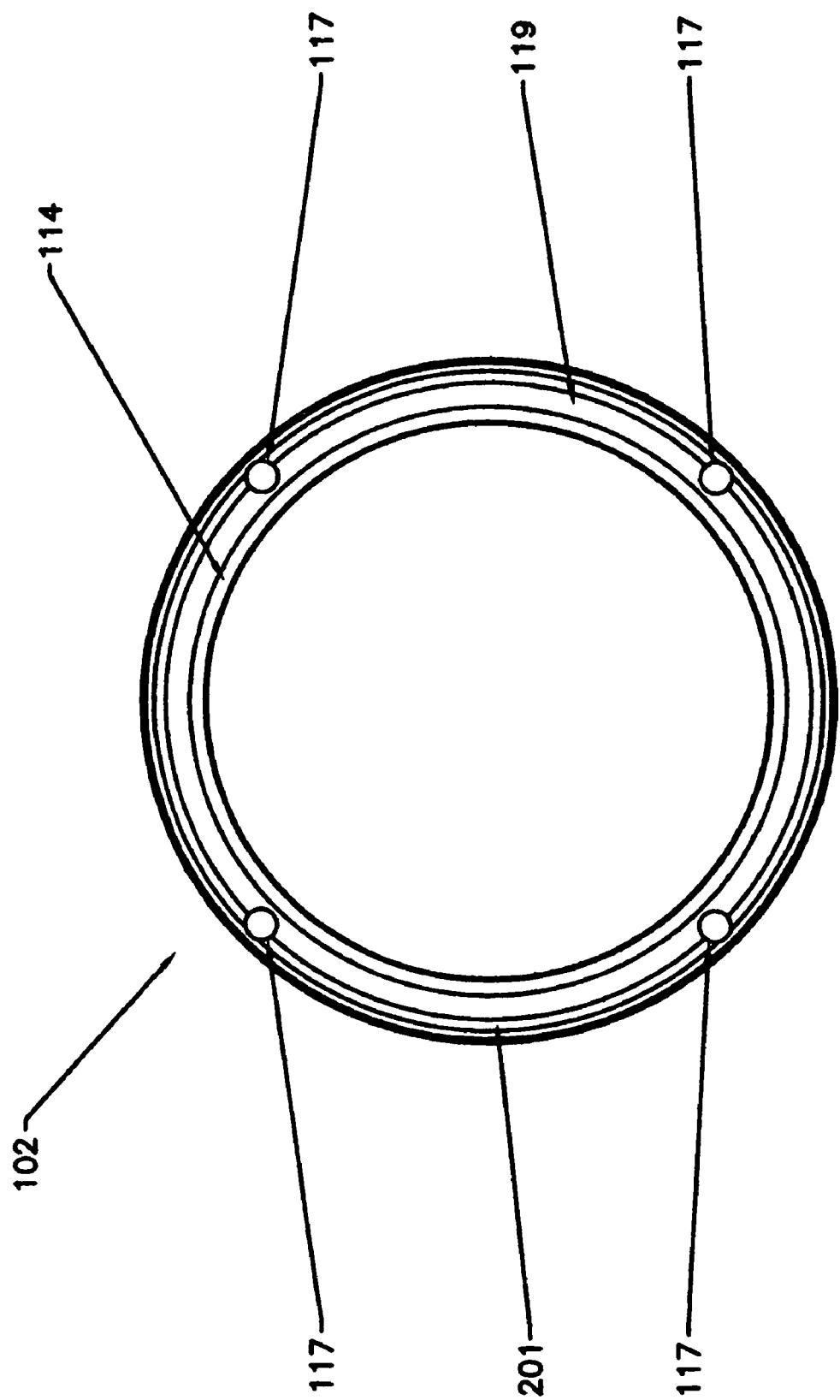
FIG. 32 shows a bottom view of the moveable collar portion of the remote portion of a fuel coupling according to one form of the disclosure.

FIG. 32 shows a bottom view of the moveable collar 102 element of the disclosure, including the beveled edge 114 and holes 117 which are drilled from the bottom surface of the moveable collar to the floor portion of each of the slots 104, so as to enable insertion of springs into the holes 117.

Figure 33:
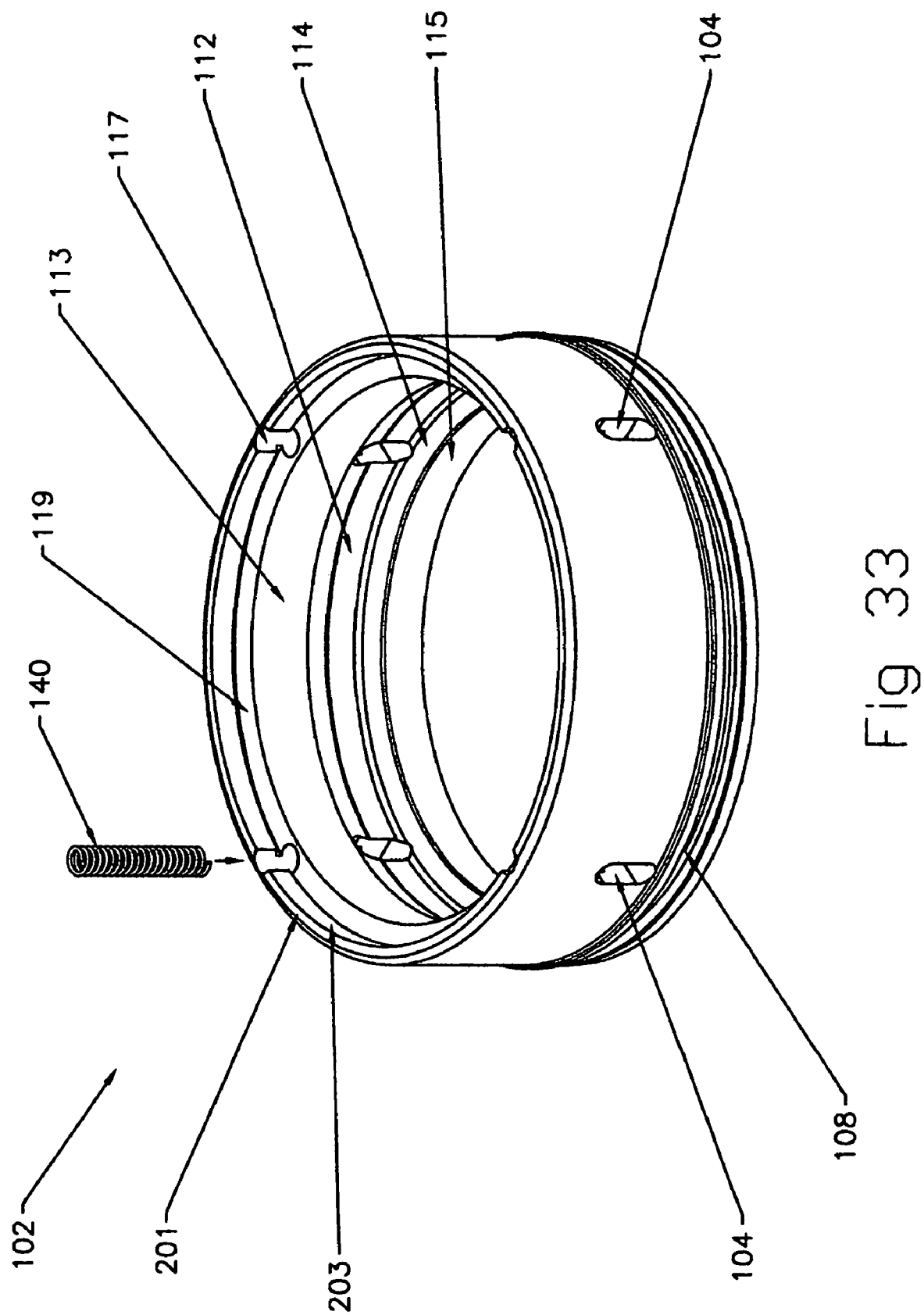
FIG. 33 shows a perspective view of the bottom portion of the moveable collar portion of the remote portion of a fuel coupling according to one form of the disclosure.

FIG. 33 shows a perspective view of the bottom of the moveable collar 102, including the slots 104 and groove 108.

There is also shown surface 115, beveled edge 114, holes 117, surface 112, surface 113, flat surface 119, wall 203, and flat surface 201. The flat surface 119 accommodates a retaining ring 190 (FIG. 23) having same diameter as said flat surface 119, to retain in their position springs which have been placed into the holes 117. The springs are then held in place by a retaining ring fastened to flat surface 119, either by interference fit, an adhesive substance, or other conventional means. There is also a flat bottom surface 201.

Figure 34:
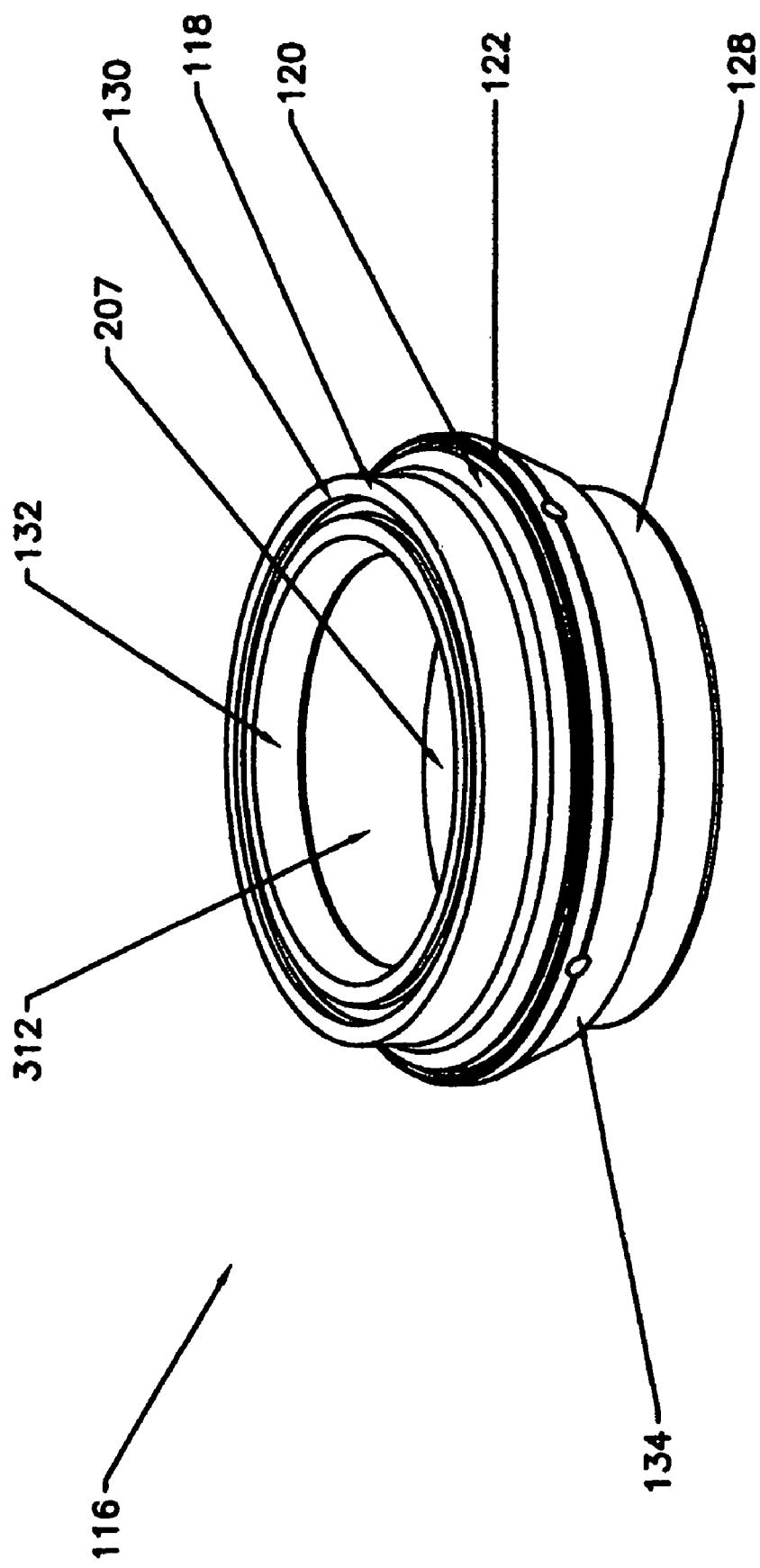
FIG. 34 shows a perspective view of the seal ring element of the remote portion of a fuel coupling according to one form of the disclosure.
Figure 35:
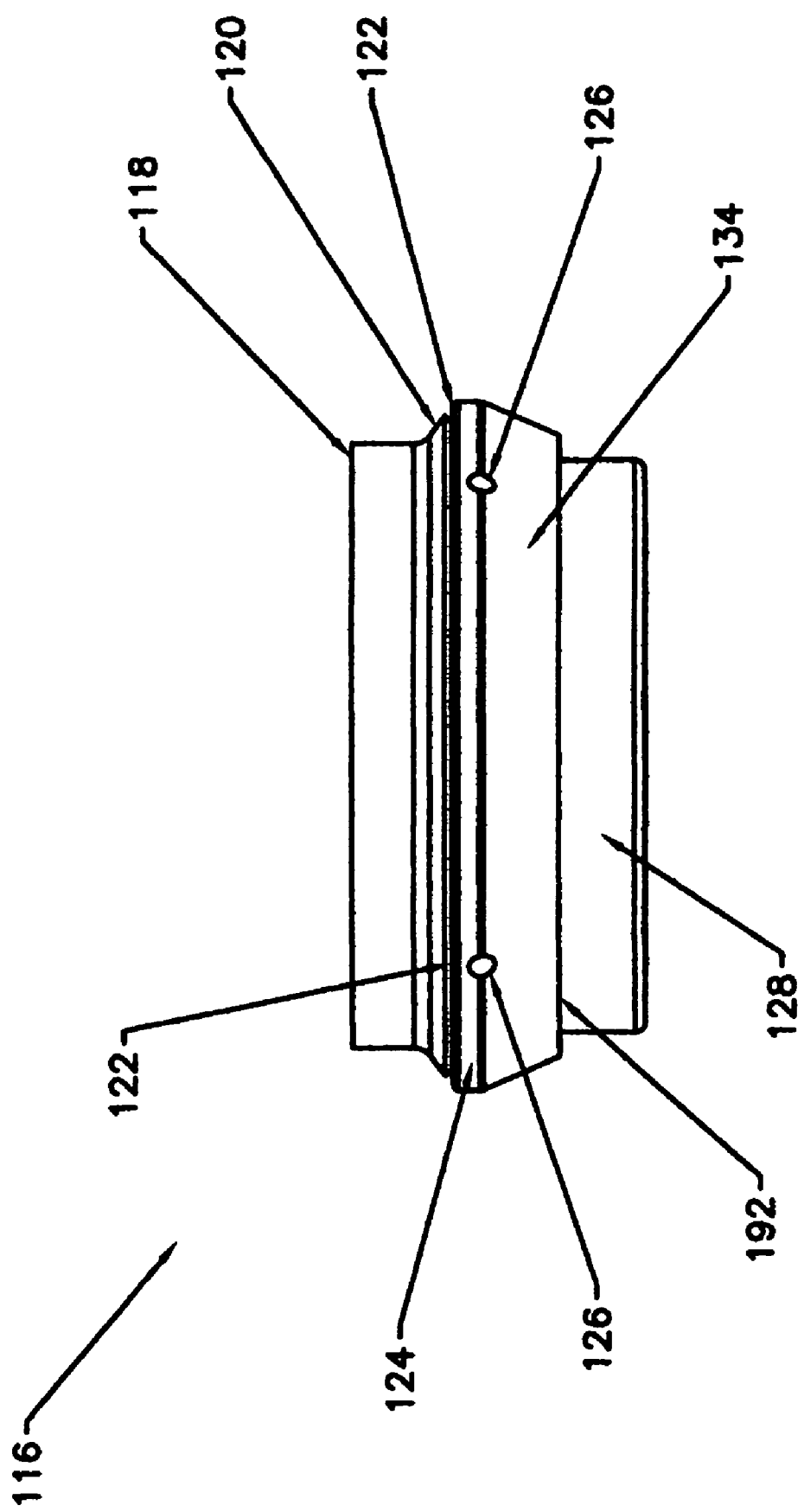
FIG. 35 shows a side elevation view of the seal ring element of the remote portion of a fuel coupling according to one form of the disclosure.

FIG. 34 shows a seal ring 116 element of the disclosure, which is preferably metallic in construction, as are all of the other elements of the couplings of the present disclosure. The seal ring includes a hollow interior space 207. There is a flat top surface 118 which includes an o-ring seal embedded in an annular groove that is present on the flat top surface 118. There is a beveled surface 132, which is reminiscent of a valve-seat in an automotive cylinder head, and which beveled surface functions as a seat for the valve center 154 as later described herein. There is a shoulder portion 120 which includes an o-ring seal 122 annularly disposed thereon. There is also a lower shoulder 134, and a skirt portion 128, as well as a smooth bore 312. These elements are shown in FIG. 35 as well, in addition to threaded holes 126 which are drilled into the seal ring 116 at a band portion 124 which circumscribes the seal ring. There are a plurality (preferably 4) of holes 126 spaced around the perimeter of the seal ring 116 which correspond in position to the slots 104 in the moveable collar 102. The centerlines of the bores of the threaded holes 126 are perpendicular to the centerline of the seal ring 116 itself. There is also a flat portion 192 on the underside of the seal ring which functions as a seat for the spring 186 (FIG. 23).

Figure 36:
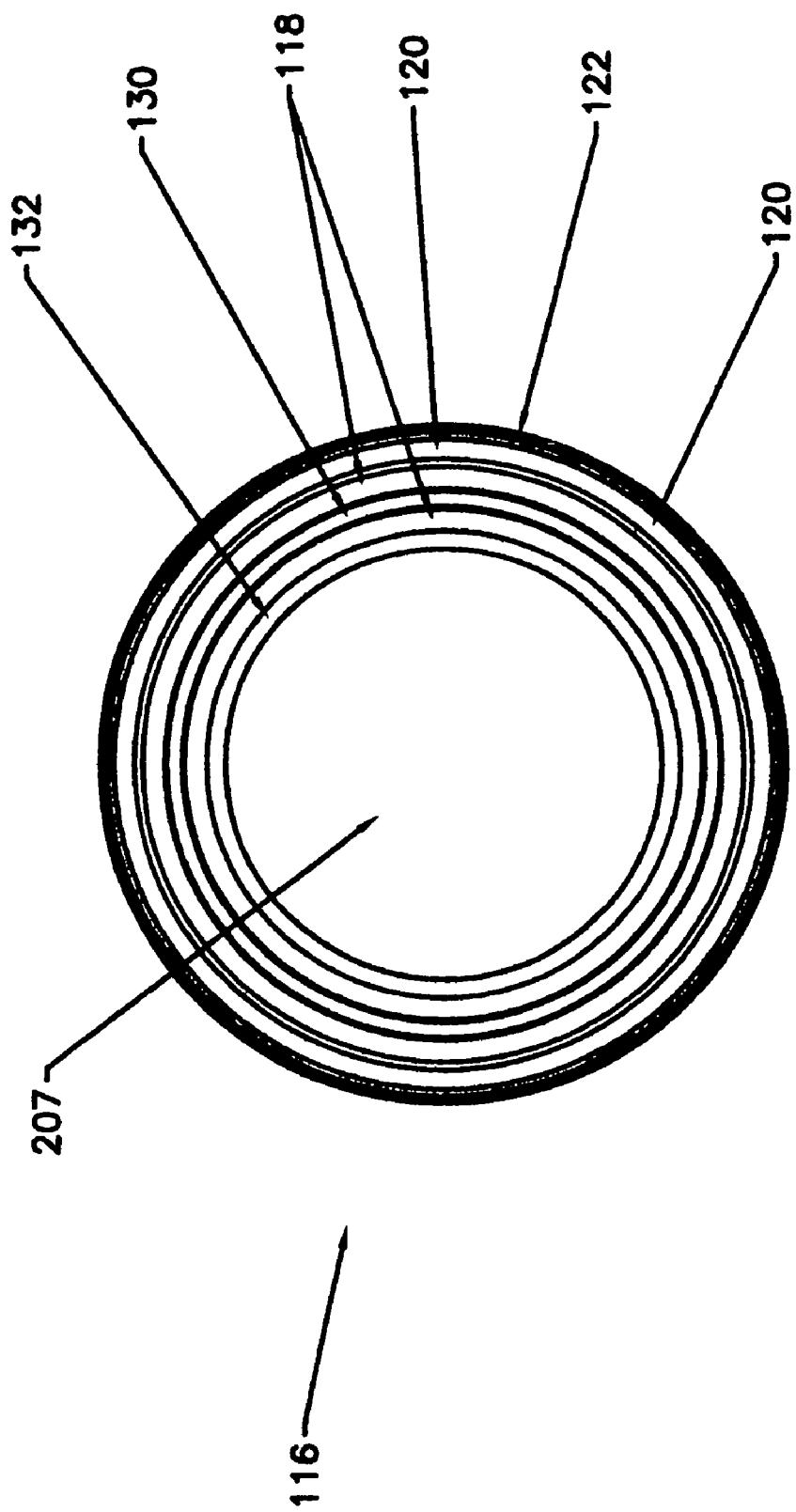
FIG. 36 shows an overhead view of the seal ring element of the remote portion of a fuel coupling according to one form of the disclosure.

FIG. 36 is a top view of the seal ring 116, showing the respective positions of the beveled surface 132, flat top surface 118, o-ring seal 130, shoulder 120, and o-ring 120.

Figure 37:
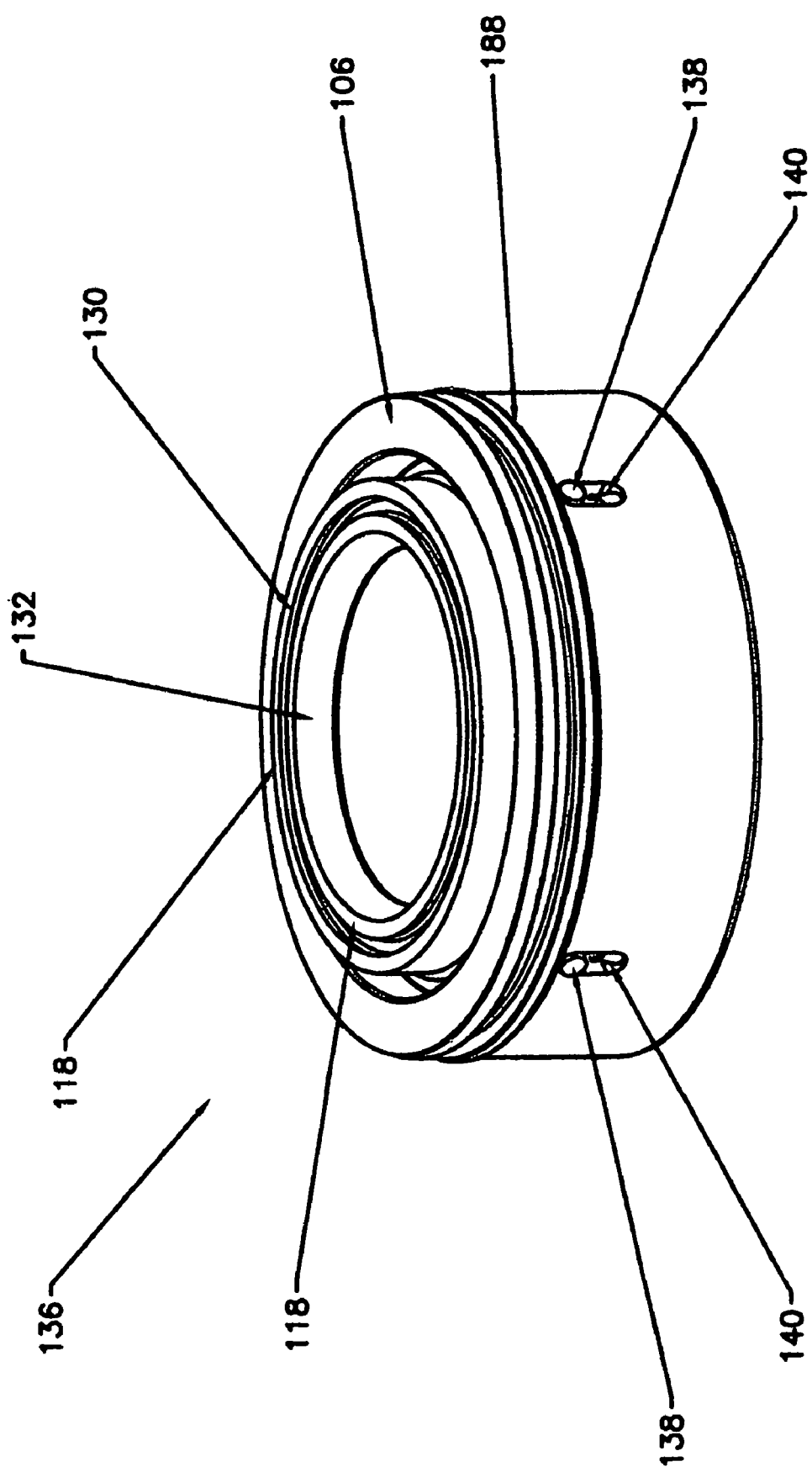
FIG. 37 shows a perspective view of the assembled collar/seal ring assembly element combination of the remote portion of a fuel coupling according to one form of the disclosure.

FIG. 37 shows the collar/seal ring assembly 136. According to the disclosure, the seal ring 116 is moveably held in place within the moveable collar 102. This is done by first inserting a spring 140 into each of the holes 117 in the underside of the moveable collar 102, and then securing them in place by placement of spring retaining ring 190 (FIG. 23) onto the flat surface 119, such as by using an epoxy resin. This causes the springs to be partly visible in the slots 104 and partially embedded within the hole 117 between the bottom of the moveable collar and the bottom of the slots 104. A slight forcing of the springs 140 downward enables one to insert a screw 138 (whose threads match the holes 126 on the outer band of the seal ring 116 into the slot between the top of the spring 140 and the top portion of the oval or elongate slot 104. When four screws are inserted into the four slots 104 in such fashion, the seal ring 116 may then be placed into the interior of the moveable collar 102 so that the four screws 138 are engaged in the threads in the holes 126. A more preferred means for assembly is to first assemble o-ring 122 to seal ring 116. Subsequently, the seal ring 116 is fitted inside the moveable collar 102, and then the screws 138 are inserted through the slots in the moveable collar 102 into threaded holes 126 in 116. Then the springs 140 are inserted into the holes 117 and the retainer 190 is fitted into the groove in the moveable collar 102. Such a construction yields the arrangement shown in FIG. 37 in which the seal ring 116 is held within the moveable collar 102 in such fashion that motion of the seal ring 116 within the moveable collar 102 is permitted in the direction of the centerline, but downward, and against the pressure of the springs 140 applied on each of the screws 138. Such a motion downwards pushes the seal ring 116 downward, releasing the contact between the o-ring 122 and the beveled edge 114, thus opening up an annular space located at the gap at 142. Upon release of downward pressure on the seal ring 116, the force of the springs 140 force the seal ring 116 back in an upwards direction, forcing the o-ring 122 to sealably engage the beveled edge 114. Also shown in FIG. 37 is the flat top surface 106, flat top surface 118, o-ring seal 130, beveled surface 132, and o-ring seal 188 disposed in groove 108. Although the screws 138 are used to secure the seal ring 116 in its position within the moveable collar 102, any other functionally equivalent equatorially-located protrusions from the seal ring are suitable for use in this regard, including without limitation, pins welded into place.

Figure 38:
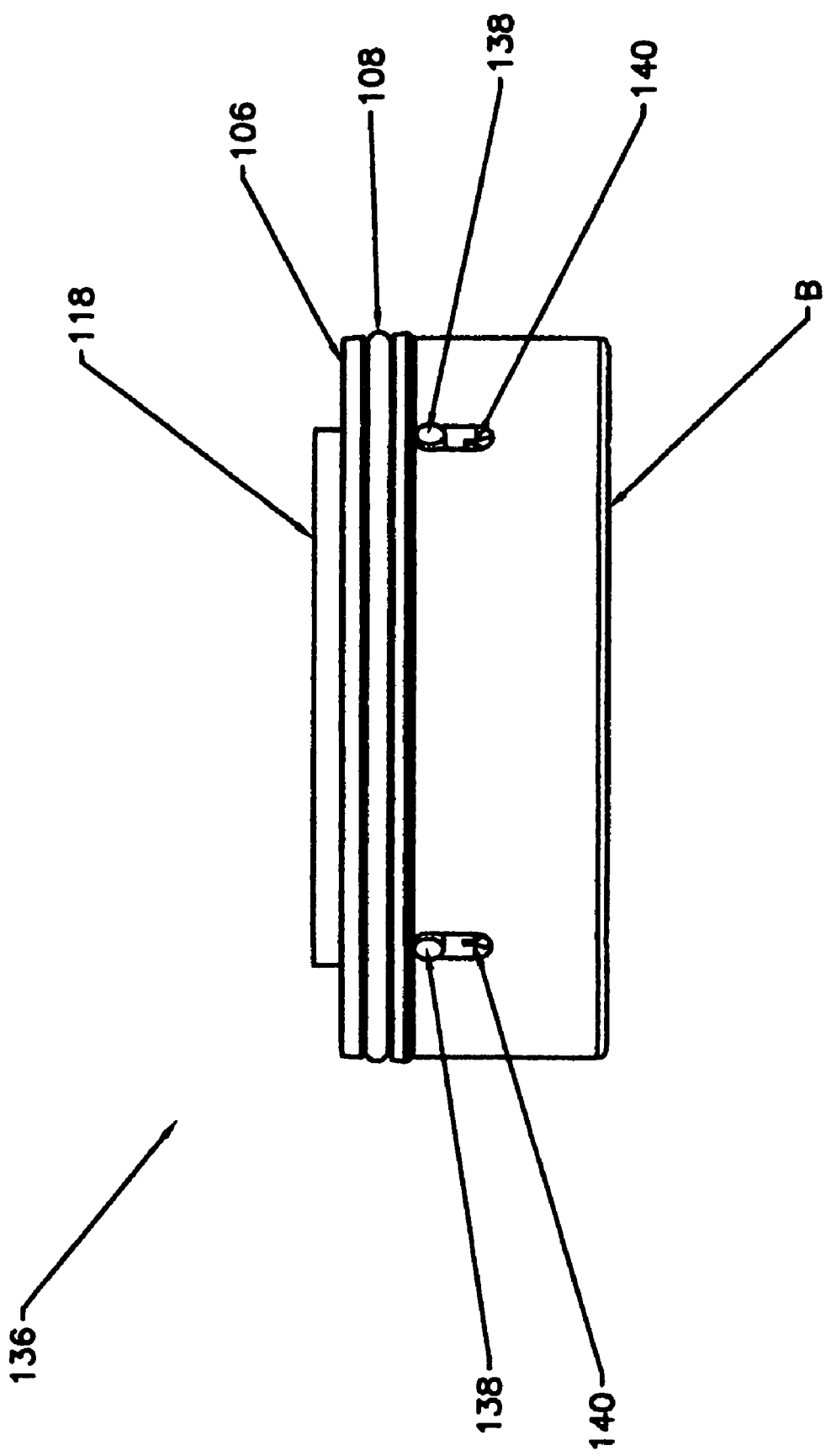
FIG. 38 shows a side elevation view of the assembled collar/seal ring assembly element combination of the remote portion of a fuel coupling according to one form of the disclosure.

FIG. 38 shows a side view of the collar/seal ring assembly 136, showing the respective positions of the flat top surface 118, flat top surface 106, groove 108, springs 140 and screws 138. The bottom of the assembly is denoted as B.

FIG. 39 shows an overhead view of the collar/seal ring assembly 136, showing the respective positions of the flat top surface 118, o-ring 130, gap 142, flat top surface 106, and beveled surface 132.

FIG. 40A shows a top view of the valve center 154 of the present disclosure having a flat top surface 156.

FIG. 40B shows a perspective view of the underside of valve center 154 of the present disclosure, showing the stem portion 158 which has a threaded hole 160 at its bottom portion and an o-ring seal 162 disposed annularly about the valve center.

FIG. 40C shows a side perspective view of the valve center element 154, showing the respective positions of the stem 158 and o-ring seal 162 and flat top surface 156.

Figure 41:
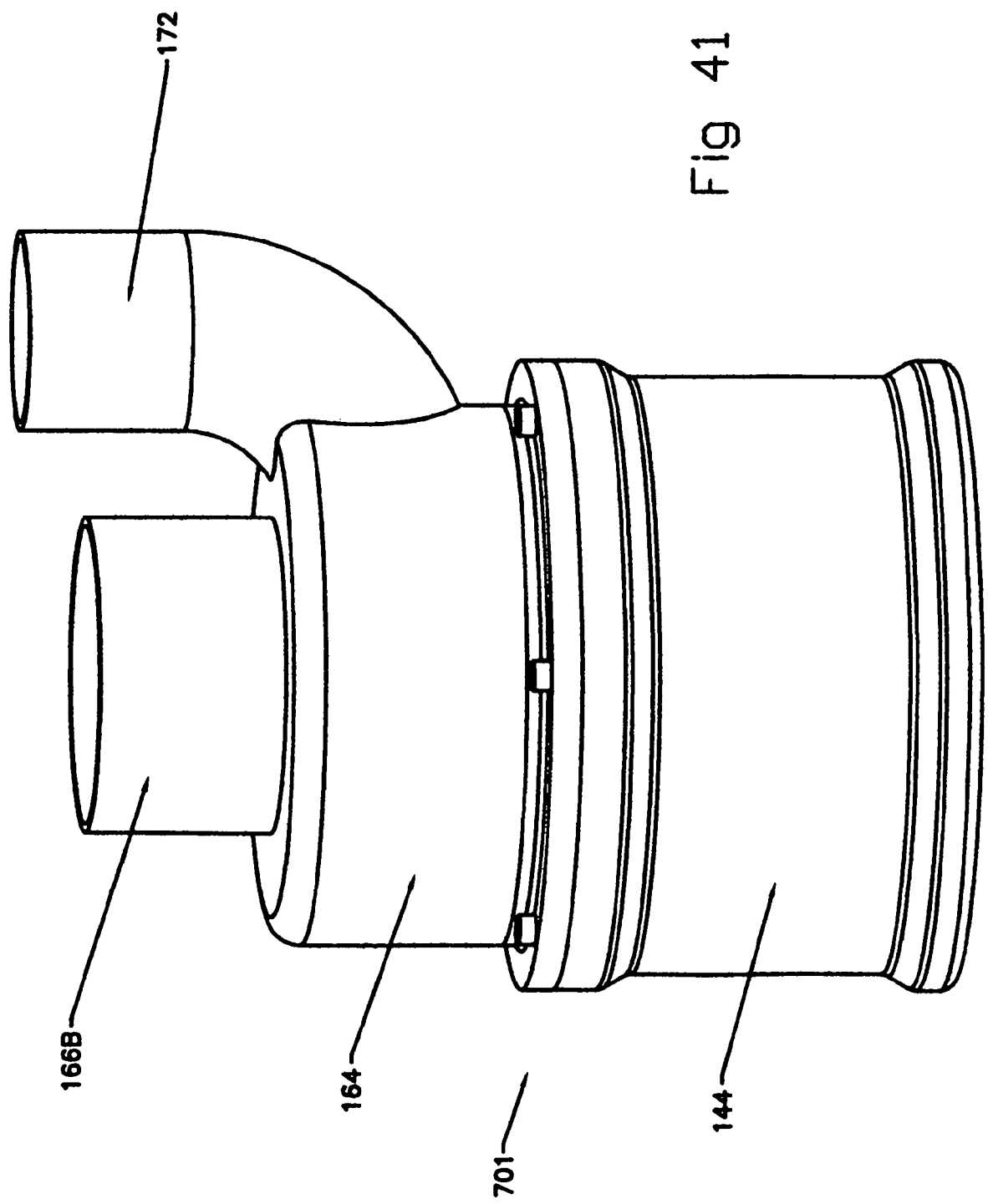
FIG. 41 shows a side view of the assembled female adapter portion of a coupling pair according to the disclosure.

FIG. 41 shows a side view of the female adapter 701 in its final assembled form, when all of the components shown in FIG. 23 and as previously described herein are contained within the female adapter cover 144 and the female adapter base 164 in their proper design configuration. To assemble the female adapter 701, one begins by placing the female adapter base 164 on a flat surface so that the bottom of the central conduit 166B and vapor tube 172 rest on the flat surface. Next, the spring 186 is placed in position around the top portion of the central conduit 166T and using the flat surface 171 as a seat. Next, an o-ring 188 is placed in the groove 108 of the collar/seal ring assembly 136, and the collar/seal ring assembly is located over the spring. The assembly 136 is pushed against the pressure of the spring 186 so that the top portion of the central conduit 166T enters the underside of the assembly 136 and pushing is continued until the bottom skirt portion (B in FIG. 38) of the assembly 136 contacts the surface 171, which simultaneously engages the o-ring 168 in a sealing contact with the smooth bore 312 in FIG. 34. Once the bottom portion B has contacted the surface 171, the hole 160 in the end of the stem of the valve center is then threaded over the nut (retaining fastener 176, FIG. 25) securely, so that subsequent releasing of the assembly 136 causes the beveled edge 132 to contact the o-ring 162 on the valve center 154 in a sealing arrangement. The female adapter cover 144 is then slid over the assembly 136 and fastened into position using conventional fasteners threaded through the holes 182 (FIG. 25) and into the threaded holes 52 (FIG. 29).

Figure 42:
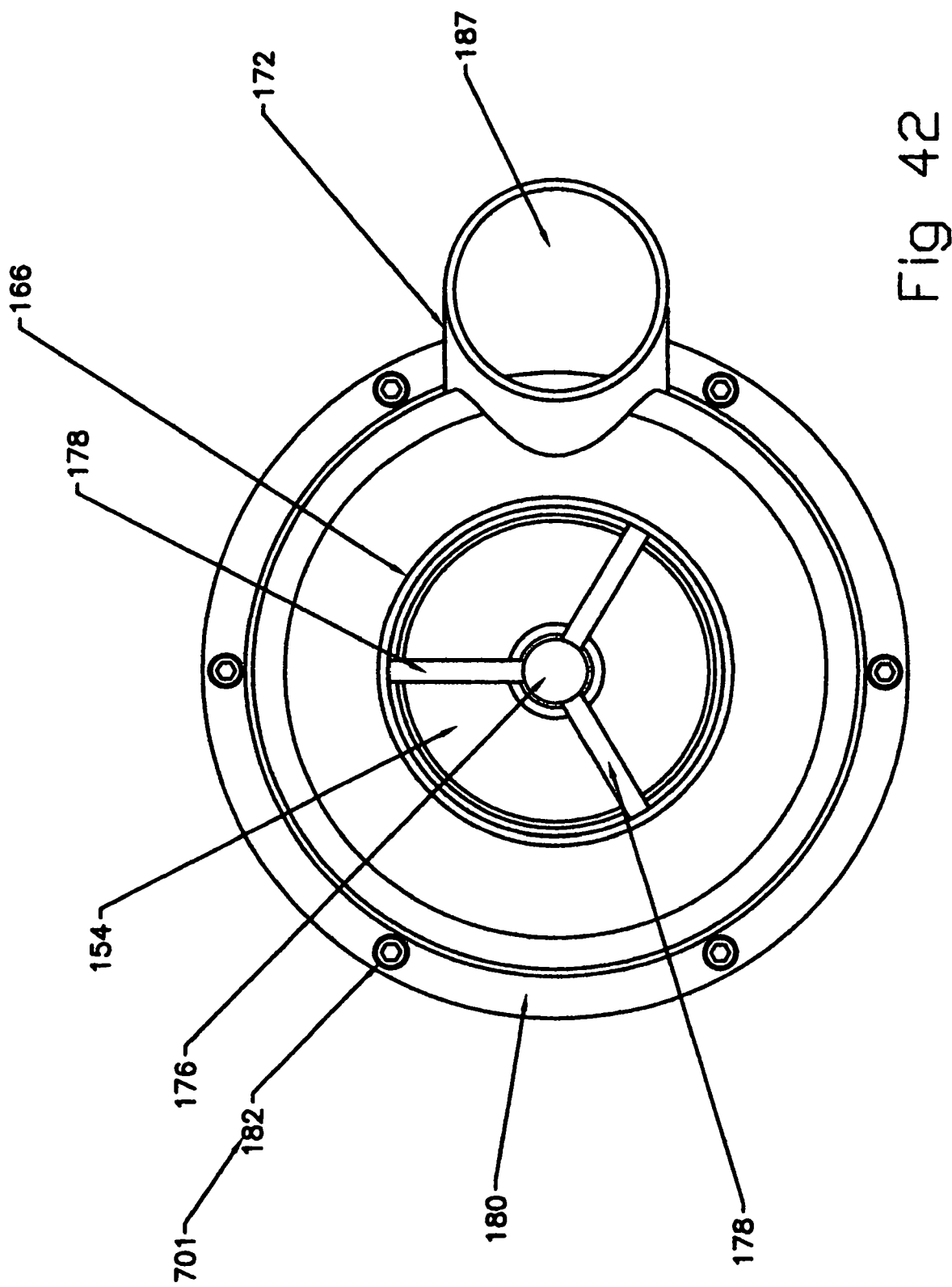
FIG. 42 shows a bottom view of the assembled female adapter portion of a coupling pair according to the disclosure.

FIG. 42 is a bottom view of the assembled female adapter 701 showing the respective positions of the flange 180, bolt holes 182, retaining fastener 176, fastener boss supports 178, valve center 154, central conduit 166, vapor tube 172, and the outlet portion 187 of the vapor tube 172.

Figure 43:
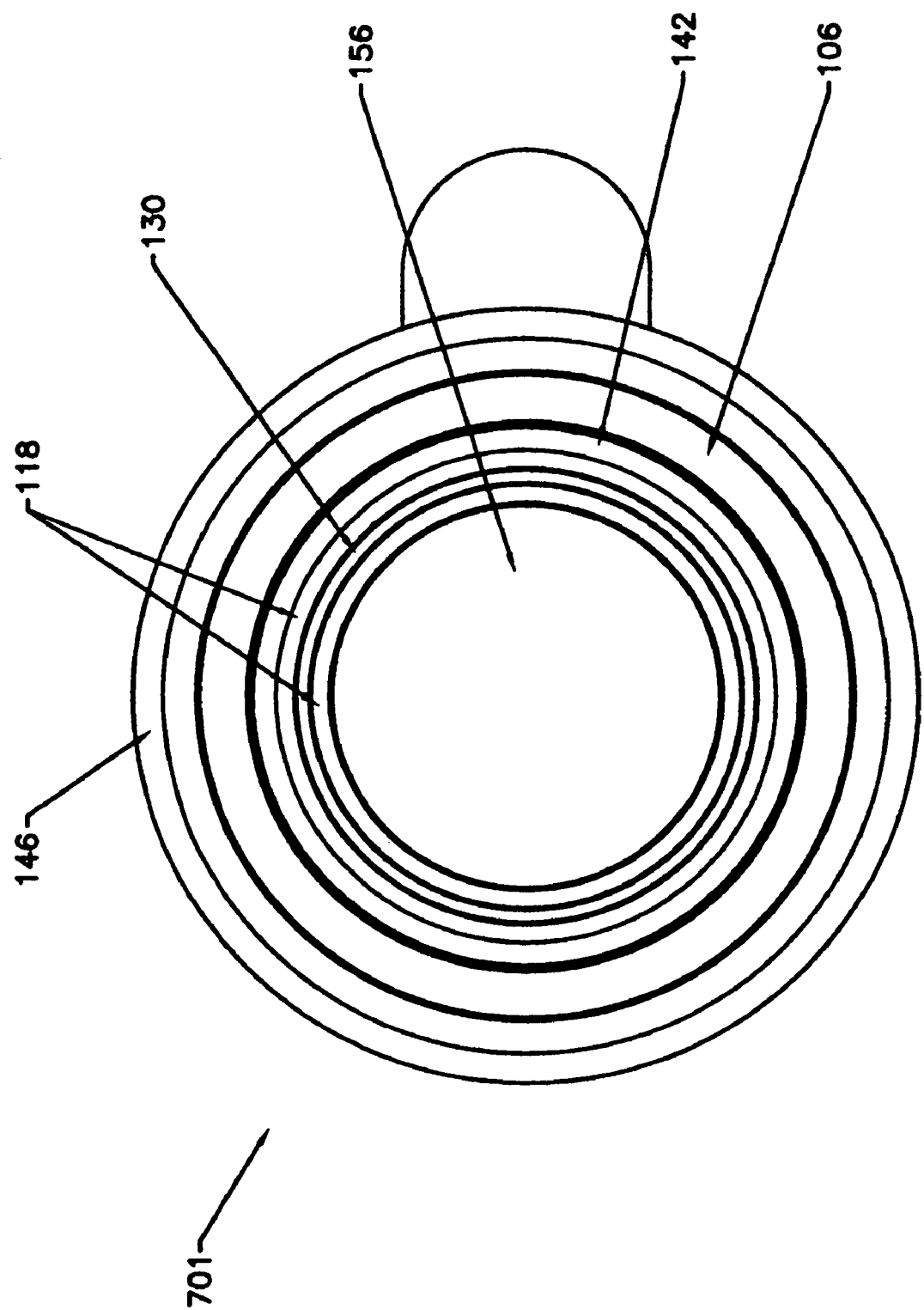
FIG. 43 shows a top view of the assembled female adapter portion of a coupling pair according to the disclosure.

FIG. 43 is a top view of the assembled female adapter 701 showing the respective positions of its various elements including the top surface 146, flat top surface 118, o-ring 130, flat top 156, gap 142, and flat top surface 106.

Figure 44:
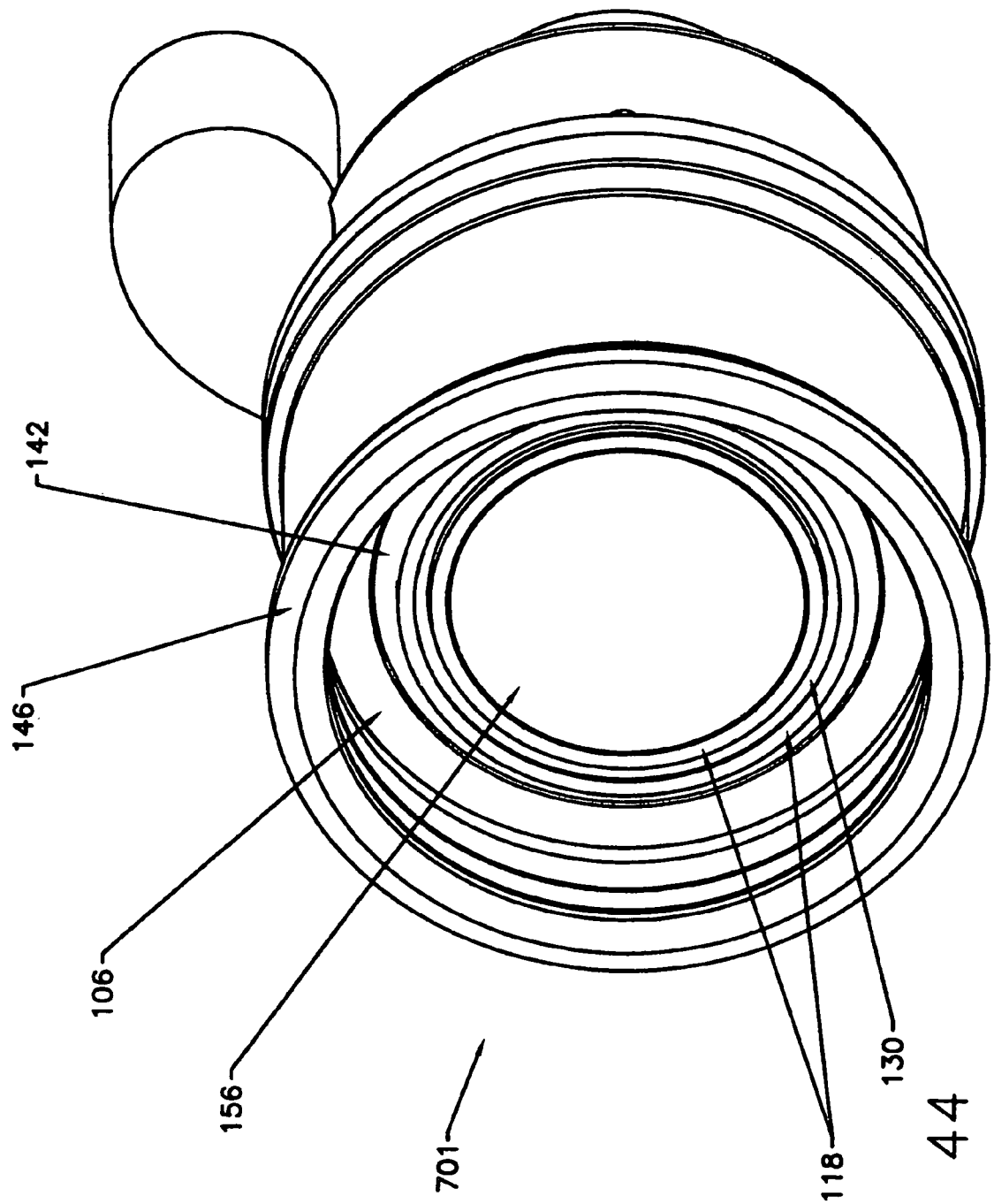
FIG. 44 shows a perspective view of the inside of the top portion of an assembled female adapter portion of a coupling pair according to the disclosure.

FIG. 44 shows a perspective view of the inside top portion of the assembled female adapter 701 showing the respective positions of its various elements including the flat top surface 118, o-ring 130, flat top 156, top surface 146, flat top surface 106, and gap 142.

Figure 45:
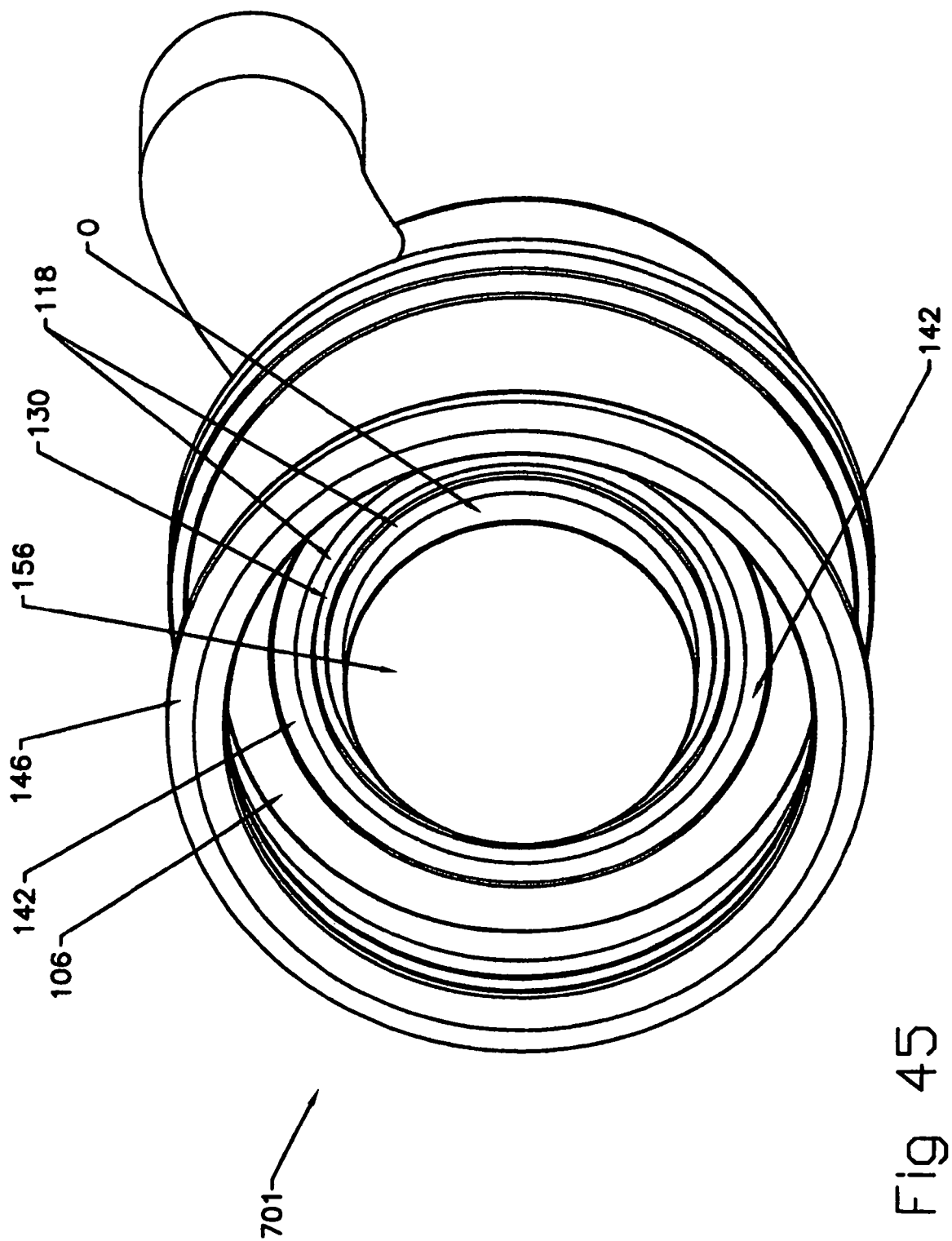
FIG. 45 shows a perspective view of the inside of the top portion of an assembled female adapter portion of a coupling pair according to the disclosure.

FIG. 45 shows a perspective view of the inside top portion of the assembled female adapter 701 in which the surface 118 has been pressed downward, against the force of spring 186 (FIG. 23) showing the respective positions of its various elements including the flat top surface 118, o-ring 130, flat top 156, top surface 146, flat top surface 106, gap 142, and opening O which has been caused to exist by virtue of the collar/seal ring assembly having been depressed against the force of spring 186 (FIG. 23).

The construction so described for the female adapter (or remote portion of a fuel transfer coupling according to the disclosure) operates as follows. A force is applied to the surface 118 of the collar/seal ring assembly, against the pressure of the spring 186. this causes the collar/seal ring assembly 136 to be moved inside the smooth bore 196 of the female adapter cover 144, to open up an opening O through which a fuel may flow by virtue of the beveled surface 132 having moved away from the o-ring seal 162 of the valve center 154. The collar/seal ring assembly continues its travel downwards opening up the opening O larger and larger until the bottom portion B of the assembly 136 contacts the raised surface 171. At this point, further pressure on surface 118 causes the seal ring 116 to continue moving downwards, against the pressure of springs 140, which opens up the gap 142 by virtue of the o-ring seal 122 no longer being in contact with beveled edge 114. The opening of the gap 142 opens fluid communication between the outlet portion 187 of the vapor tube 172 and the gap 142, through the holes 174 and shrouding enclosure 170.

Reference is now made back to the male adapter 700. When the male adapter 700 is engaged inside the female adapter cover and the two are pressed together by an applied force, a series of events heretofore unknown in the art occurs. The o-ring 130 on the female adapter 701 contacts the flat top surface 48 of the internal housing 18. The applied force causes the internal housing 18 to be pressed into the adapter 700, thus opening the gap 7, which provides a fluid communication path between the outlet portion 35 of the vapor tube 20 and the gap 7. Continued applied force causes the assembly 136 to be pushed into the smooth bore 196 of the female adapter cover 144, thus creating an opening O through which a liquid fuel may flow as was shown in FIG. 45. Continued applied force opens the gap 142 by virtue of the assembly 136 bottoming out on the flat surface 171, as described above, thus providing a fluid communication path between the outlet portion 187 of the vapor tube 172 and the gap 142. Under such an arrangement, the gap 7 of the male adapter 700 and the gap 142 of the female adapter 701 are in fluid contact, which also means that the outlet portion 35 of the vapor tube 20 and the outlet portion 187 of the vapor tube 172 are now in fluid communication with one another. During the course of the applied force, and more or less simultaneously with the aforesaid events, the flat top 156 of the valve center 154 pushes on the flat top surface 70 of the poppet 10 thus opening space S as described for FIG. 18, thus enabling fluid contact between the space S on the adapter 700 and the opening O (FIG. 45) of the adapter 701. Establishment of a fluid connection between the opening of space S and the opening O means that there is now a fluid connection between the bottom of the central conduit 166B and the central bore 34 of the male adapter base 4. Thus, insertion of the outer surface of the male adapter cover 2 of the finished assembly 700 into the bore of the female adapter cover 144 of the finished assembly 701 simultaneously causes a fluid connection to occur between the vapor tubes of each of the coupling counterparts and a fluid connection to occur between the central bore 34 of the male adapter base and the bottom of the central conduit 166B.

According to a preferred form of the disclosure, the central bore 34 (FIG. 2) of the assembly 700 is connected by conventional means such as a hose to the inlet pipe through which a fuel tank is normally filled, and the outlet portion 35 of the vapor tube 20 is connected by conventional means such as a hose to the headspace above the fuel in a fuel tank, and the assembly 700 is placed in a location at which the orifice through which gasoline is normally added to a vehicle's gas tank is located. The adapter assembly 701 is fitted to the bottom of a portable fuel reservoir (or the outlet of a pump). The outlet portion 187 of the vapor tube 172 is connected by conventional means such as a hose to the headspace above the fuel in the fuel reservoir from where the fuel to be delivered to the vehicle is stored. The central conduit 166B is connected by conventional means such as a hose to the bottom of the portable reservoir, to be in contact with a liquid fuel.

Using such provisions, when it is deemed desirable to fill gasoline to the vehicle, insertion of the end of the assembly 700 into the open end of the assembly 701 causes the above-described series of events to occur, thus effectively simultaneously, i.e., within about less than 1 second, and permits fueling of a vehicle to occur with no loss of vapor to the atmosphere. Also, since the volume of fuel delivered from the storage tank to the fuel tank on the vehicle is simultaneously compensated for by an equal exchange of headspace volume as between the two fuel storage vessels, no inhibition of flow is observed. Owing also to the nature of the coupling, losses of fuel due to spillage are kept to an absolute minimum, thus reducing fire hazards associated with gasoline spills and effectively eliminating health hazards to persons in the area by virtue of their not breathing volatile materials such as alkyl lead compounds since no spillages occur. These events are depicted in cross-section in FIGS. 46 A-46 F. Another way of viewing the events associated with the connection sequence may be broken down in the following steps:

1. o-ring, 148, engages with adapter cover, 2. Sealing inner portion of coupler and adapter from outside.
2. o-ring, 130, of 136 engages with face, 48, of internal housing, 18. Sealing inner fluid conduit, 34, from vent cavity, 7.
3. Assy, 136, pushes internal housing, 18, and poppet, 10, back until face, 51, contacts face 40 of body, 4. This opens to vent cavity, 7.
4. Face, 156, of poppet, 158, engages with face, 70, of poppet, 10.
5. Poppet, 156, pushes poppet, 10, open allowing fluid/fuel to flow from 166B to cavity 34.
6. Assy, 136, is pushed back until face, 201, of 102 contacts face, 171, of body, 164.
7. Housing, 18, with face, 48, in contact with o-ring, 130, pushes inner housing, 116, back opening vent cavity, 142?, to vent port, 172.
8. Coupler Assy. continues forward until face, 146, of adapter cover, 144, contacts the heads of screws, 22, of male adapter. Coupler is now fully engaged and all ports are fully open.

The occurrences of the above events are described according to one preferred form of the disclosure. However, it will occur to one of ordinary skill in the art after reading this specification that the events are controlled by the strengths of the various springs 8, 12, 186, and 140 selected. According to a preferred form of the disclosure, the event which is the last to occur is the opening of the gap 142 in the assembly 136.

The vent disc 14 on the assembly 700 is spring-loaded, as previously described herein. The purpose of this is to enable ambient air to enter the fuel tank after a quantity of fuel has been removed from the fuel tank by the action of the fuel pump. When the fuel pump removes fuel from the fuel tank during its normal operation, a vacuum will be developed within the fuel tank because of the volume of fuel removed. When the coupling of the present disclosure is utilized, once the vacuum inside the fuel tank reaches a sufficient level that the spring 12 can no longer hold the vent disc 14 in its seated position, the vent disc is drawn away from it seat, and enables ambient air to enter the tank to compensate for the loss of fuel or other cause of vacuum in the tank, such as a sudden temperature decrease. In addition, the vent disc 14 includes a hole 15 in its surface, which acts as a vent to vent out any pressure which may build up in the tank, owing to increases in temperature or other causes.

Figure 47:
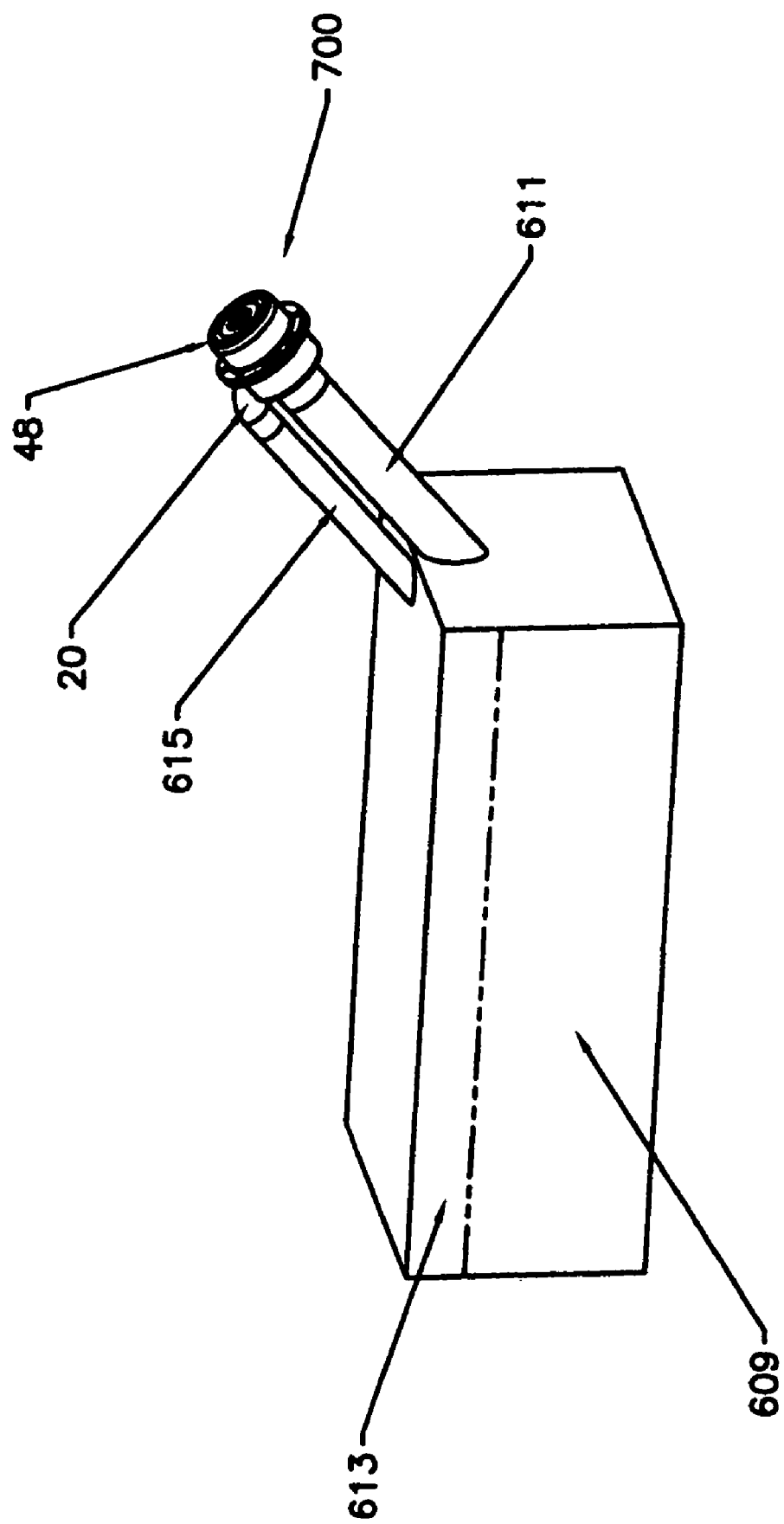
FIG. 47 shows a perspective view of a fuel reservoir having a coupling according to one form of the disclosure attached thereto.

FIG. 47 shows a perspective view of a fuel containment system comprising a fuel reservoir 609 having an inlet pipe 611 and containing a liquid fuel and a headspace 613, and further comprising the coupling 700, wherein the vapor tube 20 is in effective fluid contact with the headspace 613 above the fuel in said fuel reservoir by means of a tube 615, and wherein the first end portion 34 of the central bore portion is in effective fluid contact with the inlet pipe 611.

Figure 48:
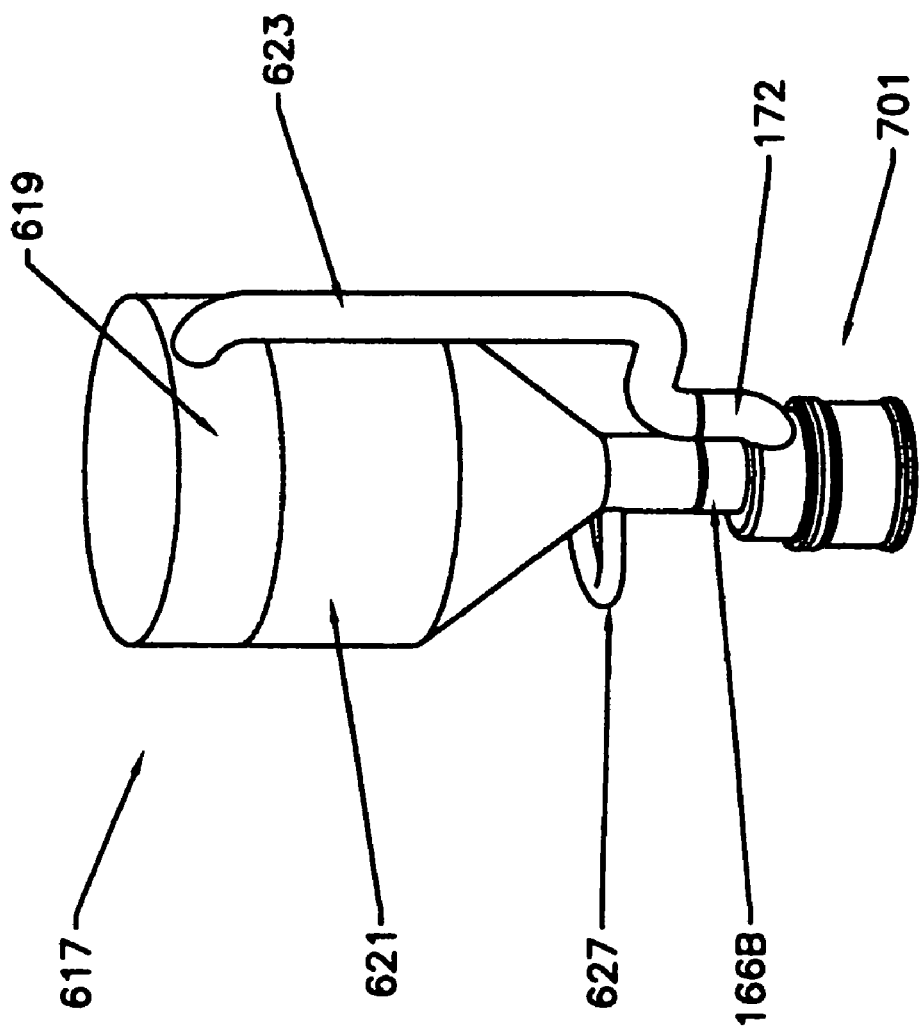
FIG. 48 shows a perspective view of a remote fuel reservoir having a coupling according to one form of the disclosure attached thereto.

FIG. 48 shows a perspective view of a fuel containment vessel 617 comprising an outlet 625 and containing a liquid fuel 621 and a headspace 619, and further comprising the coupling 701, wherein the vapor tube 172 is in effective fluid contact with the headspace 619 above the fuel 621 in said fuel containment vessel by means of a tubing 623, and wherein said central conduit portion is in effective fluid contact with said outlet 625. There is also shown a valve means 627 disposed between said outlet 625 and said central conduit portion.

Consideration must be given to the fact that although this disclosure has been described and disclosed in relation to certain preferred embodiments, obvious equivalent modifications and alterations thereof will become apparent to one of ordinary skill in this art upon reading and understanding this specification and the claims appended hereto. The present disclosure further includes all possible combinations of the features recited in any one of the various claims appended hereto with the features recited in any one or more of each of the remaining claims. Accordingly, the presently disclosed disclosure is intended to cover all such modifications, alterations, and combinations.

What is claimed is:

1. A process for charging a fuel reservoir on board of a motorized vehicle comprising the steps of:
    a) providing a motorized vehicle having a fuel reservoir, said fuel reservoir comprising a first single coupling fitting;
    b) providing a portable, remote reservoir containing a liquid fuel, said portable, remote reservoir comprising a second single coupling fitting attached thereto that is complementary to said first single coupling fitting, said first coupling fitting and said second coupling fitting each being configured to provide, upon their engagement with one another, the opening of a first passage through which said liquid fuel passes and the opening of a second passage separate and distinct from said first passage through which vapor passes, within said coupling fittings; and
    c) engaging said second single coupling fitting to said first single coupling fitting.

2. A process according to claim 1, further comprising the step of:

d) dis-engaging said second single coupling fitting from said first single coupling fitting.

3. A process according to claim 2 wherein the total amount of fuel spillage during said charging is less than 50 milliliters of fuel.

4. A process according to claim 1 wherein said second passage is concentrically disposed about said first passage within said couplings when engaged.

5. A process according to claim 3 wherein said first single coupling fitting includes a poppet valve.

6. A process according to claim 5 wherein said poppet valve includes a vent disc.

7. A process according to claim 6 wherein said vent disc is spring loaded.

8. A process according to claim 1 wherein said first coupling fitting and said second coupling fitting are each configured to provide, upon their dis-engagement from one another, the closing of said first passage and the closing of said second passage.

9. A process according to claim 1 wherein said liquid fuel is caused to pass from said portable, remote reservoir to said fuel reservoir on board of said motorized vehicle solely by the force of gravity.

10. A process for charging a fuel reservoir on board of a motorized vehicle, comprising the steps of:
   a) providing a motorized vehicle having an on-board fuel reservoir, said fuel reservoir comprising a first single coupling fitting, said first single coupling fitting comprising a poppet valve that includes a vent disc;
   b) providing a portable remote reservoir containing a liquid fuel, said portable remote reservoir comprising a second single coupling fitting attached thereto which is complementary to said first single coupling fitting;
   c) causing a first passage and a second passage separate and distinct from said first passage to exist between said remote reservoir and said fuel reservoir by engaging said second single coupling fitting to said first coupling fitting, said first passage being configured to permit passage of a liquid fuel, and said second passage being configured to permit passage of vapor; and
   d) disengaging said coupling fittings from one another.

11. A process according to claim 10 wherein said vent disc is spring-loaded.

12. A process for charging a fuel reservoir on board of a motorized vehicle from a portable, remote reservoir, comprising the steps of:
   a) providing a motorized vehicle having a fuel reservoir, said fuel reservoir comprising a first single coupling fitting;
   b) providing a portable, remote reservoir containing a liquid fuel, said portable, remote reservoir comprising a second single coupling fitting attached thereto that is complementary to said first single coupling fitting, said second single coupling fitting comprising:
   an adapter cover having a bore;
   a collar moveably disposed within said bore;
   a seal ring moveably disposed within said collar, said seal ring including a beveled edge;
   a valve center centrally located within said seal ring and configured to sealingly engage said beveled edge; and
   c) causing said second single coupling fitting to engage with said first single coupling fitting, said first and second single coupling fittings, when engaged, collectively comprising a connection between said remote reservoir and said fuel reservoir through which liquid fuel passes from said remote reservoir with attendant transfer of fuel vapors from said fuel reservoir to said remote reservoir.

13. A process according to claim 12 further comprising:
   d) disengaging said second single coupling fitting from said first single coupling fitting.

* * * * *